(12) United States Patent
Wang

(10) Patent No.: US 11,007,899 B2
(45) Date of Patent: May 18, 2021

(54) MOUNTING STRUCTURES FOR BATTERY PACKS IN ELECTRIC VEHICLES

(71) Applicant: SF Motors, Inc., Santa Clara, CA (US)

(72) Inventor: Jiaxian Wang, Santa Clara, CA (US)

(73) Assignees: CHONGQING JINKANG NEW ENERGY VEHICLE CO., LTD, Chongqing (CN); SF MOTORS, INC., Santa Clara, CA (US)

( * ) Notice: Subject to any disclaimer, the term of this patent is extended or adjusted under 35 U.S.C. 154(b) by 179 days.

(21) Appl. No.: 16/168,097

(22) Filed: Oct. 23, 2018

(65) Prior Publication Data
US 2020/0122587 A1    Apr. 23, 2020

(51) Int. Cl.
| B60L 50/64 | (2019.01) |
| B60L 58/21 | (2019.01) |
| B60L 58/25 | (2019.01) |
| B60L 50/60 | (2019.01) |

(52) U.S. Cl.
CPC .............. B60L 58/21 (2019.02); B60L 50/64 (2019.02); B60L 50/66 (2019.02); B60L 58/25 (2019.02)

(58) Field of Classification Search
CPC ................ B60K 2001/0405; B60K 2001/0438
See application file for complete search history.

(56) References Cited

U.S. PATENT DOCUMENTS

| 5,501,289 | A  * | 3/1996  | Nishikawa | H01M 50/20 180/68.5 |
| 7,610,978 | B2 * | 11/2009 | Takasaki | B60L 50/64 180/68.5 |
| 7,771,865 | B2 * | 8/2010  | Takasaki | H01M 10/613 429/83 |
| 8,051,934 | B2 * | 11/2011 | Kiya | B60L 50/66 180/68.5 |
| 9,027,684 | B2 * | 5/2015  | Araki | B60K 1/04 180/68.5 |
| 9,045,030 | B2 * | 6/2015  | Rawlinson | B60L 50/66 |
| 9,227,582 | B2 * | 1/2016  | Katayama | B60L 3/0046 |
| 9,718,362 | B2 * | 8/2017  | Yamanaka | B60L 15/007 |
| 9,809,100 | B2 * | 11/2017 | Kamimura | B62D 21/157 |
| 9,809,101 | B2 * | 11/2017 | Ikeda | B62D 25/2036 |
| 9,987,913 | B2 * | 6/2018  | Hara | H01M 50/20 |
| 10,099,546 | B2 * | 10/2018 | Hara | B60K 1/04 |
| 10,207,574 | B2 * | 2/2019  | Ozawa | H01M 50/20 |
| 10,272,949 | B2 * | 4/2019  | Faruque | B62D 21/157 |

(Continued)

*Primary Examiner* — Jeffrey J Restifo
(74) *Attorney, Agent, or Firm* — Foley & Lardner LLP; James De Vellis

(57) ABSTRACT

Apparatuses, systems, and methods to provide electrical power to components in electric vehicles are described herein. A battery pack can be arranged in a first position within an interior opening defined by a lateral member. A connecting member can be coupled with the battery pack, and can have a head and a body. A panel can be disposed along the lateral member, and can have a top and bottom layer. The top layer can define an opening to pass the head and body. The bottom layer can define an opening to support the head. A plate can be disposed on the top layer and can define an opening. The opening of the plate can have a first region to hold the battery pack in the first position and a second region to allow the battery pack to move to a second position outside the interior opening responsive to an impact.

20 Claims, 20 Drawing Sheets

(56) References Cited

U.S. PATENT DOCUMENTS

| | | | |
|---|---|---|---|
| 10,322,757 B2* | 6/2019 | Shimoda | B62D 21/157 |
| 10,336,211 B2* | 7/2019 | Kobayashi | H01M 50/20 |
| 10,464,406 B2* | 11/2019 | Kawabe | B60K 1/04 |
| 10,597,084 B2* | 3/2020 | Ayukawa | B62D 25/2036 |
| 10,603,998 B2* | 3/2020 | Toyota | B60K 1/04 |
| 10,647,213 B2* | 5/2020 | Otoguro | B60L 50/64 |
| 10,661,841 B2* | 5/2020 | Choi | B62D 25/2036 |
| 10,730,380 B2* | 8/2020 | Tatsuwaki | B60L 3/0007 |
| 10,850,597 B2* | 12/2020 | Tsuyuzaki | B62D 21/157 |
| 10,882,557 B2* | 1/2021 | Otoguro | B62D 21/02 |
| 10,899,389 B2* | 1/2021 | Kasai | B62D 21/157 |
| 10,913,340 B2* | 2/2021 | Tsuyuzaki | B62D 25/025 |
| 2009/0226806 A1* | 9/2009 | Kiya | B62D 21/152 |
| | | | 429/186 |

* cited by examiner

MOUNTING STRUCTURES FOR BATTERY PACKS IN ELECTRIC VEHICLES

BACKGROUND

There is an increasing demand for reliable and higher capacity battery cells for high power, higher performance battery packs, to support applications in plug-in hybrid electrical vehicles (PHEVs), hybrid electrical vehicles (HEVs), or electrical vehicle (EV) systems, for example. The temperature of battery pack modules can increase under operating conditions.

SUMMARY

The present disclosure is directed to apparatus to mount battery packs in electric vehicles. The apparatus may have a panel on a lateral member of an internal frame of an electric vehicle, and may hold a battery pack in a first position within an interior portion of the interior frame. In response to a lateral impact on the electric vehicle, the apparatus may allow the battery pack to descend to a second position outside the interior portion of the interior frame. In this manner, the force from the lateral impact on the electric vehicle applied and transferred onto the battery pack may be reduced, thereby increasing a likelihood that the integrity of the battery pack is maintained.

At least one aspect is directed to an apparatus to provide electrical power to components in electric vehicles. The apparatus can include a battery pack. The battery pack can be arranged in a first position beneath a mounting surface and within an interior opening of an internal frame that is disposed within a bottom region of an electric vehicle. The interior opening can be partially defined by a lateral member of the internal frame and the mounting surface. The battery pack can have a plurality of battery cells to store electric energy and can have a support structure to hold the battery pack in the first position. The apparatus can include a connecting member. The connecting member can be mechanically coupled with the support structure of the battery pack. The connecting member can have a head portion and a body portion. The apparatus can include a panel. The panel can be disposed along the lateral member of the internal frame in the bottom region of the electric vehicle. The panel can have a top layer. The top layer can define a top panel opening to pass the head portion and the body portion of the connecting member. The panel can have a bottom layer. The bottom layer can be separated from the top layer. The bottom layer can define a bottom panel opening. The bottom panel opening can be aligned with the top panel opening and can have an area less than an area of the top panel opening to pass the body portion and to support the head portion on the bottom layer. The apparatus can have a plate. The plate can be disposed on the top layer of the panel to couple the panel with the mounting surface of the electric vehicle. The plate can define a plate opening. The plate opening can have a first region. The first region can support the head portion of the connecting member onto the plate to hold the battery pack in the first position. The plate opening can have a second region. The second region can be contiguous with the first region. The second region can have an area larger than an area of the first region to shift the head portion of the connecting member to the second region to allow the battery pack to move from the first position to a second position outside the interior opening of the internal frame in response to a lateral impact on the electric vehicle.

At least one aspect is directed to an electric vehicle. The electric vehicle can include one or more components. The electric vehicle can include a battery pack. The battery pack can be arranged in a first position beneath a mounting surface and within an interior opening of an internal frame that is disposed within a bottom region. The interior opening can be partially defined by a lateral member of the internal frame and the mounting surface. The battery pack can have a plurality of battery cells to store electric energy for the one or more one or more components and can have a support structure to hold the battery pack in the first position. The electric vehicle can include a connecting member. The connecting member can be mechanically coupled with the support structure of the battery pack. The connecting member can have a head portion and a body portion. The electric vehicle can include a panel. The panel can be disposed along the lateral member of the internal frame in the bottom region. The panel can have a top layer. The top layer can define a top panel opening to pass the head portion and the body portion of the connecting member. The panel can have a bottom layer. The bottom layer can be separated from the top layer. The bottom layer can define a bottom panel opening. The bottom panel opening can be aligned with the top panel opening and can have an area less than an area of the top panel opening to pass the body portion and to support the head portion on the bottom layer. The electric vehicle can have a plate. The plate can be disposed on the top layer of the panel to couple the panel with the mounting surface. The plate can define a plate opening. The plate opening can have a first region. The first region can support the head portion of the connecting member onto the plate to hold the battery pack in the first position. The plate opening can have a second region. The second region can be contiguous with the first region. The second region can have an area larger than an area of the first region to shift the head portion of the connecting member to the second region to allow the battery pack to move from the first position to a second position outside the interior opening of the internal frame in response to a lateral impact.

At least one aspect is directed to a method of providing electrical power to components in electric vehicles. The method can include arranging a battery pack in a first position beneath a mounting surface and within an interior opening of an internal frame that is disposed within a bottom region of an electric vehicle. The interior opening can be partially defined by a lateral member of the internal frame and the mounting surface. The battery pack can have a plurality of battery cells to store electric energy and can have a support structure to hold the battery pack in the first position. The method can include coupling a connecting member with the support structure of the battery pack. The connecting member can have a head portion and a body portion. The method can include disposing a panel along the lateral member of the internal frame in the bottom region of the electric vehicle. The panel can have a top layer. The top layer can define a top panel opening to pass the head portion and the body portion of the connecting member. The panel can have a bottom layer. The bottom layer can be separated from the top layer. The bottom layer can define a bottom panel opening. The bottom panel opening can be aligned with the top panel opening and can have an area less than an area of the top panel opening to pass the body portion and to support the head portion on the bottom layer. The method can include disposing a plate on the top layer of the panel to couple the panel with the mounting surface of the electric vehicle. The plate can plate can define a plate opening. The plate opening can have a first region. The first region can support the head portion of the connecting member onto the plate to hold the battery pack in the first position. The plate opening can have a second region. The second region can be contiguous with the first region. The second region can have an area larger than an area of the first region to shift the head portion of the connecting member to the second region to allow the battery pack to move from the first position to a second position outside the interior opening of the internal frame in response to a lateral impact on the electric vehicle.

At least one aspect is directed toward a method. The method can include providing an apparatus in an electric vehicle. The apparatus can include a battery pack. The battery pack can be arranged in a first position beneath a mounting surface and within an interior opening of an internal frame that is disposed within a bottom region of the electric vehicle. The interior opening can be partially defined by a lateral member of the internal frame and the mounting surface. The battery pack can have a plurality of battery cells to store electric energy and can have a support structure to hold the battery pack in the first position. The apparatus can include a connecting member. The connecting member can be mechanically coupled with the support structure of the battery pack. The connecting member can have a head portion and a body portion. The apparatus can include a panel. The panel can be disposed along the lateral member of the internal frame in the bottom region of the electric vehicle. The panel can have a top layer. The top layer can define a top panel opening to pass the head portion and the body portion of the connecting member. The panel can have a bottom layer. The bottom layer can be separated from the top layer. The bottom layer can define a bottom panel opening. The bottom panel opening can be aligned with the top panel opening and can have an area less than an area of the top panel opening to pass the body portion and to support the head portion on the bottom layer. The apparatus can have a plate. The plate can be disposed on the top layer of the panel to couple the panel with the mounting surface of the electric vehicle. The plate can define a plate opening. The plate opening can have a first region. The first region can support the head portion of the connecting member onto the plate to hold the battery pack in the first position. The plate opening can have a second region. The second region can be contiguous with the first region. The second region can have an area larger than an area of the first region to shift the head portion of the connecting member to the second region to allow the battery pack to move from the first position to a second position outside the interior opening of the internal frame in response to a lateral impact on the electric vehicle.

BRIEF DESCRIPTION OF THE DRAWINGS

The accompanying drawings are not necessarily intended to be drawn to scale. Like reference numbers and designations in the various drawings indicate like elements. For purposes of clarity, not every component may be labelled in every drawing. In the drawings.

DETAILED DESCRIPTION

Figure 1:
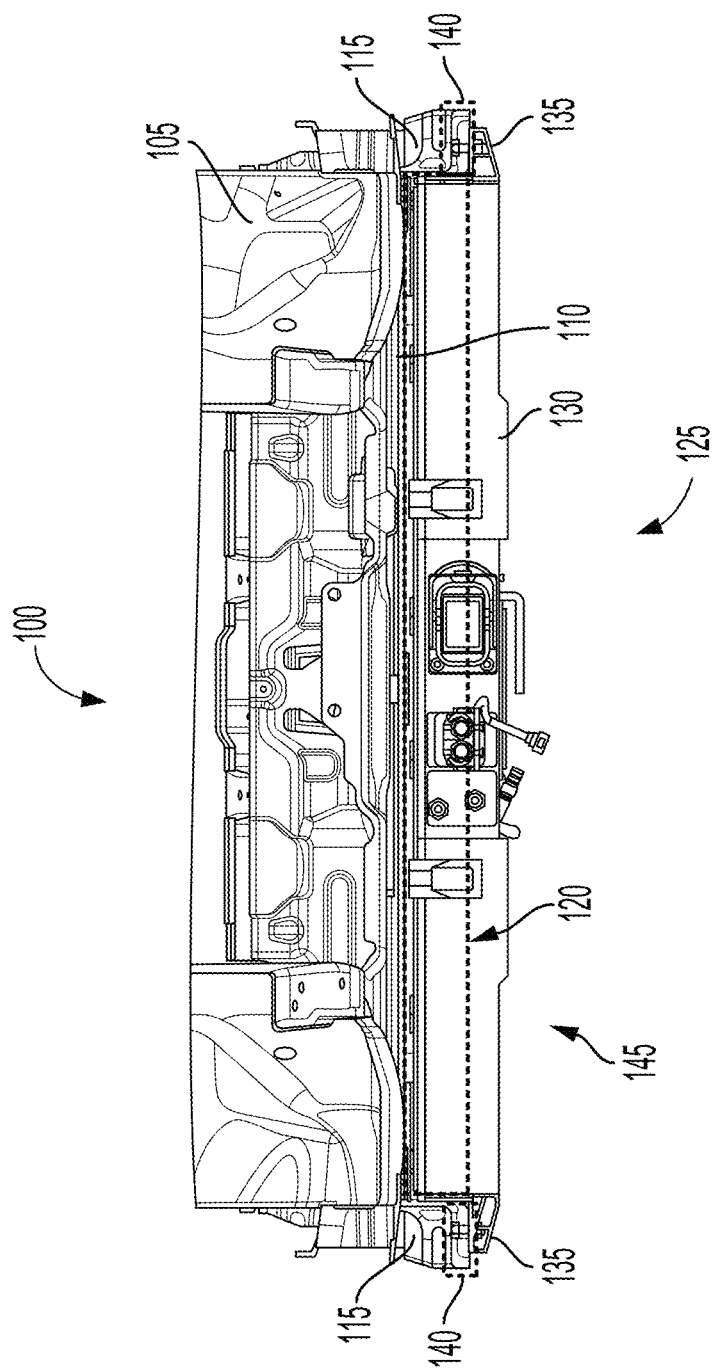
FIG. 1 depicts a cross-sectional view of a bottom region of an electric vehicle with an example apparatus for providing electrical power to components therein in a first position.

Following below are more detailed descriptions of various concepts related to, and implementations of, methods, apparatuses, devices, and systems of temperature control for a battery pack or other energy storage device. The various concepts introduced above and discussed in greater detail below may be implemented in any of numerous ways.

Described herein battery packs with integrated cold plates in electric vehicles for an automotive configuration. An automotive configuration includes a configuration, arrangement or network of electrical, electronic, mechanical or electromechanical devices within a vehicle of any type. An automotive configuration can include battery cells for battery packs in electric vehicles (EVs). EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned. EVs can include various components that run on electrical power. These various components can include an electric engine, an entertainment system (e.g., a radio, display screen, and sound system), on-board diagnostics system, and electric control units (ECUs) (e.g., an engine control module, a transmission control module, a brake control module, and a body control module), among other components.

A battery pack housing a set of battery blocks containing battery cells can be installed in an EV to supply electrical power to the components of the EV. The battery pack can be mounted within an interior opening defined by an internal frame along a bottom region of an electric vehicle. At least two lateral sides (e.g., a left side and a right side) of the battery pack can be separated from an exterior of the electric vehicle by a corresponding lateral member of the internal frame, and may thus be physically approximate to the exterior (e.g., within 10 cm to 30 cm). When an impact occurs on one of these two lateral sides, a force of the shock from the impact can be transferred to the battery pack through the lateral member of the internal frame. As a result, the battery pack can undergo physical compression from the force of the shock and an internal reaction force from the other lateral member of the internal frame on the other side. The compression can cause the battery pack to contort, deform, or damage, leading to a catastrophic failure such as a fire or explosion. The damage can even result in an explosion of the battery pack due to a short circuit caused by from physical contact of the current collector for drawing electric power or by coolant released from the cracked conduits for regulating temperature.

To lower the risk of the shock of impact causing catastrophic failure, the battery pack can be installed within the interior opening of the internal frame. The force of the shock can cause at least one of the mounting structure to be pushed inwards into the interior opening. Both the mounting structure can in turn drop the battery pack to a position outside the interior opening to elude the effects of the resulting compression. The mounting structure can have at least two panels each along a lateral member of the internal frame. The panels can form the lateral members of the internal along at least two of the lateral sides of the battery pack. The battery pack can be mechanically coupled with the panels via a set of connecting members to initially hold the battery pack within the interior portion of the internal frame. Each connecting member can have a head portion and a body portion. The end of the body portion opposite of the head portion can be mechanically coupled with the battery pack. A width (or a diameter) of the head portion can be greater than a width (or a diameter) of the body portion. Each panel can have a top layer and a bottom layer, with each layer defining a set of openings. Each opening of the top layer can be larger than the width of the body portion of the connecting member. Each opening of the bottom layer can be less than the width of the head portion of the connecting member to hold. Each opening of the top layer can be aligned with a corresponding opening of the bottom layer. A trigger plate can be arranged on top of the panel, and can also define a set of openings. Each opening of the trigger plate can have two regions. A first region of the opening can be smaller than the width of the head portion and the second region of the opening can be larger than the width of the head portion of the connecting member. Each opening can be partially aligned with a corresponding opening on the top layer of the panel.

Initially, each of the connecting members can extend from the first region of each opening of the trigger plate, through the opening of the top layer, and then to the opening of the bottom layer. The head portion of each connecting member can be supported along a top surface of the trigger plate to hold the battery pack within the interior portion of the internal frame of the electric vehicle. In response to the shock from the lateral impact on the electric vehicle, the trigger plate on the same side as the impact can be forced in towards the interior portion away from the exterior of the vehicle. The moving of the trigger plate can allow each connecting member to shift from the first region to the second region of the opening of the trigger plate. As the second region of each opening of the trigger plate can be larger than the width of the head portion, each connecting member can drop through the second region, the trigger plate, and the corresponding opening on the top layer of the panel. The body portion of each connecting member can also drop through the panel, thereby allowing the battery pack connected to the end of the body portion to descend to a position outside the interior opening. Subsequently, the head portion of each connecting member can be caught on the bottom layer of the panel to let the battery pack suspend at a ground clearance level above the ground below the bottom region of the electric vehicle.

Since the battery pack can drop from the bottom region of the electric vehicle in the event of a lateral impact, the panels can diminish or eliminate the deleterious effects of the compression force relative to not having such panels included in the lateral members of the internal frame. With the reduction of the compression force on the battery pack, the likelihood that the battery pack experiences a catastrophic failure (e.g., fire or explosion from short circuiting) can also be lowered. In addition, even if the EV to which the battery pack is installed becomes inoperable as a result of the impact, the battery pack itself can be used again after the impact, thereby prolonging the lifespan of the battery and increasing the utility.

FIG. 1, among others, depicts a cross-sectional view of a bottom region 105 of an electric vehicle 100 with an apparatus 125 for providing electrical power to components therein in a first position 145. The depicted view can correspond to a lateral cross-sectional view of the bottom region 105 of the electric vehicle 100. The electric vehicle 100 can be an electric automobile (e.g., as depicted) a motorcycle, a scooter, a passenger vehicle, a passenger or commercial truck, and another type of vehicle such as sea or air transport vehicles, a plane, a helicopter, a submarine, a boat, or a drone, among others. The electric vehicle 100 can include one or more electric motors for propulsion (sometimes referred herein as fully-electric) or can include one or more electric motors in conjunction with one or more fuel-based motors for propulsion (sometimes referred herein as hybrid). The electric vehicle 100 can define or include a bottom region 105. The bottom region 105 can be defined as a lower portion of the electric vehicle 100. For example, the bottom region 105 can correspond to a lower quarter, a lower third, or a lower half of the electric vehicle 100 relative to a total height of the electric vehicle 100 as measured from the ground. A height of the bottom region 105 of the electric vehicle 100 relative to the ground can range between 40 cm to 75 cm. The bottom region 105 can encompass or include any component of the electric vehicle 100 within the lower portion of the electric vehicle 100.

In the bottom region 105, the electric vehicle 100 can include at least one mounting surface 110, at least one internal frame 115, and at least one apparatus 125, among others. The mounting surface 110 of the electric vehicle 100 can define or include a bottom longitudinal surface of the electric vehicle 100 within at least a portion of the bottom region 105. The mounting surface 110 can be installed, arranged, or disposed along the bottom longitudinal surface of the bottom region 105 of the electric vehicle 100. The mounting surface 110 can be mechanically couple one or more components (e.g., the apparatus 125) with the electric vehicle 100 along the bottom longitudinal surface. The mounting surface 110 can at least partially span or extend between one lateral side of the electric vehicle 100 to an opposite lateral side of the electric vehicle 100. The mounting surface 110 can at least partially span or extend within the interior opening 120 between one lateral side of the internal frame 115 and an opposing lateral side of the internal frame 115. For example, as depicted, the mounting surface 110 can span generally between the left side and the right side of the internal frame 115. The mounting surface 110 can correspond to a floor panel to cover electrical and mechanical components housed within the electric vehicle 100 from the ground beneath the electric vehicle 100. For example, the floor panel corresponding to the mounting surface 110 can include a sheet metal stamping spanning a gap between the lateral sides of the internal frame 115. A shape of the mounting surface 110 can correspond to a shape of the electric vehicle 100 or the one or more components to be attached to the mounting surface 110. The mounting surface 110 can have a length ranging between 1380 mm to 1580 mm. The mounting surface 110 can have a width ranging between 1280 mm to 1680 mm. The mounting surface 110 can have a thickness ranging between 130 mm to 170 mm. The mounting surface 110 can form a part of the internal frame 115. The mounting surface 110 can also rest or be supported by a portion of the internal frame 115.

The internal frame 115 of the electric vehicle 100 can correspond to a support structure upon which one or more components can be propped up, attached, or otherwise situated. The support structure corresponding to the internal frame 115 can be of various structure type, such as a ladder frame, a perimeter frame (e.g., as depicted), a platform frame, a space form, a unitized body, a rolling chassis, or a backbone tube, among others. The internal frame 115 can include a set of support members (sometimes referred to herein as support elements, rails, members, or subframes). Each support element can be comprised of a metallic material (e.g., iron, aluminum, or copper, or alloys thereof) or a composite material (e.g., steel, fiberglass, carbon-reinforced plastic, or wood). The set of support members of the internal frame 115 can be arranged and connected to one another to form a skeletal support for the one or more components attached or included in the electric vehicle 100. The support members of the internal frame 115 can include a set of lengthwise lateral members and a set of widthwise lateral members. Each lengthwise and widthwise lateral member can form a segment of the skeletal support forming the internal frame 115. Each lengthwise lateral member of the internal frame 115 can at least partially span or extend lengthwise within the bottom region 105 of the electric vehicle 100. At least one lengthwise lateral member can at least partially span or extend lengthwise along the lateral edge of the electric vehicle 100. For example, as depicted, the internal frame 115 can include a lateral member on a left side of the electric vehicle 100 and a lateral member on a right side of the electric vehicle 100. Each widthwise lateral member of the internal frame 115 can at least partially span or extend widthwise within the bottom region 105 of the electric vehicle 100. In the internal frame 115, at least two of the lengthwise lateral members can be welded, attached, joined, or otherwise connected to each other via at least one of the widthwise lateral members.

The lateral members of the internal frame 115 and the mounting surface 110 can define an interior opening 120. The interior opening 120 can hold, contain, or otherwise include one or more components along the bottom longitudinal surface of the electric vehicle 100. The interior opening 120 can correspond to a cavity or a hollowing (e.g., shown in dotted lines in FIG. 1) within the bottom region 105 of the electric vehicle 100. The cavity or the hollowing corresponding to the interior opening 120 can be downward facing toward the ground beneath the electric vehicle 100. A top longitudinal side of the interior opening 120 can be defined by the mounting surface 110 that corresponds to the bottom longitudinal surface of the electric vehicle 100. One more lateral sides of the internal opening 120 can be at least partially defined by the lengthwise and widthwise lateral members of the internal frame 115. For example, as depicted, the interior opening 120 can span between an inner surface of the lengthwise lateral member of the internal frame 115 on the left side of the electric vehicle 100 and an inner surface of the lengthwise lateral member of the internal frame 115 on the right side of the electric vehicle 100. A bottom longitudinal side of the internal opening 120 can be defined as between a bottom edge of the lengthwise or widthwise lateral members of the internal frame 115. The interior opening 120 can have a length ranging between 1995 mm to 2395 mm. The interior opening 120 can have a width ranging between 1220 mm to 1420 mm. The interior opening 120 can have height ranging between 110 mm to 150 mm. At least one side (e.g., the left or right side as depicted) of the interior opening 120 can be separated from an exterior of the electric vehicle 100 by a distance ranging between 65 mm to 105 mm.

The electric vehicle 100 can include the apparatus 125. The apparatus 125 can be situated, arranged, or disposed within the bottom region 105. The apparatus 125 can be installed, housed, or otherwise included within the bottom region 105 of the electric vehicle 100. The apparatus 125 can at least partially span or extend laterally within the bottom region 105 of the electric vehicle 100. For example, as illustrated, the apparatus 125 can span from generally the left side of the electric vehicle 100 to generally the right side of the electric vehicle 100 within the bottom region 105. The apparatus 125 can further at least partially span or extend longitudinally along the internal opening 120 within the bottom region 105 of the electric vehicle 100. The apparatus 125 can also at least partially extend outside the internal opening 120. At least one component of the apparatus 125 can be a part of, joined, or attached to the mounting surface 110, to the internal frame 115, or another component of the electric vehicle 100 within the bottom region 105.

The apparatus 125 can include at least one battery pack 130. The battery pack 130 can be disposed or arranged in the first position 145 (sometimes referred herein as the "loaded position"). The first position 145 can refer to an arrangement in which the battery pack 130 is at least partially within the interior opening 120 of the electric vehicle 100 and in contact with the mounting surface 110. The battery pack 130 can be initially within the first position 145 prior to a lateral impact on the electric vehicle 100. In the first position 145, the battery pack 130 can be disposed or arranged at least partially within the interior opening 120 defined within the bottom region 105 of the electric vehicle 100. At least a top portion of the battery pack 130 can be within the interior opening 120. For example, as illustrated, the top half of the battery pack 130 can reside within the interior opening 120 defined by the mounting surface 110 and the lateral members of the internal frame 115. The battery pack 130 can be disposed or arranged between the lateral members of the internal frame 115 in the interior opening 120. The battery pack 130 can be disposed or arranged beneath the mounting surface 110. A top surface of the battery pack 130 can be in contact or flush with the mounting surface 110 of the electric vehicle 100. At least one lateral side of the battery pack 130 can be separated from the exterior of the electric vehicle 100 by the lateral members of the internal frame 115. For example, as depicted, the left and right sides of the battery pack 130 can be separated from the exterior of the electric vehicle 100 by the left lengthwise lateral member and the right lengthwise lateral member of the internal frame 115. Separated from the exterior of the electric vehicle 100 by the lateral members of the internal frame 115, the battery pack 130 can avoid a direct lateral impact.

The battery pack 130 can include a set of battery cells to store electrical energy. The battery pack 130 can include a set of battery modules to contain the battery cells. Each battery pack module within the battery pack 130 can define or include one or more holders for the battery cells. Each holder can contain, support, or house at least one battery cell. A housing for the battery pack 130 can be comprised of a thermally conductive and electrically insulative material. The material of the battery pack 130 can include a ceramic material (e.g., silicon nitride, silicon carbide, titanium carbide, zirconium dioxide, and beryllium oxide) and a thermoplastic material (e.g., acrylic glass, polyethylene, polypropylene, polystyrene, or polyvinyl chloride), among others. A shape of the battery pack 130 can be a prismatic casing with a polygonal base, such as a triangle, a square, a rectangular (e.g., as depicted), a pentagon, or a hexagon, among others. The shape of the battery pack 130 can include a cylindrical casing or cylindrical cell with a circular, ovular, or elliptical base, among others. The battery pack 130 can have a height ranging between 90 mm to 150 mm. The battery pack 130 can have a width or diameter ranging between 13000 mm to 1500 mm. The battery pack 130 can have a length ranging between 1850 mm to 2350 mm.

The battery cells included in the battery pack 130 can include a lithium-air battery cell, a lithium ion battery cell, a nickel-zinc battery cell, a zinc-bromine battery cell, a zinc-cerium battery cell, a sodium-sulfur battery cell, a molten salt battery cell, a nickel-cadmium battery cell, or a nickel-metal hydride battery cell, among others. Each battery cell in the battery pack 130 can have or define a positive terminal and a negative terminal. Both the positive terminal and the negative terminal can be along a top surface of the battery cell. The shape of the battery cell can be a prismatic casing with a polygonal base, such as a triangle, a square, a rectangular, a pentagon, or a hexagon. The shape of the battery cell can also be cylindrical casing or cylindrical cell with a circular (e.g., as depicted), ovular, or elliptical base, among others. A height of each battery cell can range between 50 mm to 90 mm. A width or diameter of each battery cell can range between 16 mm to 26 mm. A length or diameter of each battery cell can range between 16 mm to 26 mm. For example, a battery cell of the 18650 types can have a diameter of 18 mm and a height of 65 mm and a battery cell of the 21700 type can have a diameter of 21 mm and a height of 70 mm.

The battery pack 130 can have or define at least one positive terminal and at least one negative terminal. The positive terminal for the battery pack 130 can correspond to or can be electrically coupled with the positive terminals of the set of battery cells in the battery pack 130. The negative terminal for the battery pack 130 can correspond to or can be electrically coupled with the negative terminals of the set of battery cells in the battery pack 130. Both the positive terminal and the negative terminal of the battery pack 130 can be defined or located along the top surface of the battery pack 130. The positive terminal and the negative terminal of the battery pack 130 can be facing the mounting surface 110 within the bottom region 105 of the electric vehicle 100. The positive terminal and the negative terminal of the battery pack 130 can be electrically coupled with the set of conductive lines included along the top surface of the battery pack 130. The positive terminal of the battery pack 130 can be electrically coupled with a positive polarity port via the conductive line. The negative terminal of the battery pack 130 can be electrically coupled with the negative polarity port via the negative terminal conductive line.

The battery pack 130 can include a set of support structures 135. The set of support structures 135 can mechanically couple the battery pack 130 to the mounting surface 110 or the lateral members of the internal frame 115. The set can include a support structure 135 on a left lateral side of the battery pack 130 and another support structure 135 on a right lateral side of the battery pack 130. Each support structure 135 can be attached, joined, or otherwise included on at least a portion of a lateral surface of the battery pack 130. For example, as illustrated, both the left and right support structures 135 can be attached on a lower third of the lateral surface of the battery pack 130. Each support structure 135 can extend from the lateral surface of the battery pack 130. Each support structure 135 can at least partially span the corresponding lateral surface of the battery pack 130. Each support structure 135 can be flush or in contact with a corresponding lateral surface (e.g., a left or right lateral side as shown) of the battery pack 130. Each support structure 135 can also form a part of the portion of the lateral surface of the battery pack 130. Each support structure 135 can at least partially be vertically aligned with a corresponding lateral member of the internal frame 115. For example, as depicted, the support structure 135 along the left side can be vertically aligned with the lengthwise lateral member on the left. In addition, the support structure 135 along the right side can be vertically aligned with the lengthwise lateral member on the right. Each support structure 135 can at least partially extend or span outside the interior opening 120 of the bottom region 105. Each support structure 135 can also span or extend to the exterior of the electric vehicle 100 along the bottom region 105. Each support structure 135 can be separated from the exterior from the electric vehicle 100 by the lateral member of the internal frame 115 along the corresponding side. The support structure 135 can have a length ranging between 1800 mm to 2100 mm. The support structure 135 can have a width ranging between 50 mm to 90 mm. The support structure 135 can have a height ranging between 20 mm to 60 mm.

The apparatus 125 can include a set of panels 140 (sometimes referred herein as rocker panels). The set can include a subset of panels 140 along the right side of the electric vehicle 100 and a subset of panels along the right side of the electric vehicle 100 (shown in dotted line box generally along the right). The set of panels 140 can mechanically couple the battery pack 130 to the mounting surface 110 or the lateral members of the internal frame 115 via the set of support structures 135 on the battery pack 130 (shown in dotted line box generally along the left). The set of panels 140 can form a part of the lateral member of the internal frame 115. As part of the internal frame 115, the set of panels 140 can define the interior opening 120 within the bottom region 105 of the electric vehicle 100. Each panel 140 can be arranged or disposed along a corresponding lateral member of the internal frame 115. Each panel 140 can be attached, joined, or otherwise included on the internal frame 115. Each panel 140 can be included within the lateral member of the internal frame 115. Each panel 140 can be disposed or arranged along at least one surface of the lateral member of the internal frame 115. For example, as illustrated, the panel 140 can be disposed or arranged along the bottom surface of the lateral member of the internal frame 115. The shape of the panel 140 can be a prismatic casing with a polygonal base, such as a triangle, square, a rectangular, a pentagon, or a hexagon. The shape of the panel 140 can also be cylindrical casing or cylindrical cell with a circular, ovular, or elliptical base, among others. The panel 140 can have a length ranging between 1800 mm to 2100 mm. The panel 140 can have a width ranging between 65 mm to 105 mm. The panel 140 can have a height ranging between 60 mm to 100 mm.

Each panel 140 can be mechanically coupled with the battery pack 130 via the corresponding the support structure 135. Each panel 140 can be disposed or arranged between the corresponding lateral member of the internal frame 115 and the corresponding support structure 135 of the battery pack 130. Each panel 140 can at least partially be vertically aligned with the corresponding lateral member of the internal frame 115. The panel 140 on the left side can be at least partially aligned with the lateral member of the internal frame 115 on the left side of the electric vehicle 100 within the bottom region 105. The panel 140 on the right side can be at least partially aligned with the lateral member of the internal frame 115 on the right side of the electric vehicle 100 within the bottom region 105. Each panel 140 can at least partially be vertically aligned with the corresponding support structure 135 of the battery pack 130. The panel 140 on the left side can be at least partially aligned with the support structure 135 on the left lateral side of the battery pack 130. The panel 140 on the right side can be at least partially aligned with the support structure 135 on the right lateral side of the battery pack 130.

In the first position 145, the mechanical coupling between the panel 140 and the support structure 135 on the corresponding lateral sides can be in a contracted state to hold the battery pack 130 within the interior opening 120. In addition, the top surface of the battery pack 130 can be in contact or flush with the mounting surface 110 within the bottom region 105 of the electric vehicle 100. A bottom surface of the panel 140 can be in contact or be flush with a top surface of the support structure 135. When part of the lateral member of the internal frame 115, the bottom surface of the panel 140 corresponding to the bottom surface of the lateral member of the internal frame 115 can be in contact or be flush with the top surface of the support structure 135. At least a portion of the lateral side of the battery pack 130 can also be flush with an inner side of the lateral member of the internal frame 115.

Figure 2:
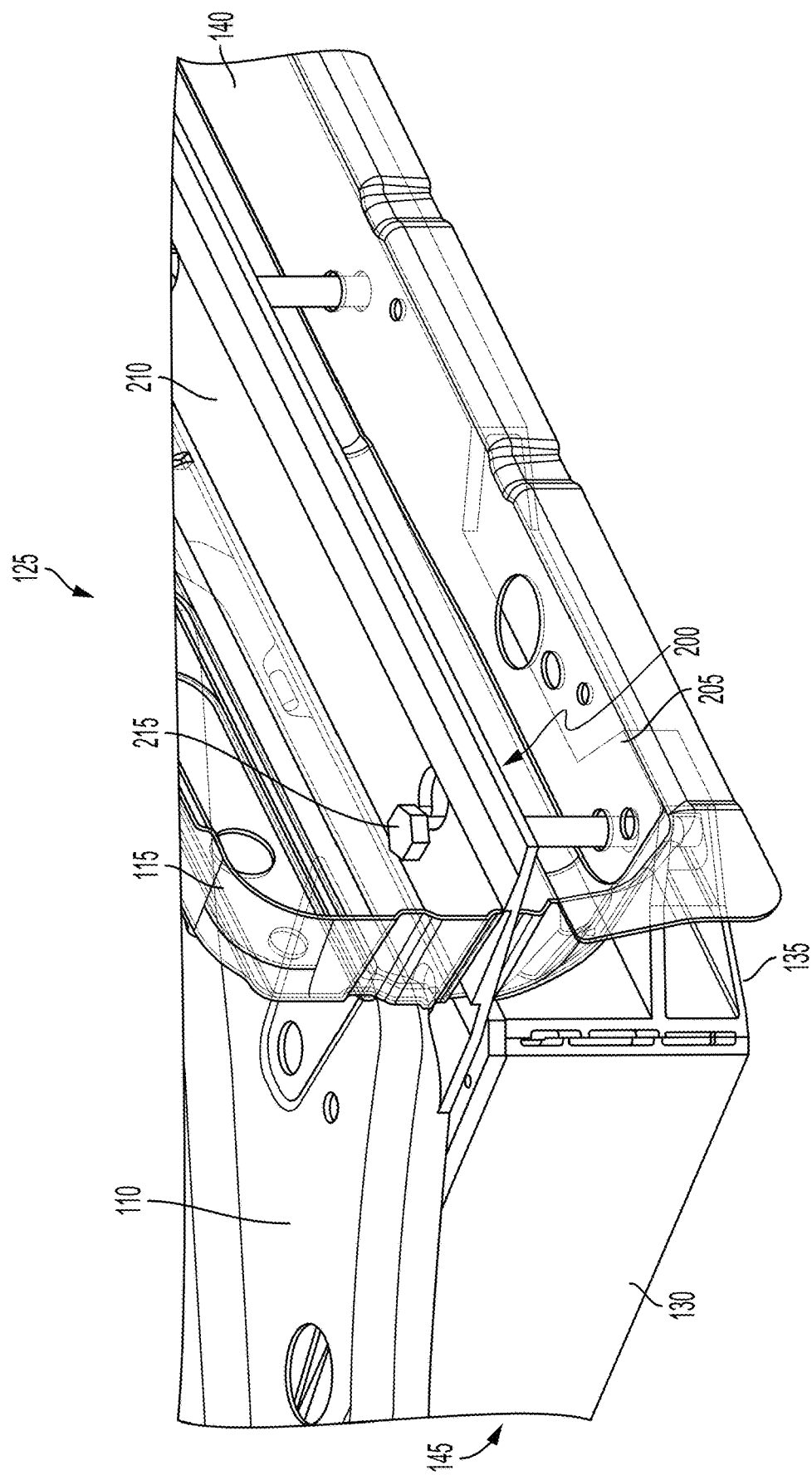
FIG. 2 depicts an isometric view of an interior portion within a bottom region of an electrical vehicle with an example apparatus for providing electrical power to components therein in a first position.

FIG. 2, among others, depicts an isometric view of the interior opening 120 within the bottom region 105 of the electric vehicle 100 with the apparatus 125 for providing electrical power to components therein in the first position 145. As depicted, each panel 140 can be housed within the lateral member of the internal frame 115 spanning one side of the electric vehicle 100 within the bottom region 105. In addition, the panel 140 can laterally span within the lateral member of the internal frame 115 from one side (e.g., front) of the electric vehicle 100 to an opposite side (e.g., rear). As the battery pack 130 is in the first position 145, the top surface of the battery pack 130 can be in contact or flush with the mounting surface 110 defining the interior opening 120 within the bottom region 105. In addition, the top surface of the support structure 135 of the battery pack 130 can be at least partially flush with the bottom surface of the panel 140. At least a portion (e.g., lower portion as shown) of the internal frame 115 housing the panel 140 can also separate the battery pack 130 and the support structure 135 from the exterior of the electric vehicle 100.

Each panel 140 can have at least one top layer 200. The top layer 200 can define a top longitudinal surface of the panel 140 (e.g., for a panel 140 with a rectangular prismatic shape). The top layer 200 can also correspond to a top portion of the panel 140. The top layer 200 can at least partially span across the panel 140. For example, as depicted, the top layer 200 can laterally span across the panel 140 to form the top longitudinal surface of the panel 140. The top layer 200 can be substantially parallel (e.g., within 15% deviation) with the top surface of the battery pack 130. The top layer 200 can be mechanically coupled with the mounting surface 110 within the bottom region 105 of the electric vehicle 100. The top layer 200 can have a length corresponding to the length of the panel 140, and can range between 1775 mm to 2175 mm. The top layer 200 can have a width corresponding to the width of the panel 140, and can range between 65 mm to 105 mm. The top layer 200 can have a thickness ranging between 1 mm to 5 mm.

Each panel 140 can have at least one bottom layer 205. The bottom layer 205 can define a bottom longitudinal surface of the panel 140 (e.g., for a panel 140 with a rectangular prismatic shape). The bottom layer 205 can also correspond to a bottom portion of the panel 140. The bottom layer 205 can at least partially span across the panel 140. For example, as depicted, the bottom layer 205 can laterally span across the panel 140 to form the top longitudinal surface of the panel 140. The bottom layer 205 can be substantially parallel (e.g., within 15% deviation) with the top surface of the battery pack 130. The bottom layer 205 can be substantially parallel (e.g., within 15% deviation) with the top layer 200. With the battery pack 130 in the first position 145, the bottom layer 205 of the panel 140 can be at least partially flush with the top surface of the support structure 135 on the battery pack 130. The bottom layer 205 can have a length corresponding to the length of the panel 140, and can range between 1775 mm to 2075 mm. The bottom layer 205 can have a width corresponding to the width of the panel 140, and can range between 65 mm to 105 mm. The bottom layer 205 can have a thickness ranging between 1 mm to 5 mm. The bottom layer 205 can be separated from the top layer 200. The top layer 200 and the bottom layer 205 can be supported by the inner lateral surface of the lateral member of the internal frame 115 forming the panel 140. The top layer 200 and the bottom layer 205 can have a gap distance separating each other. The gap distance between the top layer 200 and the bottom layer 205 can range between 65 mm to 85 mm. The gap distance can be less than the height of the battery pack 130.

The apparatus 125 can include at least one plate 210 (sometimes referred herein as a washer plate or a trigger plate). The plate 210 can mechanically couple or connect the panel 140 with the mounting surface 110 in the bottom region 105 of the electric vehicle 100. The plate 210 can be situated, arranged, or disposed on the top layer 200 of the panel 140. The plate 210 can rest or be supported by the top layer 200 of the panel 140. The resting of the plate 210 on the top layer 200 of the panel 140 can be slack or loose to allow for mobility of the plate 210 along the top layer 200. A bottom surface of the plate 210 can beat least partially in contact or flush with the top layer 200 of the panel 140. The plate 210 can at least partially span along the top layer 200 of the panel 140. The plate 210 can also at least partially span into the interior opening 120 defined by the lateral members of the internal frame 115 and the mounting surface 110. A longitudinal surface (e.g., top or bottom surface) of the plate 210 can be at least partially flush with the mounting surface 110. The plate 210 can be attached, connected, or otherwise joined to the mounting surface 110 of the electric vehicle 100 within the bottom region 105. The plate 210 can have a length corresponding to the length of the panel 140, and can range between 1775 mm to 2175 mm. The plate 210 can have a width corresponding to the width of the panel 140, and can range between 60 mm to 100 mm. The plate 210 can have a height ranging between 3 mm to 10 mm.

The apparatus 125 can include at least one connecting member 215. The connecting member 215 can mechanically couple the battery pack 130 with the lateral member of the internal frame 115 via the support structure 135, the panel 140, and the plate 210. The connecting member 215 can allow for some amount of planar translation of the battery pack 130, the support structure 135, the panel 140, and the plate 210, among others. The connecting member 215 can include any type of fastener, such as a bolt (e.g., as depicted), a buttery anchor, a clamp, a clasp, a clevis fastener, and a latch, among others. The connecting member 215 can include a mechanical linkage component, such as a hinge, a coil spring, or a ball joint, among others. The connecting member 215 can be attached, joined, or otherwise connected with the support structure 135 on the battery pack 130 on one end. The connecting member 215 can be a part of the support structure 135, and can extend from the top surface of the support structure 135. The connecting member 215 can be connected with the plate 210, the top layer 200 of the panel 140, and the bottom layer 205 of the panel 140. With the battery pack 130 in the first position 145, the connecting member 215 can pass through an opening on the plate 210, an opening on the top layer 200, and an opening on the bottom layer 205.

Figure 3:
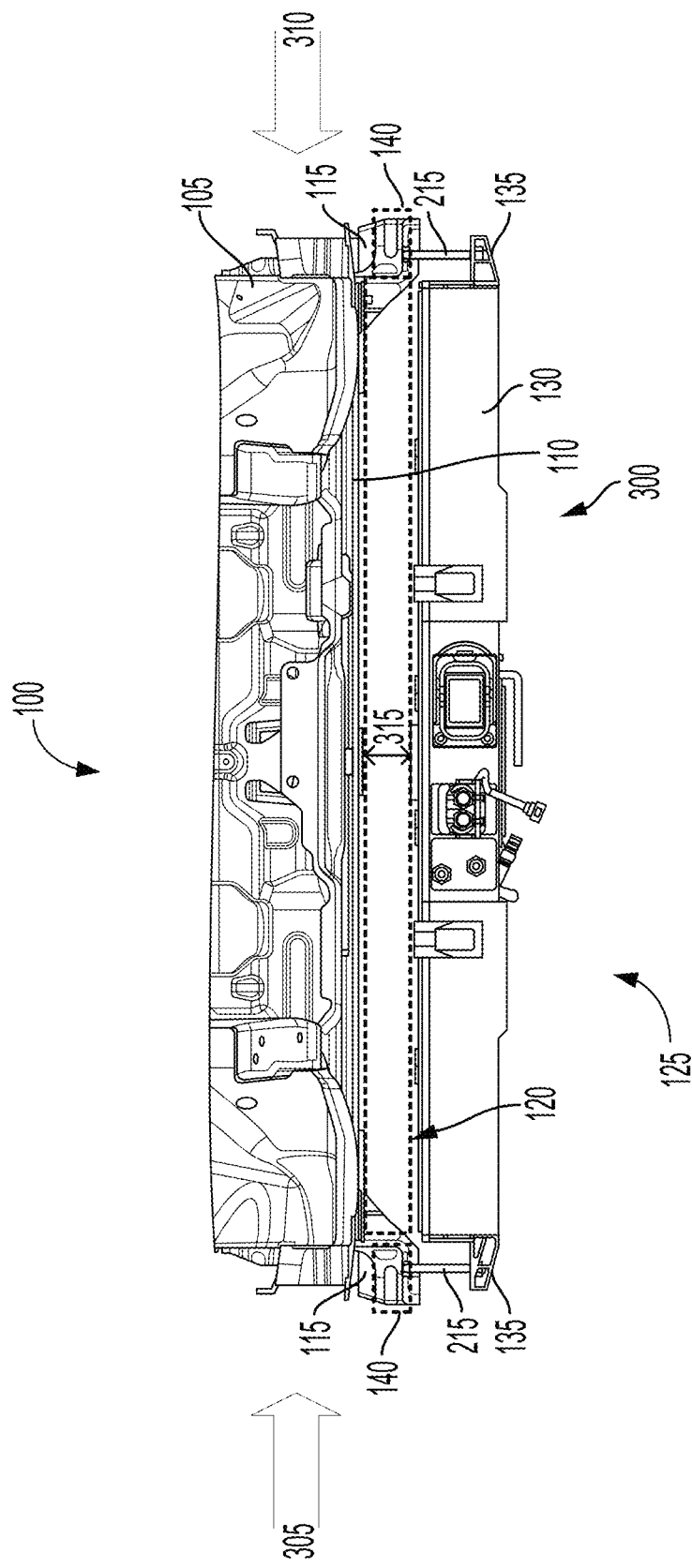
FIG. 3 depicts a cross-sectional view of a bottom region of an electric vehicle with an example apparatus for providing electrical power to components therein in a second position.
Figure 4:
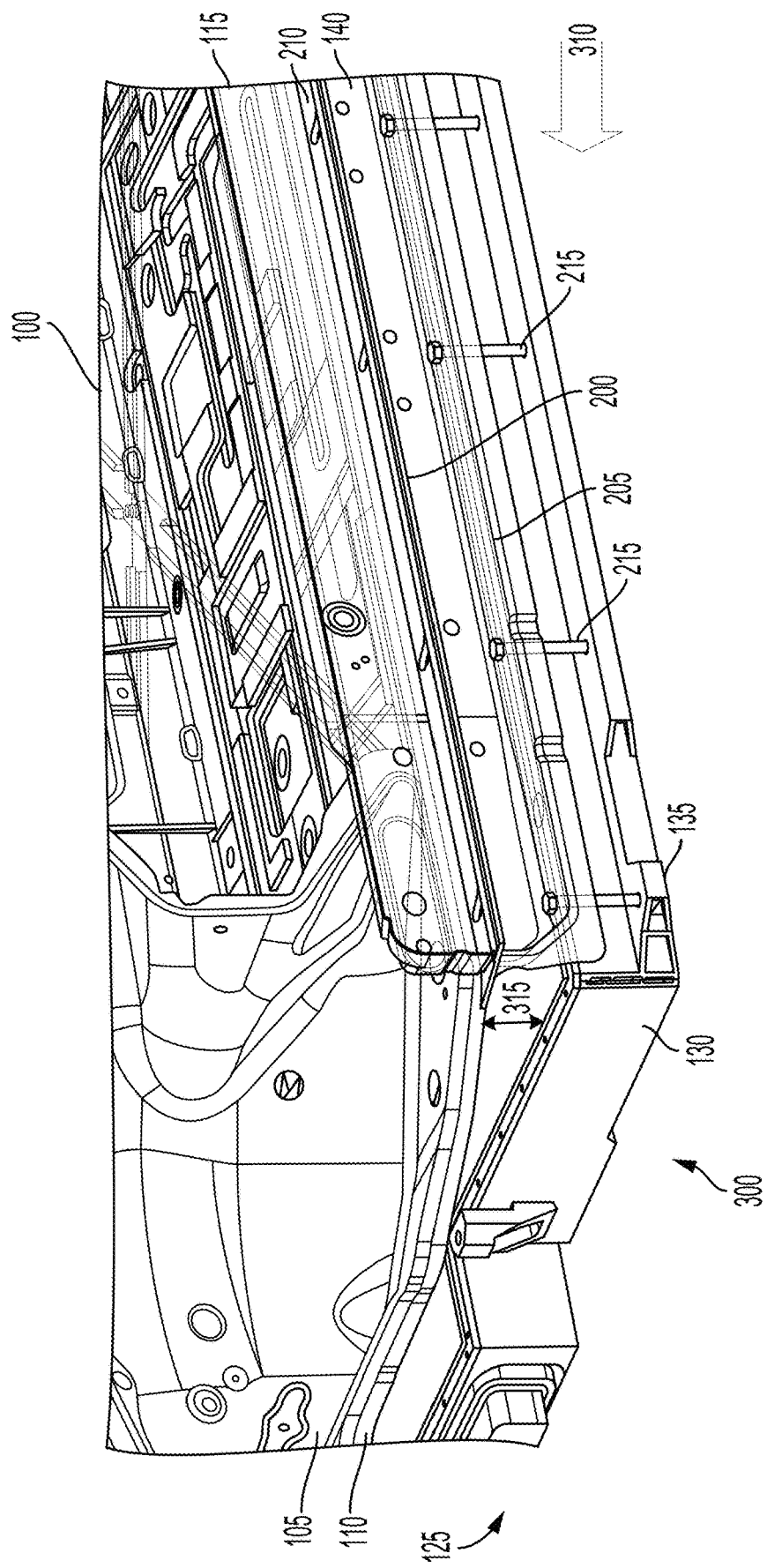
FIG. 4 depicts an isometric view of an interior portion within a bottom region of an electrical vehicle with an example apparatus for providing electrical power to components therein in a second position.

FIGS. 3 and 4, among others, each depict the bottom region 105 of the electric vehicle 100 with the apparatus 125 for providing electrical power to components therein in a second position 300. FIG. 3 presents a cross-sectional view of the bottom region 105. FIG. 4 presents an isometric view of the bottom region 105 from the right-hand side of the electric vehicle 100. As depicted, the battery pack 130 can drop, translate, or otherwise move from the first position 145 to the second position 300 (also referred to as an unloaded position). The transition from the first position 145 to the second position 300 can be in response to a lateral impact 305 on the left side or a lateral impact 310 on the right side of the electric vehicle 100. The lateral impact 305 or 310 can include any application of force onto at least one lateral side (e.g., left or right side) of the electric vehicle 100. The lateral impact 305 or 310 can be at substantially perpendicular (e.g., within 15% deviation) to the corresponding lateral side of the electric vehicle 100. The lateral impact 305 or 310 can also be at an acute or obtuse angle relative to the corresponding lateral side of the electric vehicle 100. For example, an object can strike the electric vehicle 100 at an angle between 15° and 165° relative to the corresponding lateral side. The lateral impact 305 or 310 can also be substantially parallel (e.g., within 15% deviation) to the corresponding lateral side of the electric vehicle 100. For example, an object can graze the corresponding lateral side of the electric vehicle 100. The second position 300 can refer to an arrangement in which the battery pack 130 is outside the interior opening 120 defined by the lateral members of the internal frame 115 and the mounting surface 110. The electric vehicle 100 opposite of the side on which the lateral impact 305 or 310 occurs.

The lateral impact 305 on the left-side of the electric vehicle 100 or the lateral impact 310 on the right-side of the electric vehicle 100 can cause the battery pack 130 to fall on both sides. In response to the lateral impact 305 or 310, the panel 140 and the plate 210 disposed thereon along the corresponding side as the lateral impact 305 or 310 can be forced to move inward to the interior opening 120. To allow for restrained movement in response to the lateral impact 305 or 310, the panel 140 can be malleable or ductile, or both. The material for the panel 140 can include, for example, aluminum, copper, tin, indium, steel, and brass, among others. Depending on the force of the lateral impact 305 or 310 and the ductility of the panel 140, the panel 140 and the plate 210 can be displaced between 15 mm to 35 mm. The panel 140 and the plate 210 disposed on the panel 140 on the same side as the lateral impact 305 or 310 can allow the set of connecting members 215 to descend. The dropping of any one of the connecting members 215 on the panel 140 and the plate 210 on the same side as the lateral impact 305 or 310 can cause the remaining connecting members 215 on the same panel 140 and the plate 210 to descend. With the panel 140 and the plate 210 disposed on the top layer 200 forced to move from the lateral impact 305 or 310, each connecting member 215 can descend, drop, or plunge from the top layer 200 and the plate 210. Once dropped, at least a top end of each connecting member 215 can rest on the bottom layer 205 of the panel 140. In addition, the plunging of the connecting members 215 on the same side as the lateral impact 305 or 310 can cause the connecting members 215 on the opposing side to descend. The panel 140 and the plate 210 disposed on the same side as the lateral impact 305 or 310 can cause the panel 140 and the plate 210 disposed on the opposite side to allow the connecting member 215 to descend. For example, when the lateral impact 310 occurs on the right side of the electric vehicle 100, the panel 140 and the plate 210 on the right side can allow the connecting member 215 to descend, drop, or plunge. The dropping of the connecting member 215 on the right side can cause the panel 140 and the plate 210 on the left side to allow the connecting member 215 to descend. The connecting members 215 on the opposite side as the lateral impact 305 or 310 can plunge subsequent to the connecting members 215 on the same side as the lateral impact 305 or 310.

With the descent of the connecting members 215, the battery pack 130 in the second position 300 may no longer be positioned within the interior opening 120 defined beneath the mounting surface 110 and the lateral members of the internal frame 115. In the second position 300, the battery pack 130 can be disposed or arranged at least partially outside the interior opening 120 defined within the bottom region 105 of the electric vehicle 100. Relative to the first position 145, the top surface of the battery pack 130 may no longer be in contact or flush with the mounting surface 110. Mechanically coupled with the panels 140 each disposed along the corresponding lateral member of the internal frame 115 via the connecting members 215, the battery pack 130 can hang or suspend beneath the mounting surface 110. The top surface of the battery pack 130 can be substantially parallel (e.g., within 15% deviation) of the mounting surface 110 in the bottom region 105 of the electric vehicle 100. The top surface of the battery pack 130 can be separated from the mounting surface 110 by a distance 315. The distance 315 between the top surface of the battery pack 130 and the mounting surface 110 in the second position 300 can range between 65 mm to 105 mm. In this manner, the battery pack 130 can avoid compression brought about by the internal reactive force from the lateral member of the internal frame 115 on the side opposite of the lateral impact 305 or 310.

Figure 5:
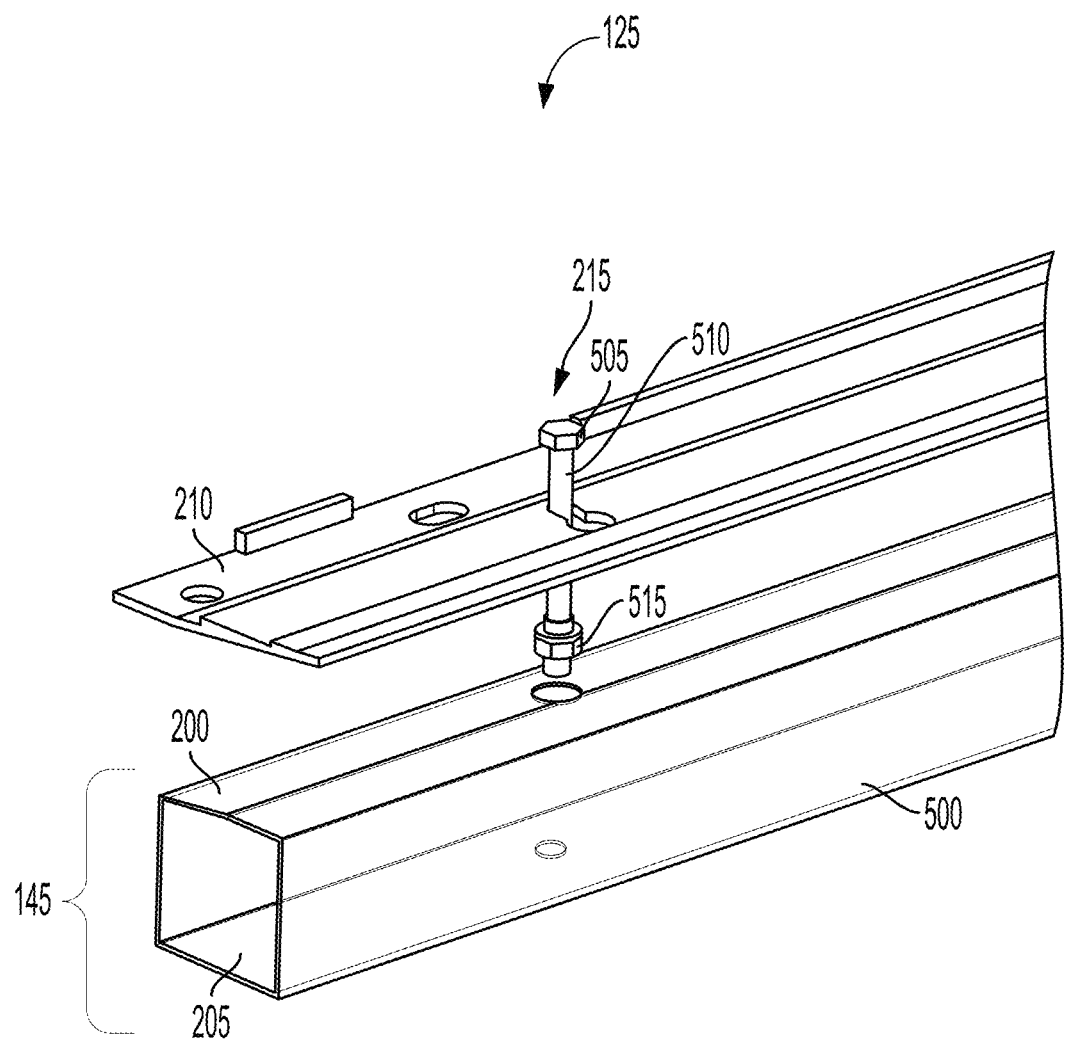
FIG. 5 depicts an exploded perspective, isometric view of an example apparatus for providing electrical power to components of an electric vehicle.

FIG. 5, among others, depicts an exploded perspective, isometric view of an apparatus 125 for providing electrical power to components of the electric vehicle 100. As depicted, the apparatus 125 can include the panel 140 disposed along the lateral member of the internal frame 115 on the corresponding side. The panel 140 can have the top layer 200 and the bottom layer 205. Atop of the top layer 200, the apparatus 125 can include the plate 210. The plate 210 can be situated or arranged on the top layer 200 of the panel 140. The arrangement of the plate 210 atop of the top layer 200 can be loose or slack to allow for mobility of the plate 210 along the top layer 200 of the panel 140. The panel 140 together with the plate 210 can be disposed within or arranged along the lateral member of the internal frame 115 within the bottom region 105 of the electric vehicle 100.

To regulate movement of the plate 210 along the top layer 200, the plate 210 can be arranged or disposed at an angle relative to the top layer 200 of the panel 140. The arrangement or disposition of the plate 210 relative to the top layer 200 of the panel 140 can set a threshold amount of force to apply to cause movement of the plate 210 along the top layer 200. The threshold amount of force can correspond to an amount of force to overcome static friction between the bottom surface of the plate 210 and the top layer 200 of the panel 140. The threshold amount of force can range between 80 kN to 120 kN. An interior edge of the plate 210 toward the interior opening 120 can be at a higher position relative to the top layer 200 than an exterior edge of the plate 210 away from the interior opening 120. When the interior edge is higher than the exterior edge, the angle between the bottom surface of the plate 210 and the top layer 200 can range between 5° to 10°. Conversely, the interior edge of the plate 210 toward the interior opening 120 can be a lower position relative to the top layer 200 than the exterior edge of the plate 210 away from the interior opening 120. When the interior edge is a lower than the exterior edge, the angle between the bottom surface of the plate 210 and the top layer 200 can range between 5° to 10°. With the plate 210 disposed at the angle, the friction between the plate 210 and the top layer 200 can be reduced in response to the lateral impact 305 or 310. The reduction in friction between the plate 210 and the top layer 200 can allow the plate 210 to slide in toward the interior opening 120 of the electric vehicle 100 along the top layer 200 of the panel 140.

The panel 140 can have at least one side wall 500 between the top layer 200 and the bottom layer 205. For example, as depicted, when the shape of the panel 140 is a rectangular prism, the panel 140 can have a side wall 500 on the left side and a side wall 500 on the right side each between the top layer 200 and the bottom layer 205. The side wall 500 can span between the top layer 200 and the bottom layer 205. The side wall 500 of the panel 140 can be disposed or arranged along the lateral member of the internal frame 115 within the bottom region 105 of the electric vehicle 100. The side wall 500 of the panel 140 can have a length corresponding to the length of the panel 140, and can range between 1775 mm to 2075 mm. The side wall 500 of the panel 140 can have a height ranging between 60 mm to 100 mm. The height of the side wall 500 of the panel 140 can be less than the height of the battery pack 130. The height of the side wall 500 can be less than the height of the connecting member 215 to maintain at least a portion of the connecting member 215 within the panel 140. The side wall 500 of the panel 140 can have a thickness ranging between 1 mm to 15 mm.

Each connecting member 215 can include a head portion 505. The head portion 505 can correspond to a top end of the connecting member 215. For examples in which the connecting member 215 is a bolt, the head portion 505 can correspond to a head of a bolt. The head portion 505 can form an integral portion of the connecting member 215. The head portion 505 can also be attached, fastened, or otherwise connected to a remaining portion of the connecting member 215. The head portion 505 can mechanically couple the support structure 135 on the battery pack 130 with the top layer 200, the bottom layer 205, or the plate 210 disposed on the top layer 200. At least a part of the head portion 505 can be in contact with the plate 210, the top layer 200, or the bottom layer 205. The head portion 505 can have any shape. The shape of the head portion 505 can a prism with a polygonal base, such as a triangle, a square, a rectangular, a pentagon, or a hexagon, among others. The shape of the head portion 505 can be a cylinder with a circular (e.g., as depicted), ovular, or elliptical base, among others. The head portion 505 can have a height ranging between 6 mm to 10 mm. The head portion 505 can have a length or a width (or a diameter for circular examples) ranging between 15 mm to 25 mm. The head portion 505 can have a cross-sectional area defined by the length and the width. The cross-sectional area of the head portion 505 can range between 36 $mm^2$ to 100 $mm^2$.

Each connecting member 215 can include a body portion 510. The body portion 510 can correspond to a medial region of the connecting member 215 or to a portion of the connecting member 215 besides the top end corresponding to the head portion 505. For examples in which the connecting member 215 is a bolt, the body portion 510 can correspond to a shank or thread portion (or both) of the bolt. The body portion 510 can be adjacent to and beneath the head portion 505. The body portion 510 can form an integral portion of the connecting member 215. The body portion 510 can also be attached, fastened, or otherwise connected to a remaining portion of the connecting member 215, including the head portion 505. The body portion 510 can mechanically couple the support structure 135 on the battery pack 130 with the top layer 200, the bottom layer 205, or the plate 210 disposed on the top layer 200. At least a part of the body portion 510 can be in contact with the plate 210, the top layer 200, and the bottom layer 205.

The body portion 510 can have any shape, and can match the shape of the head portion 505. The shape of the body portion 510 can a prism with a polygonal base, such as a triangle, a square, a rectangular, a pentagon, or a hexagon, among others. The shape of the body portion 510 can be a cylinder with a circular (e.g., as depicted), ovular, or elliptical base, among others. The body portion 510 can have a height ranging between 85 mm to 105 mm. The body portion 510 can have a length or a width (or a diameter for circular examples) ranging between 8 mm to 20 mm. The width of the body portion 510 can be less than the width of the head portion 505. The body portion 510 can have a cross-sectional area defined by the length and the width. The cross-sectional area of the body portion 510 can range between 64 mm$^2$ to 400 mm$^2$. The cross-sectional area of the body portion 510 can be less than the cross-sectional area of the head portion 505. The difference in the cross-sectional areas between the head portion 505 and the body portion 510 can define a bearing surface on a bottom portion of the head portion 505. The height of the body portion 510 can be greater than the height of the body portion 510. The length of the body portion 510 can also be greater than the height of the side wall 500 to maintain at least a part of the connecting member 215 within the panel 140. In this manner, the connecting member 215 can be guided through the panel 140 to descend from the top layer 200 to the bottom layer 205.

Each connecting member 215 can include a tail portion 515. The tail portion 515 can correspond to a bottom end of the connecting member 215 opposite of the head portion 505. For examples in which the connecting member 215 is a bolt, the tail portion 515 can correspond to a bottom end of the shank portion of the bolt. The tail portion 515 can be adjacent to and beneath the body portion 510 of the connecting member 215. The tail portion 515 can form an integral portion of the connecting member 215. The tail portion 515 can also be attached, fastened, or otherwise connected to a remaining portion of the connecting member 215, including the head portion 505 and the body portion 510. The tail portion 515 can mechanically couple the support structure 135 on the battery pack 130 with the top layer 200, the bottom layer 205, or the plate 210 disposed on the top layer 200 through the body portion 510 and the head portion 505. At least a part of the tail portion 515 can be in contact with the bottom layer 205 (e.g., along the bottom surface of the bottom layer 205). The tail portion 515 can be outside the panel 140. The tail portion 515 can be mechanically coupled or connected to the support structure 135 on the battery pack 130. The tail portion 515 can be a part of the support structure 135 on the battery pack 130 or a component separate from the support structure 135.

The tail portion 515 can have any shape, and can match the shape of the head portion 505 or the body portion 510. The shape of the tail portion 515 can a prism with a polygonal base, such as a triangle, a square, a rectangular, a pentagon, or a hexagon, among others. The shape of the tail portion 515 can be a cylinder with a circular (e.g., as depicted), ovular, or elliptical base, among others. The tail portion 515 can have a height ranging between 6 mm to 10 mm. The tail portion 515 can have a length or a width (or a diameter for circular examples) ranging between 15 mm to 30 mm. The width of the tail portion 515 can be greater than the width of the body portion 510. The tail portion 515 can have a cross-sectional area defined by the length and the width. The cross-sectional area of the tail portion 515 can range between 225 mm$^2$ to 900 mm$^2$. The cross-sectional area of the tail portion 515 can be greater than the cross-sectional area of the body portion 510. The difference in the cross-sectional areas between the body portion 510 and the tail portion 515 can define a stop surface on a top portion of the tail portion 515. The length of the tail portion 515 can be less than the body portion 510.

Figure 6:
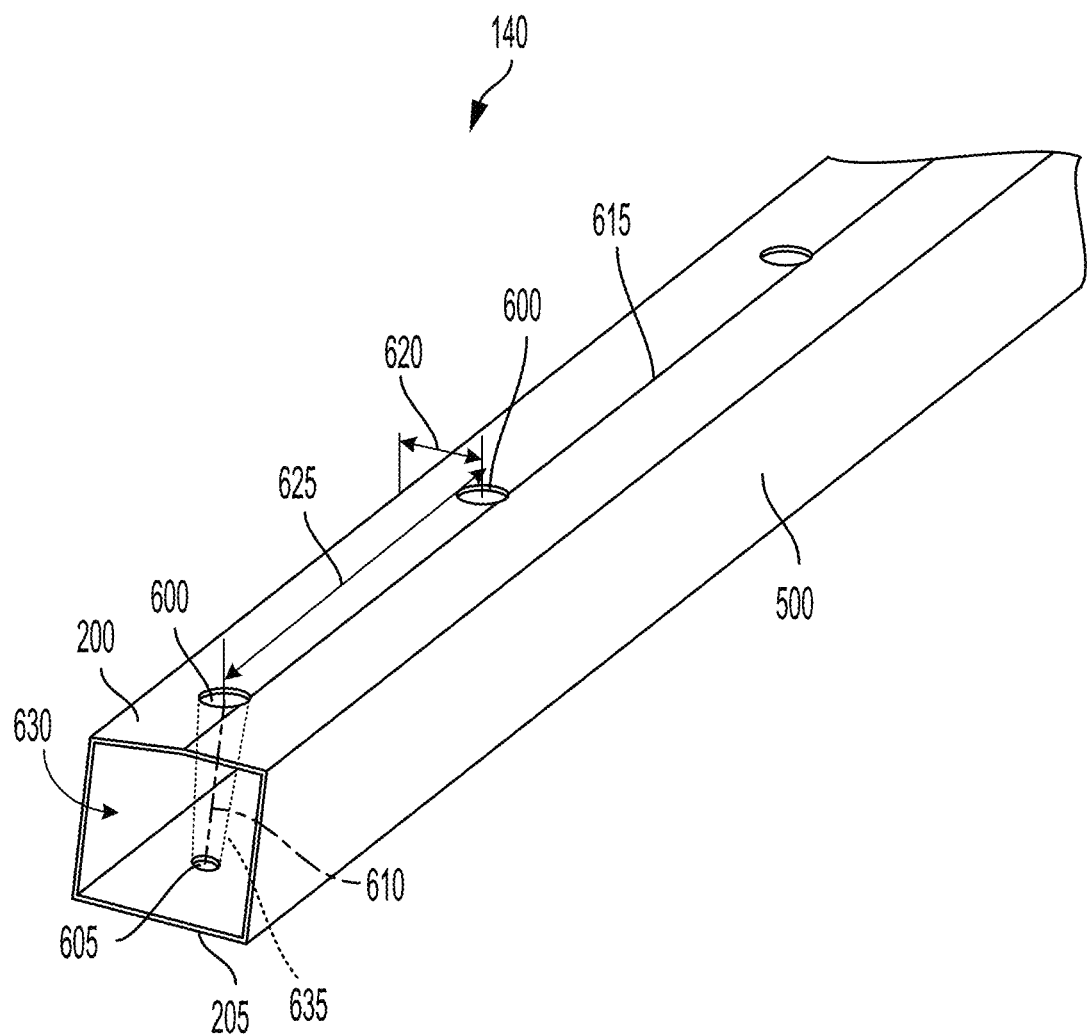
FIG. 6 depicts an isometric view of an example panel of an apparatus for providing electrical power to components of an electric vehicle.

FIG. 6, among others, depicts an isometric view of the panel 140 of the apparatus 125 for providing electrical power to components of the electric vehicle 100. As depicted, the top layer 200 of each panel 140 can define or have a set of openings 600 (sometimes referred herein as a top layer opening). Each opening 600 can be a hole or aperture defined through the top layer 200 of the panel 140. Each opening 600 can hold the head portion 505 and at least a part of the body portion 510 of the connecting member 215 at the top layer 200. Each opening 600 can also pass through the head portion 505 and the body portion 510 of the connecting member 215. Each opening 600 can be of any shape. The shape of each opening 600 can match an outline shape of the head portion 505 or the body portion 510 of the connecting member 215. The shape of each opening 600 can be triangular, rectangular, pentagonal, elliptical, and circular (e.g., as depicted), among others. Each opening 600 can have a length ranging between 15 mm to 35 mm. The length of each opening 600 can be greater than the length of the head portion 505 of the connecting member 215. Each opening 600 can have a width (or a diameter for circular examples) ranging between 15 mm to 35 mm. The width of each opening 600 can be greater than the width (or diameter) of the head portion 505 of the connecting member 215. Each opening 600 can have a cross-sectional area defined by the length and the width. The cross-sectional area of each opening 600 can be greater than the cross-sectional area of the head portion 505 of the connecting member 215 to pass both the head portion 505 and the body portion 510. The cross-sectional area of each opening 600 can range between 225 mm$^2$ to 1225 mm$^2$.

The bottom layer 205 of each panel 140 can define or have a set of openings 605 (sometimes referred herein as a bottom layer opening). Each opening 605 can be a hole or aperture defined through the bottom layer 205 of the panel 140. Each opening 605 can hold the head portion 505 and at least a part of the body portion 510 of the connecting member 215 at the bottom layer 205. Each opening 605 can also pass at least a part of the body portion 510 through the bottom layer 205. Each opening 605 can be of any shape. The shape of each opening 605 can match an outline shape of the body portion 510 of the connecting member 215. The shape of each opening 605 can be triangular, rectangular, pentagonal, elliptical, and circular (e.g., as depicted), among other. Each opening 605 can have a length ranging between 5 mm to 25 mm. The length of each opening 605 can be less than the head portion 505 of the connecting member 215. The length of each opening 605 can be greater than the length of the body portion 510 of the connecting member 215. The length of each opening 605 defined on the bottom layer 205 can be less than the length of each opening 600 defined on the top layer 200. Each opening 605 can have a width (or a diameter for circular examples) ranging between 5 mm to 25 mm. The width of the opening 605 can be less than the head portion 505 of the connecting member 215 to hold the head portion 505. The width of each opening 605 can be greater than the width (or diameter) of the body portion 510 of the connecting member 215 to pass the body portion 510. The width of each opening 605 defined on the bottom layer 205 can be less than the width of each opening 600 defined on the top layer 200. Each opening 605 can have a cross-sectional area defined by the length and the width. The cross-sectional area of each opening 605 can be less than the cross-sectional area of the head portion 505 of the connecting member 215 and greater than the cross-sectional area of the body portion 510 to pass the body portion 510.

The set of openings 600 defined on the top layer 200 and the set of openings 605 defined on the bottom layer 205 can be vertically aligned with each other. Each opening 600 defined on the top layer 200 can be positioned or situated over one of the openings 605 defined on the bottom layer 205. When the opening 600 on the top layer 200 is positioned directly over the opening 605 on the bottom layer 205 (e.g., as depicted), the lateral offset distance can be zero. The positioning of each opening 600 on the top layer 200 over one of the openings 605 on the bottom layer 205 can define a vertical alignment 610. The vertical alignment 610 can correspond to a longitudinal axis spanning between the corresponding opening 600 on the top layer 200 and the corresponding opening 605 on the bottom layer 205. The vertical alignment 610 can have a distance corresponding to the height of the side wall 500, and can range between 70 mm to 90 mm. The vertical alignment 610 can be at an angle relative to the top layer 200 or the bottom layer 205 of the panel 140. The angle defined between the vertical alignment 610 and one of the top layer 200 or the bottom layer 205 can range between 80° to 100°. Along the vertical alignment 610 between each opening 600 on the top layer 200 and each opening 605 on the bottom layer 205, the opening 600 of the top layer 200 can at least partially overlap with the opening 605 of the bottom layer 205. Conversely, the opening 605 of the bottom layer 205 can at least partially overlap with the opening 600 defined on the top layer 200.

The set of openings 600 defined on the top layer 200 and the set of openings 605 defined on the bottom layer 205 can be horizontally aligned about a lateral axis 615 defined along the panel 140. The set of openings 600 defined on the top layer 200 can have a lateral offset distance 620 relative to at least one side wall 500. The lateral offset distance 620 can be defined substantially orthogonal (e.g., with 15% deviation) to the lateral axis 615. The lateral offset distance 620 can be measured between one opening 600 (e.g., at the centroid of the cross-sectional area) to one of the side walls 500. The lateral offset distance 620 of the set of openings 600 on the top layer 200 can range between 25 mm to 35 mm. The lateral offset distance 620 can differ between at least two of the openings 600 defined on the top layer 200. Vertically aligned with the set of openings 600 defined on the top layer 200, the set of openings 605 defined on the bottom layer 205 can also be horizontally aligned about the lateral axis 615 defined along the panel 140. Furthermore, the set of openings 605 defined on the bottom layer 205 can have the lateral offset distance 620 relative to at least one side wall 500. The lateral offset distance 620 can be defined substantially orthogonal (e.g., with 15% deviation) to the lateral axis 615. The lateral offset distance 620 can be measured between one opening 605 (e.g., at the centroid of the cross-sectional area) to one of the side walls 500. The lateral offset distance 620 for the set of openings 605 on the bottom layer 205 can range between 25 mm to 35 mm. The lateral offset distance 620 can differ between at least two of the openings 605 defined on the bottom layer 205. The lateral offset distance 620 for the set of openings 605 on the bottom layer 205 can be the same or can differ from the lateral offset distance 620 of the set of openings 600 on the top layer 200. The lateral offset distance 620 can differ between at least two of the openings 605 defined on the bottom layer 205.

The set of openings 600 defined on the top layer 200 can be separated or spaced out by an interval distance 625 along the top layer 200. The interval distance 625 can be measured between one opening 600 to another opening 600 (e.g., at the centroids of the cross-sectional area). The interval distance 625 defined on the top layer 200 can range between 330 mm to 370 mm. The interval distance 625 can differ between pairs of openings 600 along the top layer 200. Aligned with the set of openings 600 on the top layer 200, the set of openings 605 define along the bottom layer 205 can also be separated or spaced out by the interval distance 625. The interval distance 625 for the set of openings 605 defined on the bottom layer 205 can be the same or can differ from the interval distance for the set of openings 600 defined on the top layer 200. The interval distance 625 can be measured between one opening 605 to another opening 605 (e.g., at the centroids of the cross-sectional area). The interval distance 625 for the set of openings 605 defined on the bottom layer 205 can range between 330 mm to 370 mm.

Each panel 140 can define or have an interior region 630. The top layer 200, the bottom layer 205, and the side walls 500 can define the interior region 630. The interior region 630 can correspond to a hollow volume laterally spanning the panel 140, and can be defined by the top layer 200, the bottom layer 205, and the side walls 500 of the panel 140. Corresponding to the hollow volume, the interior region 630 can allow the head portion 505 and the body portion 510 of the connecting member 215 to span and pass through the top layer 200 and the bottom layer 205 within the panel 140. The interior region 630 can also correspond to a solid portion of the panel 140 extending throughout the panel 140. Corresponding to the solid portion, the edges of the interior region 630 can correspond to or be defined by the top layer 200, the bottom layer 205, and the side walls 500 of the panel 140. The interior region 630 can define a set of apertures 635 635 for the set of openings 600 defined along the top layer 200 and the set of openings 605 defined along the bottom layer 205. Each aperture 635 can correspond to a hole extending from one opening 600 on the top layer 200 to the corresponding opening 605 on the bottom layer 205 through the vertical alignment 610. Each aperture 635 can have a gradient length and a gradient width along the vertical alignment 610. The gradient length of each aperture 635 can range from the length of the opening 600 on the top layer 200 to the length of the opening 605 on the bottom layer 205. The gradient width each aperture 635 can range from the width of the opening 600 on the top layer 200 to the width of the opening 605 on the bottom layer 205. Each aperture 635 can have a gradient cross-sectional area. The cross-sectional area of each aperture 635 can range from the cross-sectional area of the opening 600 on the top layer 200 to the cross-sectional area of the opening 605 on the bottom layer 205.

Figure 7:
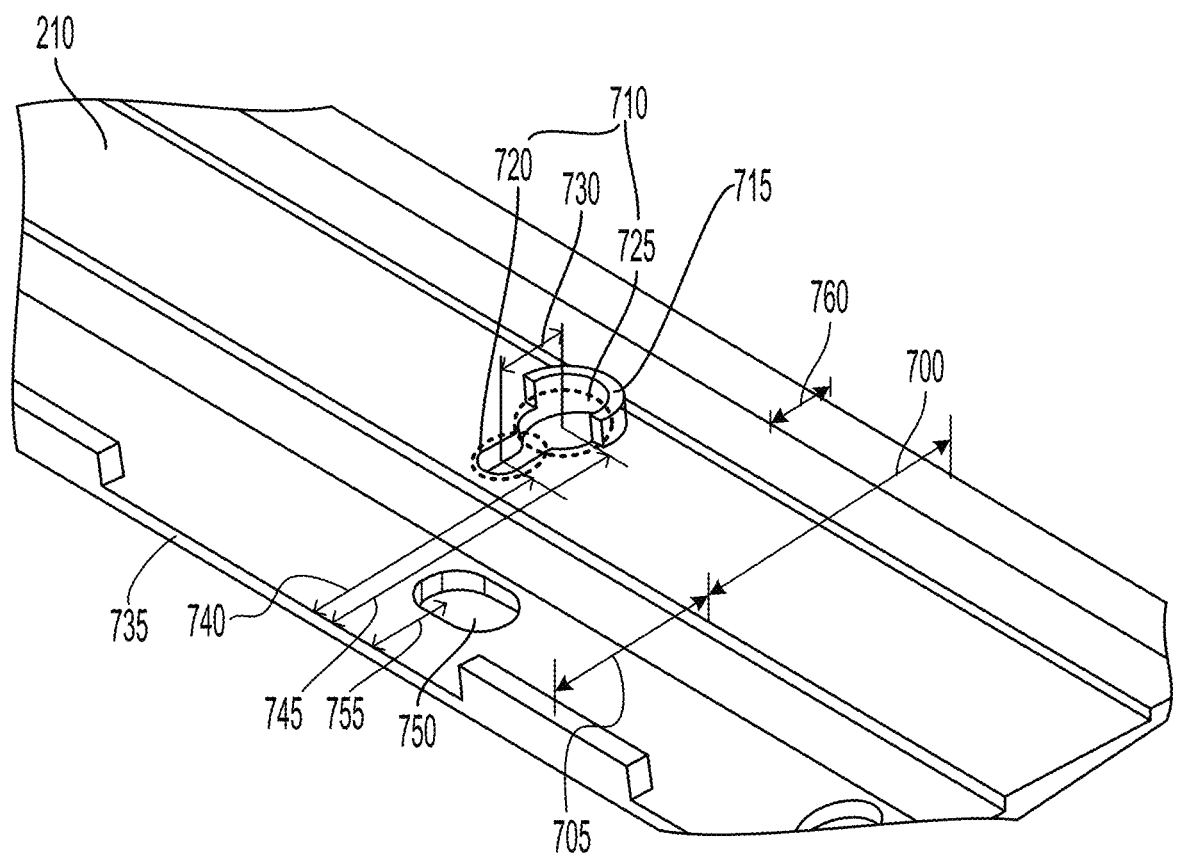
FIG. 7 depicts an isometric view of an example plate of an apparatus for providing electrical power to components of an electric vehicle.

FIG. 7, among others, depicts an isometric view of the plate 210 of the apparatus 125 for providing electrical power to components of the electric vehicle 100. As depicted, the plate 210 can have at least one first section 700 (sometimes referred herein as an exterior section). The first section 700 can correspond to a portion of the plate 210 disposed or arranged on the top layer 200 of the panel 140. The first section 700 can span the top layer 200 of the panel 140. The first section 700 can rest or can be supported by the top layer 200 of the panel 140. The first section 700 of the plate 210 can be mechanically coupled with the panel 140 and the support structure 135 on the battery pack 130 via the connecting member 215. At least a portion of the first section 700 can be in contact with the top layer 200 of the panel 140. The first section 700 can have a portion 760 free of contact from the top layer 200 of the panel 140. The contact between the first section 700 and the top layer 200 can be at an angle. The angle of the first section 700 on the top layer 200 can be defined relative to the top surface of the top layer 200 of the panel 140. The first section 700 can be disposed or can reside toward the exterior of the electric vehicle 100 within the bottom region 105. At least one edge of the first section 700 can be in contact or can be connected to the corresponding lateral member of the internal frame 115 of the electric vehicle 100. The first section 700 can have a length corresponding to the length of the plate 210, and can range between 1800 mm to 2200 mm. The first section 700 can have a width ranging between 70 mm to 90 mm. The portion 760 of the first section 700 can have a width ranging between 10 mm to 20 mm. The first section 700 can have a thickness corresponding to the thickness of the plate 210, and can range between 2 mm to 6 mm. The thickness of the first section 700 can vary along the top layer 200 of the panel 140.

The first section 700 of the plate 210 can define or include a set of openings 710 (sometimes referred herein as plate openings). Each opening 710 can be a hole or aperture defined through the plate 210 in the first section 700. Each opening 710 can hold or pass the connecting member 215 extending from the panel 140 disposed beneath the plate 210. The set of openings 710 defined on the plate 210 can be horizontally aligned about an interior edge 735 of the plate 210. The interior edge 735 can correspond to a side of the plate 210 towards the interior opening 120 within the bottom region 105 of the electric vehicle 100. With the plate 210 arranged on the top layer 200 of the panel 140, the set of openings 710 of the plate 210 can be vertically aligned with the set of openings 600 defined on the top layer 200. In addition, the set of openings 710 defined on the panel 140 can be vertically aligned with the set of openings 605 defined on the bottom layer 205. Each opening 710 defined on the plate 210 can be aligned with the corresponding opening 600 on the top layer 200 and the corresponding opening 605 on the bottom layer 205. Along a longitudinal axis of the panel 140 (e.g., the vertical alignment 610), each opening 710 can at least partially overlap with the corresponding opening 600 of the top layer 200 and the corresponding opening 605 of the bottom layer 205.

Along at least one side of the opening 710, the first section 700 can have at least one lip structure 715. For example, as illustrated, the lip structure 715 can correspond to a half-circular, hollow cylindrical component on the plate 210 next to the opening 710. The lip structure 715 itself can also at least partially define the opening 710. The lip structure 715 can be formed from or can be part of the plate 210. The lip structure 715 can extend from a top surface of the first section 700 of the plate 210. The lip structure 715 can control or regulate movement of the connecting member 215 within the opening 710. As the battery pack 130 moves from the first position 145 to the second position 300 in response to lateral impact 305 or 310, the lip structure 715 can guide the head portion 505 of the connecting member 215 through the opening 710. The lip structure 715 can be of any shape. The shape of the lip structure 715 can be prismatic with a partial polygonal base, such as a triangle, a square, a rectangle, a pentagon, or a hexagon. The shape of the lip structure 715 can also be half-cylindrical with a circular, ovular, or elliptical base, among others. The lip structure 715 can have a length ranging between 20 mm to 50 mm. The lip structure 715 can have a width ranging between 15 mm to 35 mm. The lip structure 715 can have a height ranging between 5 mm to 15 mm.

Each opening 710 can be divided into at least one first region 720 and at least one second region 725. The first region 720 of each opening 710 defined through the plate 210 can be a hole or aperture passing through the plate 210 in the first section 700. The first region 720 can support the head portion 505 of the connecting member 215 onto the top surface of the plate 210. The first region 720 of each opening 710 can pass the body portion 510 of the connecting member 215. The first region 720 of the opening 710 can be vertically aligned with the corresponding opening 600 defined on the top layer 200. The first region 720 of the opening 710 can be vertically aligned with the opening 605 positioned below the opening 600 and defined on the bottom layer 205. The first region 720 in each opening 710 can be of any shape. The shape of the first region 720 can match the shape of the outline shape of the head portion 505 or the body portion 510 of the connecting member 215. The shape of the first region 720 can be triangular, rectangular, pentagonal, elliptical, and circular (e.g., as depicted), among others. The first region 720 can have a length ranging between 10 mm to 20 mm. The first region 720 can have a width ranging between 10 mm to 20 mm. The first region 720 can have a cross-sectional area defined by the length and the width. The cross-sectional area of the first region 720 can range between 100 mm$^2$ to 400 mm$^2$. The cross-sectional area of the first region 720 can be less than the cross-sectional area of the head portion 505 of the connecting member 215. The cross-sectional area of the first region 720 can be greater than the cross-sectional area of the body portion 510 of the connecting member 215 to pass the body portion 510. In this manner, when positioned in the first region 720, the head portion 505 of the connecting member 215 can be supported by the plate 210 about the first region 720 of the interior opening 120 along the bearing surface of the head portion 505.

The second region 725 of each opening 710 defined through the plate 210 can be a hole or aperture passing through the plate 210 in the first section 700. The second region 725 of each opening 710 defined through the plate 210 can be a hole or aperture passing through the plate 210 in the first section 700. The second region 725 can pass both the head portion 505 and the body portion 510 of the connecting member 215 through the plate 210. The second region 725 of the opening 710 can be vertically aligned with the corresponding opening 600 defined on the top layer 200. The second region 725 of the opening 710 can be also vertically aligned with the opening 605 positioned below the opening 600 and defined on the bottom layer 205. The second region 725 can be adjacent to or contiguous with the first region 715 within the opening 710. The aperture formed in the plate 210 in the first region 720 of each opening 710 can continue into the aperture formed in the plate 210 in the second region 725 of each opening 710. With both contiguous with each other, the opening 710 can allow shifting or lateral movement of the connecting member 215 from the first region 720 onto the second region 725. A centroid of the second region 725 can be separated from a centroid of the first region 720 at a distance 730. The distance 730 between the centroid of the first region 720 and the centroid of the second region 725 can range between 10 mm to 30 mm.

The second region 725 in each opening 710 can be of any shape. The shape of the second region 725 can match the shape of the outline shape of the head portion 505 or the body portion 510 of the connecting member 215. The shape of the second region 725 can be triangular, rectangular, pentagonal, elliptical, and circular (e.g., as depicted), among others. The second region 725 can have a length ranging between 15 mm to 35 mm. The length of the second region 725 can be greater than the length of the first region 720. The second region 725 can have a width ranging between 15 mm to 35 mm. The width of the second region 725 can be greater than the width of the first region 720. The second region 725 can have a cross-sectional area defined by the length and the width. The cross-sectional area of the second region 725 can range between 225 mm$^2$ to 1225 mm$^2$. The cross-sectional area of the second region 725 can be greater than the cross-sectional area of the first region 720. The cross-sectional area of the second region 725 can be greater than the cross-sectional area of the head portion 505 of each connecting member 215. The cross-sectional area of the second region 725 can be greater than the cross-sectional area of the body portion 510 of the connecting member 215 to pass the body portion 510. In this manner, when positioned in the second region 725, both the head portion 505 and the body portion 510 of the connecting member 215 can pass through the plate 210.

The set of openings 710 in the first section 700 can be horizontally aligned about a lateral edge (e.g., the interior edge 735) of the plate 210. The first region 720 of each opening 710 can have an offset distance 740 relative to the interior edge 735. The offset distance 740 can be measured from the interior edge 735 to the centroid of the first region 720 in each opening 710. The offset distance 740 relative to the interior edge 735 can range between 65 mm to 85 mm. The offset distance 740 can differ between at least two of the openings 710 defined in the first section 700 of the plate 210. The second region 725 of each opening 710 can also have an offset distance 745 relative to the interior edge 735. The offset distance 745 can be measured from the interior edge 735 to the centroid of the second region 725 in each opening 710. The offset distance 745 can range between 90 mm to 110 mm. The offset distance 745 can differ between at least two of the openings 710 defined in the first section 700 of the plate 210. The offset distance 740 for the first region 720 can be greater than the offset distance 745 for the second region 725. With the offset distance 740 greater than the offset distance 745, the first region 720 can be farther away from the interior opening 120 of the electric vehicle 100 than the second region 725. In contrast, the offset distance 740 for the first region 720 can be less than the offset distance 745 for the second region 725 (e.g., as depicted). With the offset distance 740 less than the offset distance 745, the first region 720 can be closer to the interior opening 120 of the electric vehicle 100 than the second region 725. In addition, aligned with the set of openings 600 of the top layer 200 and the set of openings 605 of the bottom layer 205, the set of openings 710 can be separate or spaced out by a distance substantially similar (e.g., within 15% deviation) to the interval distance 625. The interval distance 625 can be measured between one opening 710 to another opening 710 (e.g., at the centroids of the cross-sectional area). The interval distance for the set of openings 710 defined on the top layer 200 can range between 330 mm to 370 mm.

The plate 210 can have at least one second section 705 (sometimes referred herein as the interior section). The second section 705 can correspond to a portion of the plate 210 disposed or arranged on at least a portion of the top surface of the battery pack 130. The second section 705 can rest or can be supported by the top surface of the battery pack 130. The second section 705 can correspond to the portion of the plate 210 disposed, arranged, or in contact with the mounting surface 110 of the electric vehicle 100. The second section 705 can be mechanically coupled with mounting surface 110 of the electric vehicle 100. The mechanically coupling between the second section 705 of the plate 210 and the mounting surface 110 can be using a fastener, such as a screw, a bolt, a buttery anchor, a clamp, a clasp, a clevis fastener, or a latch, among others. The second section 705 can have a length corresponding to the length of the plate 210, and can range between 1800 mm to 2200 mm. The second section 705 can have a width corresponding to a portion of the width of the plate 210, and can range between 45 mm to 75 mm. The second section 705 can have a thickness corresponding to the thickness of the plate 210, and can range between 2 mm to 8 mm. The thickness of the second section 705 can vary throughout.

The second section 705 of the plate 210 can define or include a set of slots 750. Each slot 750 can be a hole or aperture defined through the plate 210 in the second section 705 to hold or support a fastener to mechanically couple the second section 705 to the mounting surface 110 of the electric vehicle 100. Each slot 750 can extend from a top surface of the plate 210 in the second section 705 to a lateral surface of the mounting surface 110. The lateral surface can correspond to a top side or a bottom side of the mounting surface 110 within the bottom region 105 of the electric vehicle 100. Each slot 750 can extend from the top surface of the plate 210 in the second section 705 to the top surface of the battery pack 130 disposed beneath the second section 705 in the interior opening 120 defined in the bottom region 105 of the electric vehicle 100. Each slot 750 can be of any shape. The shape of each slot 750 can be triangular, rectangular, pentagonal, elliptical (e.g., as depicted), and circular, among others. Each slot 750 can have a length ranging between 5 mm to 25 mm. Each slot 750 can have a width (or a diameter for circular examples) ranging between 10 mm to 30 mm. Each slot 750 can have a cross-sectional area defined by the length and the width. The cross-sectional area of each slot 750 can range between 550 mm$^2$ to 750 mm$^2$. The set of slots 750 in the second section 705 can be horizontally aligned about the lateral edge (e.g., the interior edge 735) of the plate 210. The slot 750 can have an offset distance 755 relative to the interior edge 735. The offset distance 755 can be measured from the interior edge 735 to the centroid of the slot 750. The offset distance 755 relative to the interior edge 735 can range between 70 mm to 110 mm. The offset distance 755 can differ between at least two of the slots 750 defined in the second section 705 of the plate 210. The set of slots 750 can also be separated or spaced out by an interval distance along the plate 210. The interval distance can differ between pairs of the slots 750. The interval distance of the set of slots 750 can range between 1400 mm to 1800 mm.

Figure 8:
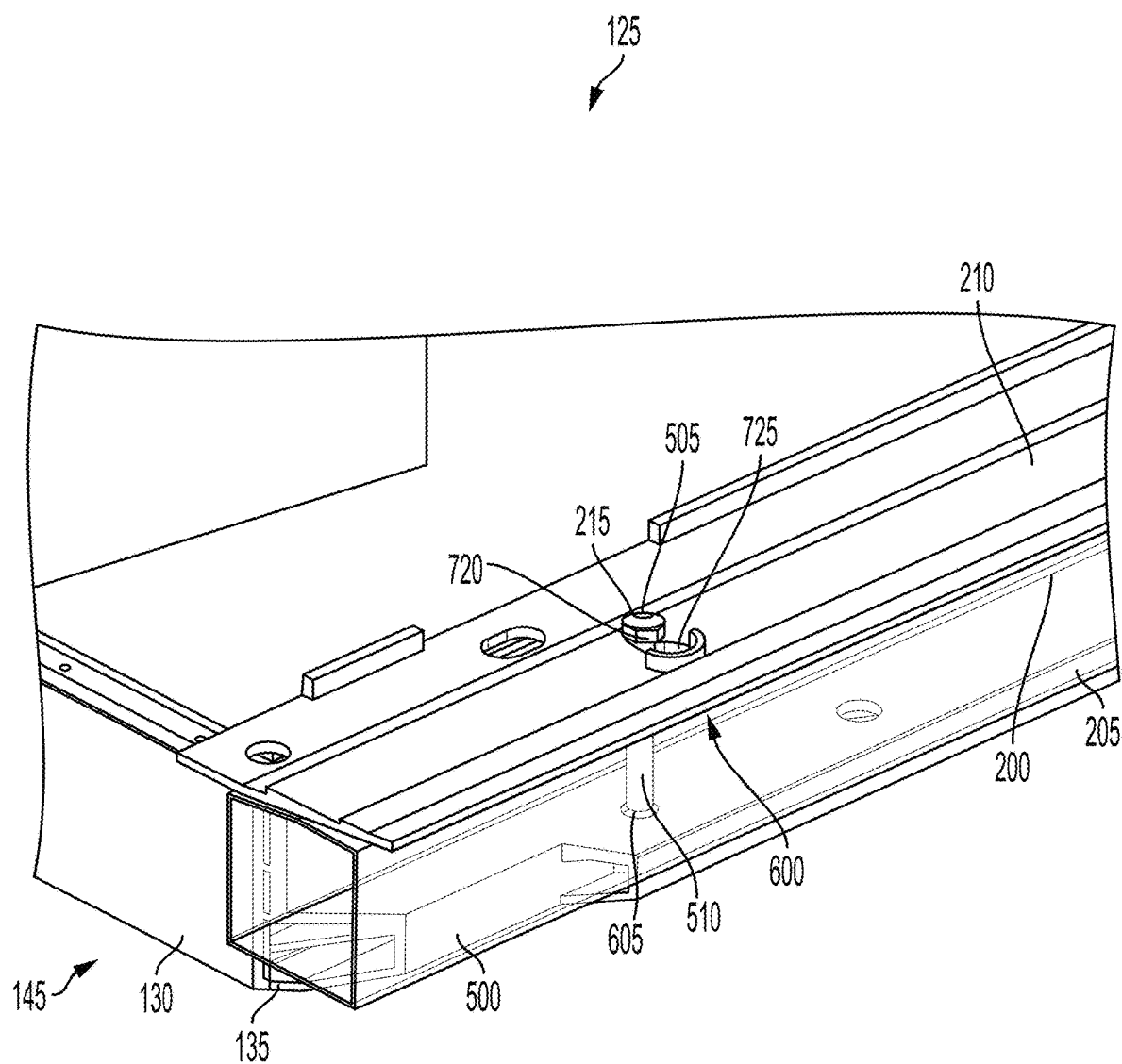
FIG. 8 depicts an isometric view of an example apparatus for providing electrical power to components of an electric vehicle with a connecting member on a top layer of a panel in an initial position prior to a lateral impact.

FIG. 8, among others, depicts an isometric view of the apparatus 125 for providing electrical power to components of the electric vehicle 100 with the connecting member 215 on the top layer 200 of the panel 140 in an initial position prior to the lateral impact 305 or 310. As depicted, the battery pack 130 can be in the first position 145, and can be disposed at least partially within the interior opening 120 in the bottom region 105 of the electric vehicle 100. In addition, the top surface of the battery pack 130 can be flush or in contact with the mounting surface 110 of the electric vehicle 100 within the bottom region 105. The top surface of the battery pack 130 can also be partially flush or in contact with a bottom surface of the panel 140. The lateral surface of the battery pack 130 can be flush with one of the side walls 500 of the panel 140. The top surface of the support structure 135 on the lateral surface of the battery pack 130 can be flush or in contact with the bottom layer 205 of the panel 140. The battery pack 130 can be mechanically coupled to the plate 210, the top layer 200 of the panel 140, and the bottom layer 205 of the panel 140 via the connecting members 215.

In holding the battery pack 130 in the first position 145, each connecting member 215 can extend from the plate 210 and through the panel 140. Each connecting member 215 can pass through the first region 720 of one opening 710 on the plate 210. The head portion 505 of the connecting member 215 can be supported by the top surface of the plate 210 about the opening 710. The body portion 510 of each connecting member 215 can span through the first region 720 of the opening 710. Each connecting member 215 can also pass through the opening 600 on the top layer 200 aligned with the first region 720 of the opening 710 on the plate 210. The body portion 510 of each connecting member 215 can span through the opening 600. Furthermore, each connecting member 215 can pass through the opening 605 on the bottom layer 205 aligned with the opening 600 on the top layer 200 and the first region 720 of the opening 710 on the plate 210. The body portion 510 of each connecting member 215 can pass through the opening 605 defined on the bottom layer 205 of the panel 140. The stop surface of the tail portion 515 of the connecting member 215 can be flush or in contact with the bottom surface of the bottom layer 205 of the panel 140.

Figure 9:
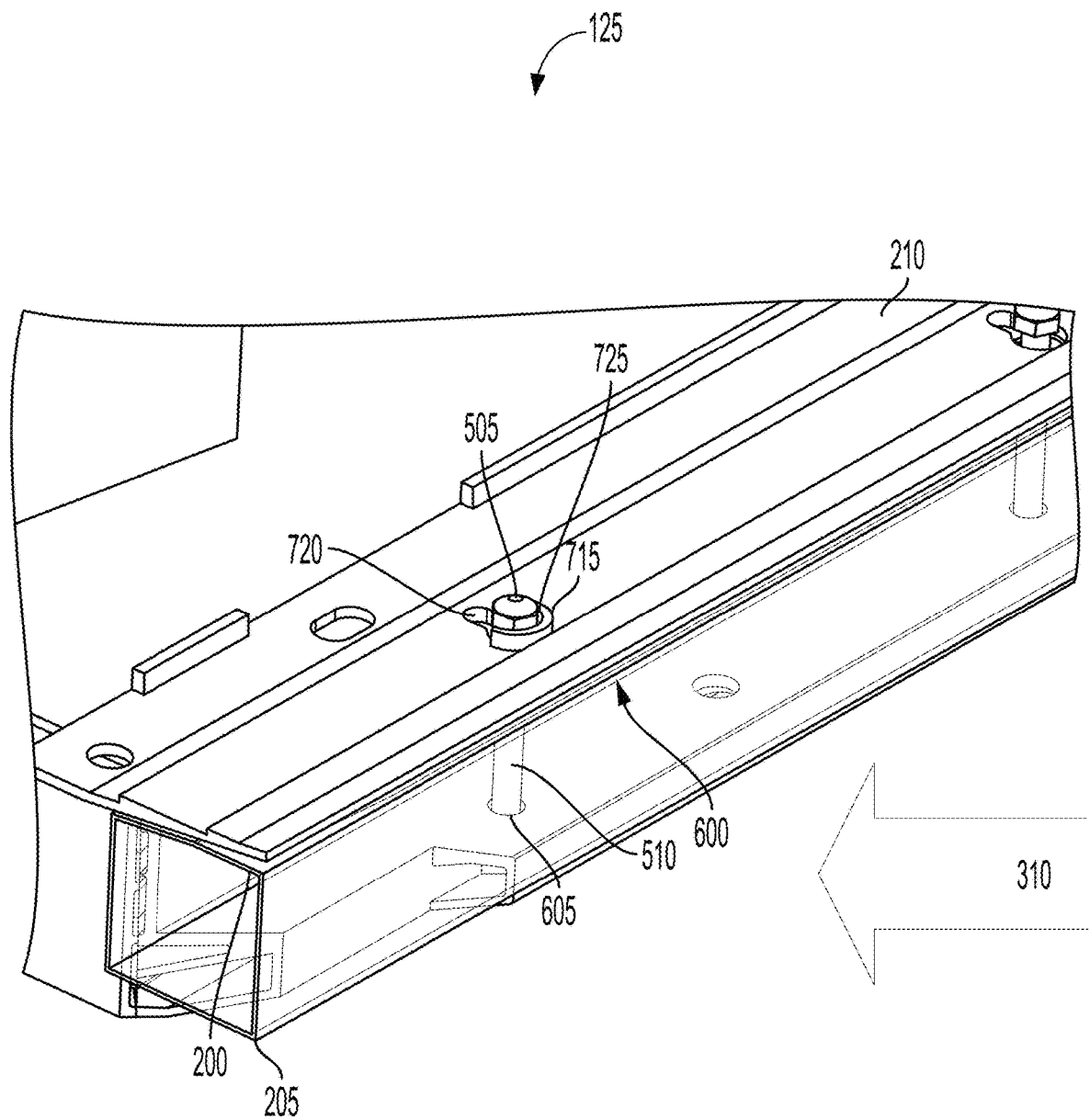
FIG. 9 depicts an isometric view of an example apparatus for providing electrical power to components of an electric vehicle with a connecting member on a top layer of a panel shifted to a subsequent position in response to a lateral impact.

FIG. 9, among others, depicts an isometric view of the apparatus 125 for providing electrical power to components of the electric vehicle 100 with the connecting members 215 on the top layer 200 of the panel 140 shifted to a subsequent position in response to the lateral impact 305 or 310. As depicted, the battery pack 130 can be in transition from the first position 145 to the second position 300 in response to the lateral impact 305 or 310 on the electric vehicle 100. The transition from the first position 145 to the second position can occur in a matter of seconds (e.g., up to 15 seconds). During at least a portion of the transition, the battery pack 130 can still disposed at least partially within the interior opening 120 in the bottom region 105 of the electric vehicle 100. In addition, the top surface of the battery pack 130 can be flush or in contact with the mounting surface 110 of the electric vehicle 100 within the bottom region 105. The top surface of the battery pack 130 can also be partially flush or in contact with a bottom surface of the panel 140. The lateral surface of the battery pack 130 can be flush with one of the side walls 500 of the panel 140. The top surface of the support structure 135 on the lateral surface of the battery pack 130 can be flush or in contact with the bottom layer 205 of the panel 140. The battery pack 130 can be mechanically coupled to the plate 210, the top layer 200 of the panel 140, and the bottom layer 205 of the panel 140 via the connecting members 215.

In contrast to the prior arrangement (e.g., as depicted in FIG. 8), the force from the lateral impact 305 or 310 can push the lateral member of the internal frame 115 on the same side in toward the interior opening 120. With the force applied onto the lateral member of the internal frame 115, the panel 140 disposed on the lateral member and the plate 210 supported by the top layer 200 can be pushed inward into the interior opening 120. The movement of the panel 140 and the plate 210 on one side (e.g., right side as depicted) due to the force of the lateral impact 305 or 310 can cause the battery pack 130 to be pressed against the lateral member of the internal frame 115 on the opposing side (e.g., left side). The battery pack 130 can be also pushed into the panel 140 arranged on the lateral member of the internal frame 115 on the opposing side. Force from the battery pack 130 pressing against the lateral member of the internal frame 115 or the panel 140 on the opposing side can induce a reactive force back onto the battery pack 130. The reactive force in turn can cause the battery pack 130 to push against the lateral member of the internal frame 115 or the panel 140 on the same side as the lateral impact 305 or 310.

The reactive force transferred from the opposite side back to the same side as the lateral impact 305 or 310 via the battery pack 130 can initiate the transition of the battery pack 130 from the first position 145 to the second position 300. When the reactive force or the initial force from the lateral impact 305 or 310 is greater than the static friction between the first section 700 of the plate 210 at the top layer 200 of the panel 140, the plate 210 can move across the top layer 200. In response to the lateral impact 305 or 310, the alignment of each opening 710 on the plate 210 with the corresponding opening 600 on the top layer 200 and the opening 605 on the bottom layer 205 can shift, move, or otherwise change. The change in the alignment can occur due to the force from the lateral impact 305 or 310 on the same side as the panel 140 disposed on the lateral member of the internal frame 115 and the plate 210 arranged on the panel 140. The change in the alignment can occur due to the reactive side from the opposite side as the side on which the lateral impact 305 or 310 occurs.

With the alignment between the opening 710 on the plate 210, the opening 600 of the top layer 200, and the opening 605 of the bottom layer 205 shifted, each connecting member 215 can move be allowed to move. In each opening 710, both the head portion 505 and the body portion 510 of the connecting member 215 can be dislodged or can shift from the first region 720 to the second region 725. The shifting of the head portion 505 of the connecting member 215 from the first region 720 to the second region 725 can occur with the force of the lateral impact 305 or 310. When the first region 720 in each opening 710 is defined further away from the interior opening 120 than the second region 725 along the plate 210, the force of the lateral impact 305 or 310 itself can dislodge or shift the head portion 505 from the first region 720 to the second region 725. The shifting of the head portion 505 of the connecting member 215 from the first region 720 to the second region 725 can occur with the reactive force in response to the lateral impact 305 or 310. When the first region 720 in each opening 710 is defined further away from the interior opening 120 than the second region 725 along the plate 210, the force of the lateral impact 305 or 310 itself can dislodge or shift the head portion 505 from the first region 720 to the second region 725. The head portion 505 can be free of any support from the top surface of the plate 210 about the opening 710. The lip structure 715 can maintain the head portion 505 within the second region 725. The lip structure 715 can prevent the head portion 505 from being caught on the top surface of the plate 210 about the second region 725 of the opening 710. The body portion 510 of each connecting member 215 can span through the second region 725 of each opening 710 defined on the plate 210.

In addition, each connecting member 215 can also pass through the opening 600 on the top layer 200 now aligned with the second region 725 of the opening 710 on the plate 210. The body portion 510 of each connecting member 215 can span through the opening 600.

Furthermore, each connecting member 215 can pass through the opening 605 on the bottom layer 205 aligned with the opening 600 on the top layer 200 and the second region 725 of the opening 710 on the plate 210. The body portion 510 of each connecting member 215 can pass through the opening 605 defined on the bottom layer 205 of the panel 140. The stop surface of the tail portion 515 of the connecting member 215 can be flush or in contact with the bottom surface of the bottom layer 205 of the panel 140.

Figure 10:
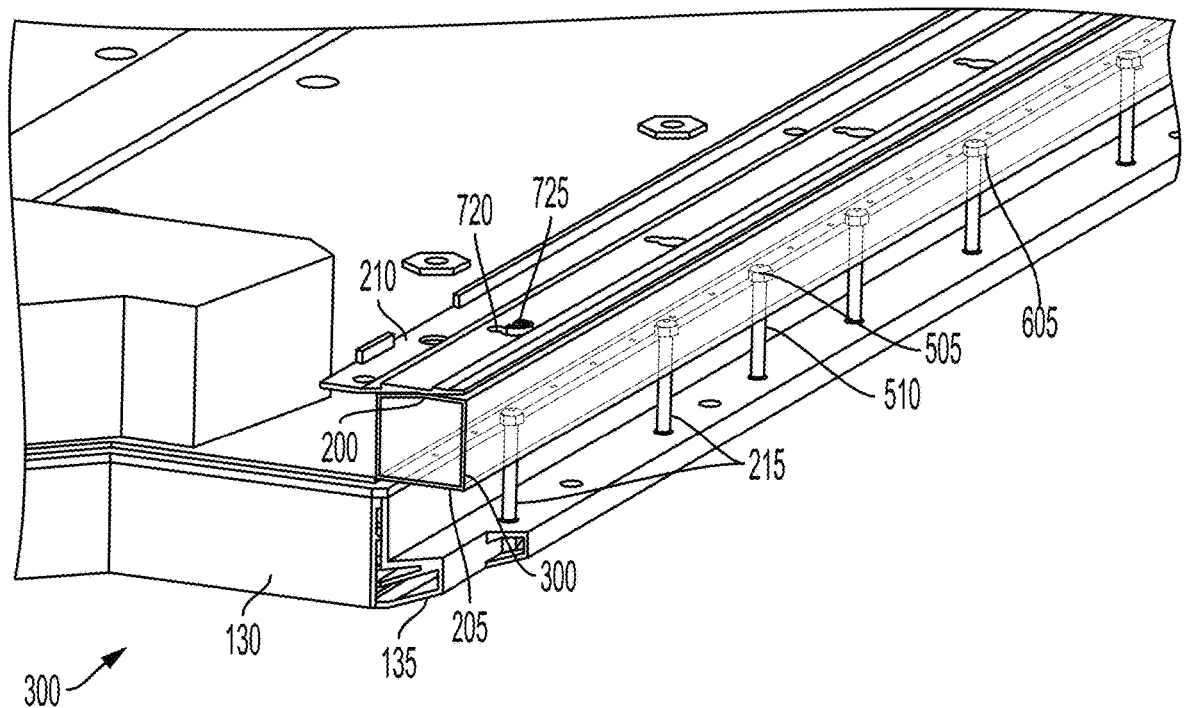
FIG. 10 depicts an isometric view of an example apparatus for providing electrical power to components of an electric vehicle with a connecting member dropped to a bottom layer of a panel to a subsequent position in response to a lateral impact.

FIG. 10, among others, depicts an isometric view of the apparatus 125 for providing electrical power to components of the electric vehicle 100 with the connecting members 215 dropped to the bottom layer 205 of the panel 140 to a subsequent position in response to the lateral impact 305 or 310. As depicted, the battery pack 130 can be in the second position 300, and can be disposed at outside the interior opening 120 in the bottom region 105 of the electric vehicle 100. The battery pack 130 itself can be suspended beneath the mounting surface 110 in the interior opening 120 of the electric vehicle 100. Furthermore, the top surface of the battery pack 130 may no longer be flush or in contact with the mounting surface 110 of the electric vehicle 100 within the bottom region 105. The top surface of the battery pack 130 may no longer be flush or in contact with a bottom surface of the panel 140. The lateral surface of the battery pack 130 may no longer be flush with one of the side walls 500 of the panel 140. The top surface of the support structure 135 on the lateral surface of the battery pack 130 may no longer be flush with the bottom layer 205 of the panel 140. The battery pack 130 can be mechanically coupled to the bottom layer 205 of the panel 140 via the connecting members 215.

With the battery pack 130 in the second position 300, each connecting member 215 can pass through or descend from the plate 210 and the top layer 200 of the panel 140. The vertical alignment between each opening 710 defined on the plate 210 and each opening 600 defined on the top layer 200 can shift from the first region 720 to the second region 725. Due to the shift in the vertical alignment, the connecting member 215 in each opening 710 on the plate 210 can move from the first region 720 to the second region 725. Having moved from the first region 720 to the second region 725 in each opening 710, the body portion 510 of each connecting member 215 can pass through the second region 725 in each opening 710. In addition, the head portion 505 of each connecting member 215 may no longer be supported by the portion of the plate 210 about the opening 710. The cross-sectional area of the head portion 505 can be less than the cross-sectional area of the second region 725 of each opening 710 and also can be less than the cross-sectional area of the opening 600 on the top layer 200 aligned with the second region 725. With no support on the plate 210, the second region 725 of each opening 710 can allow the head portion 505 of each connecting member 215 to descend, drop, or plunge through the plate 210 and the top layer 200 of the panel 140 due to the force of gravity. The second region 725 of each opening 710 can also permit the body portion 510 of each connecting member 215 to also descend, drop, or plunge through the plate 210 and the top layer 200 of the panel 140.

The descent of the connecting member 215 from top layer 200 of the panel 140 and the plate 210 arranged on the top layer 200 can be stopped or halted, when the head portion 505 of each connecting member 215 contacts and comes to rest the top surface of the bottom layer 205. The descent of each connecting member 215 can be guided from the top layer 200 to the bottom layer 205 via the vertical alignment 610 between the opening 600 and the opening 605. Having descended, the head portion 505 of each connecting member 215 can rest or can be supported by the top surface of the bottom layer 205 of the panel 140 about the opening 605 defined on the bottom layer 205. The cross-section area of the head portion 505 of each connecting member 215 can be greater than the cross-sectional area of each opening 605 defined on the bottom layer 205. Furthermore, the body portion 510 of each connecting member 215 can pass through the corresponding opening 605 defined on the bottom layer 205. The cross-sectional area of the body portion 510 of each connecting member 215 can be less than the cross-sectional area of each opening 605 defined on the bottom layer 205. As the head portion 505 of each connecting member 215 rests on the top surface of the bottom layer 205 and the body portion 510 of each connecting member 215 passes through the bottom layer 205, the battery pack 130 can be allowed to transition to the second position 300. Mechanically coupled with the bottom layer 205 of the panel 140 via the support structure 135 and the connecting members 215, the battery pack 130 can be suspended or hanging beneath the mounting surface 110 in the bottom region 105 of the electric vehicle 100.

Figure 11:
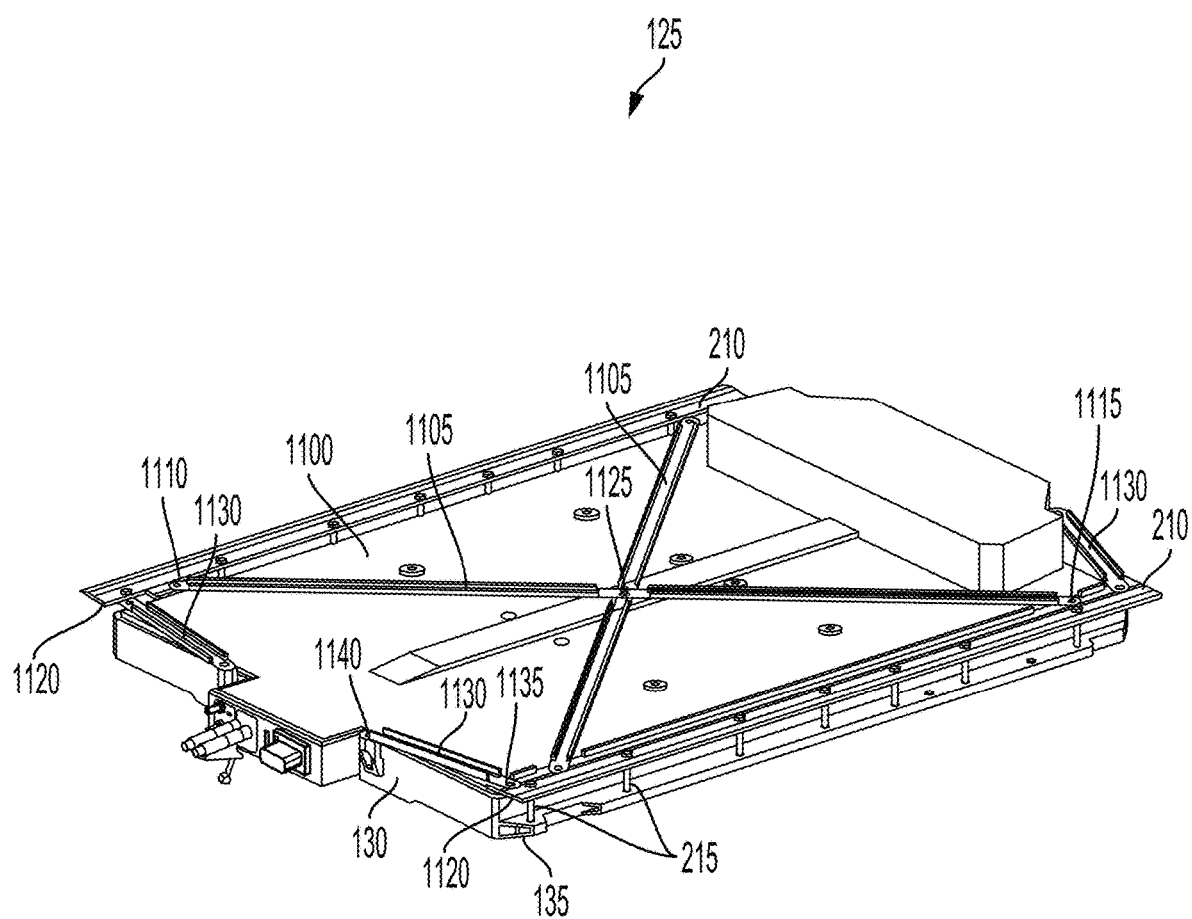
FIG. 11 depicts an isometric view of an example apparatus for providing electrical power to components of an electric vehicle with a set of structural elements on a battery pack.
Figure 12:
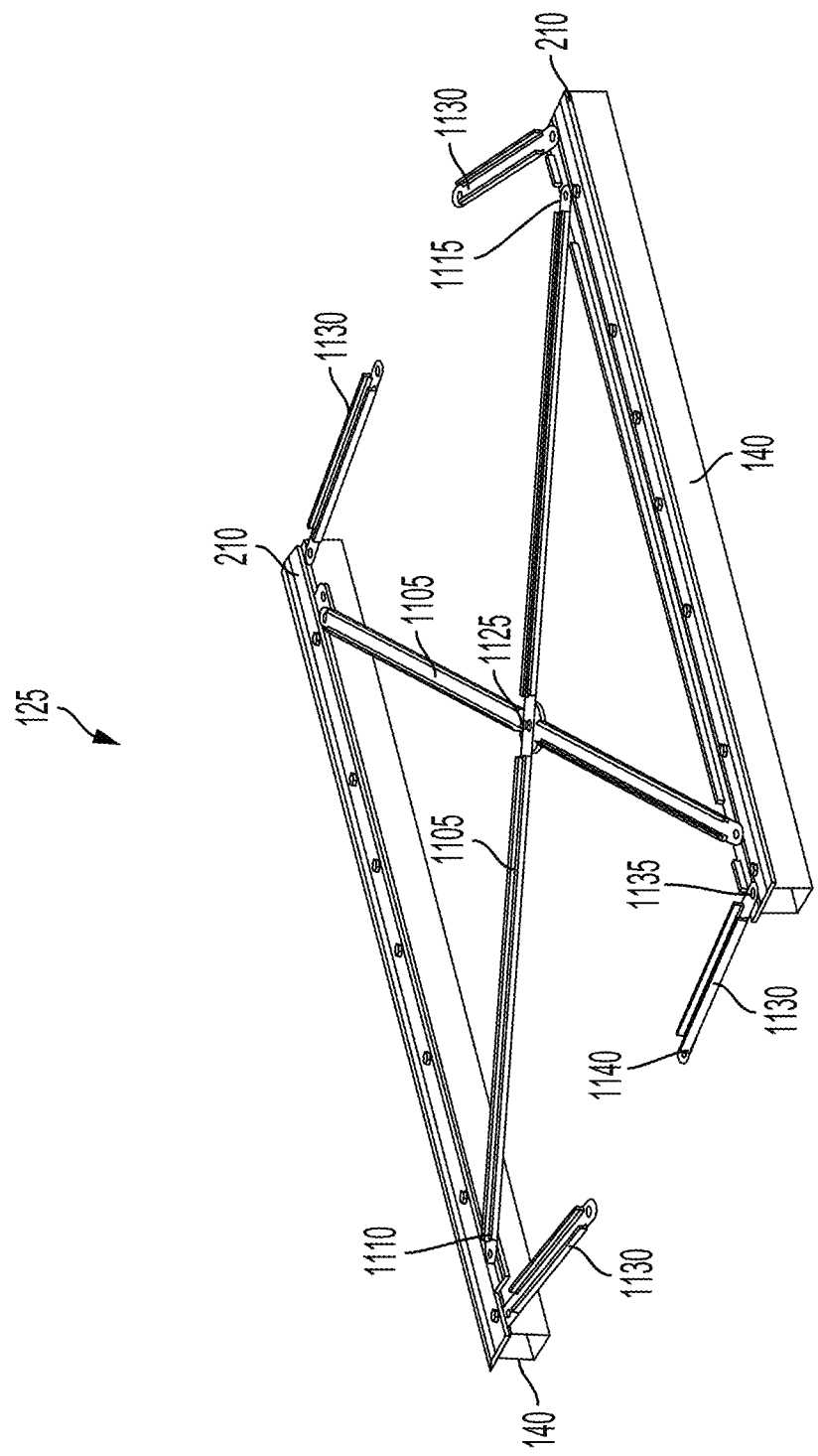
FIG. 12 depicts an isometric view of an example apparatus for providing electrical power to components of an electric vehicle with a set of structural elements without a battery pack.

FIGS. 11 and 12, among others, depict an isometric view of the apparatus 125 for providing electrical power to components of the electric vehicle 100 with structural elements. FIG. 11 depicts the apparatus 125 with the battery pack 130 shown. FIG. 12 depicts the apparatus 125 with the battery pack 130 omitted. As depicted, the apparatus 125 can include a set of transverse structural elements 1105 (sometimes herein generally referred to as structural elements). Each transverse structural element 1105 can be a load-bearing structure. Each transverse structural element 1105 can transfer the resultant force of the lateral impact 305 or 310 from one lateral side of the electric vehicle 100 to the opposing lateral side. Each transverse structural element 1105 can transfer the reactive force in response to the lateral impact 305 or 310 from the opposing lateral side back to the lateral side upon which the lateral impact 305 or 310 occurred. The type of load supported by each transverse structural element 1105 can include axial, bending, compressive, or tension, among others. The set of transverse structural elements 1105 can be any type of load-bearing structure, such as a bar, a beam, a tie rod, an eye bar, a suspension cable, a rod, a wire rope, among others. The number of transverse structural elements 1105 can range between 2 pieces to 5 pieces. The set of transverse structural elements 1105 can be of any shape. The shape of each transverse structural element 1105 can be prismatic with a polygonal base, such as a triangle, square, a rectangular (e.g., as depicted), a pentagon, or a hexagon. The shape of each transverse structural element 1105 can be cylindrical with a circular, ovular, or elliptical base, among others. Each transverse structural element 1105 can have a length ranging between 2050 mm to 2250 mm. Each transverse structural element 1105 can have a width ranging between 40 mm to 60 mm. Each transverse structural element 1105 can have a thickness ranging between 2 mm to 8 mm.

The set of transverse structural elements 1105 can be arranged or disposed within the interior opening 120 defined in the bottom region 105 of the electric vehicle 100. Each transverse structural element 1105 can at least partially or fully span the interior opening 120 defined in the bottom region 105 of the electric vehicle 100. The set of transverse structural elements 1105 can be arranged or disposed on a top surface 1100 of the battery pack 130. At least a portion of each transverse structural element 1105 can rest or can be supported on the top surface 1100 of the battery pack 130 situated in the first position 145. The portion of each transverse structural element 1105 may no longer be in contact with the top surface 1100 of the battery pack 130 when situated in the second position 300.

Each transverse structural element 1105 can span from the plate 210 on one lateral side of the electric vehicle 100 to the plate 210 on the opposing lateral side of the electric vehicle 100. Each transverse structural element 1105 can have a first end 1110 and a second end 1115. The first end 1110 and the second end 1115 can correspond to opposing ends on the transverse structural element 1105. The first end 1110 of each transverse structural element 1105 can be mechanically coupled or connected with the plate 210 on one side. The first end 1110 of each transverse structural element 1105 can rest or can be supported by the plate 210 and the panel 140 disposed beneath the plate 210 on one side. The first end 1110 of each transverse structural element 1105 can fit or be mounted or secured between the bottom surface of the plate 210 and the top surface of the top layer 200 of the panel 140. The first end 1110 of each transverse structural element 1105 can also fit or be mounted or secured between the bottom surface of the plate 210 and the top surface 1100 of the battery pack 130. The second end 1115 of each transverse structural element 1105 can be mechanically coupled or connected with the plate 210 on the opposite side as the first end 1110. The second end 1115 of each transverse structural element 1105 can rest or can be supported by the plate 210 and the panel 140 disposed beneath the plate 210 on the opposite side as the first end 1110. The second end 1115 of each transverse structural element 1105 can also fit or be mounted or secured between the bottom surface of the plate 210 and the top surface of the top layer 200 of the panel 140. The second end 1115 of each transverse structural element 1105 can also fit or be mounted or secured between the bottom surface of the plate 210 and the top surface 1100 of the battery pack 130. The first end 1110 and the second end 1115 of each transverse structural element 1105 can be at an offset distance relative to an edge 1120 of the plate 210 on the respective sides. For example, as illustrated, the first end 1110 of one transverse structural element 1105 can be toward a front side of the plate 210 along one lateral side of the electric vehicle 100. In contrast, the second end 1115 of one transverse structural element 1105 can be toward a back side of the plate 210 along the opposing lateral side of the electric vehicle 100. The edge 1120 can correspond to one side of the plate 210, such as the widthwise rim as depicted. The offset distance between the first end 1110 and the second end 1115 of each structural element 1105 can range between 2000 mm to 2200 mm.

Spanning the interior opening 120 in the bottom region 105 of the electric vehicle 100, the set of transverse structural elements 1105 can intersect or crisscross (e.g., as depicted) with one another. The set of transverse structural elements 1105 can define an intersection point 1125. The intersection point 1125 can correspond to a point at which at least two of the transverse structural elements 1105 crisscross, overlap, or otherwise contact one another. The intersection point 1125 can also correspond to a midpoint for each crisscrossing transverse structural element 1105. The crisscrossing transverse structural elements 1105 can be mechanically coupled or connected at the intersection point 1125. The crisscrossing transverse structural elements 1105 can be connected using a fastener passing through the intersection point 1125, such as a bolt (e.g., as depicted), a clamp, a clasp, and a screw, among others. The connection of the crisscrossing transverse structural elements 1105 at the intersection point 1125 can control rotation or movement of the transverse structural elements 1105 in response to the force applied by the lateral impact 305 or 310. The intersection point 1125 of the crisscrossing transverse structural elements 1105 can be mechanically coupled or connected to the top surface 1100 of the battery pack 130. The mechanical coupling of the top surface 1100 of the battery pack 130 to intersection point 1125 can secure or hold the battery pack 130 in the first position 145. The intersection point 1125 of the crisscrossing transverse structural elements 1105 can also rest or be supported by the top surface 1100 of the battery pack 130. The intersection point 1125 of the crisscrossing transverse structural elements 1105 can be in contact with the top surface 1100 of the battery pack 130 situated in the first position 145. The set of transverse structural elements 1105 can also be substantially parallel to one another (e.g., within 15% deviation) without intersection or crisscrossing one another from one plate 210 on one side to the plate 210 on the other side. The set of transverse structural elements 1105 can also span the interior opening 120 in the bottom region 105 without intersecting or crossing one another from one plate 210 on one side to the plate 210 on the other side.

The apparatus 125 can include a set of non-transverse structural elements 1130 (sometimes herein generally referred to as structural elements). Each non-transverse structural element 1130 can be a load-bearing structure. Each non-transverse structural element 1130 can transfer the resultant force of the lateral impact 305 or 310 from one lateral side of the electric vehicle 100 to the opposing lateral side through the battery pack 130. Each non-transverse structural element 1130 can transfer the reactive force in response to the lateral impact 305 or 310 from the opposing lateral side back to the lateral side upon which the lateral impact 305 or 310 occurred through the battery pack 130. The type of load supported by each non-transverse structural element 1130 can include axial, bending, compressive, or tension, among others. The set of non-transverse structural elements 1130 can be any type of load-bearing structure, such as a bar, a beam, a tie rod, an eye bar, a suspension cable, a rod, a wire rope, among others. The number of non-transverse structural elements 1130 can range between 2 pieces to 8 pieces. The set of non-transverse structural elements 1130 can be of any shape. The shape of each non-transverse structural element 1130 can be prismatic with a polygonal base, such as a triangle, square, a rectangular (e.g., as depicted), a pentagon, or a hexagon. The shape of each non-transverse structural element 1130 can be cylindrical with a circular, ovular, or elliptical base, among others. Each non-transverse structural element 1130 can have a length ranging between 475 mm to 575 mm. Each non-transverse structural element 1130 can have a width ranging between 40 mm to 60 mm. Each non-transverse structural element 1130 can have a thickness ranging between 2 mm to 8 mm.

The set of non-transverse structural elements 1130 can be arranged or disposed within the interior opening 120 defined in the bottom region 105 of the electric vehicle 100. Each non-transverse structural element 1130 can partially span the interior opening 120 defined in the bottom region 105 of the electric vehicle 100. The set of non-transverse structural elements 1130 can be arranged or disposed on the top surface 1100 of the battery pack 130. At least a portion of each non-transverse structural element 1130 can rest or can be supported on the top surface 1100 of the battery pack 130 situated in the first position 145. The portion of each non-transverse structural element 1130 may no longer be in contact with the top surface 1100 of the battery pack 130 when situated in the second position 300.

Each non-transverse structural element 1130 can span from the plate 210 on one lateral side of electric vehicle 100 to the top surface 1100 of the battery pack 130 within the interior opening 120 defined along the bottom region 105 of the electric vehicle 100. Each non-transverse structural element 1130 can span from the plate 210 on one lateral side of electric vehicle 100 to a lateral edge of the battery pack 130 within the interior opening 120. The lateral edge can correspond to a periphery between side walls and the top surface 1100 of the battery pack 130. Each non-transverse structural element 1130 can have a first end 1135 and a second end 1140. The first end 1135 of each non-transverse structural element 1130 can be mechanically coupled or connected with the plate 210 on one side of the electric vehicle 100. The first end 1135 of each non-transverse structural element 1130 can rest or can be supported by the plate 210 and the panel 140 disposed beneath the plate 210 on one side. The second end 1140 of each non-transverse structural element 1130 can rest or can be supported by the top surface 1100 of the battery pack 130. The second end 1140 of each transverse structural element 1105 can be mechanically coupled or connected with the top surface 1100 of the battery pack 130 (e.g., along the lateral edge of the top surface 1100).

Figure 13:
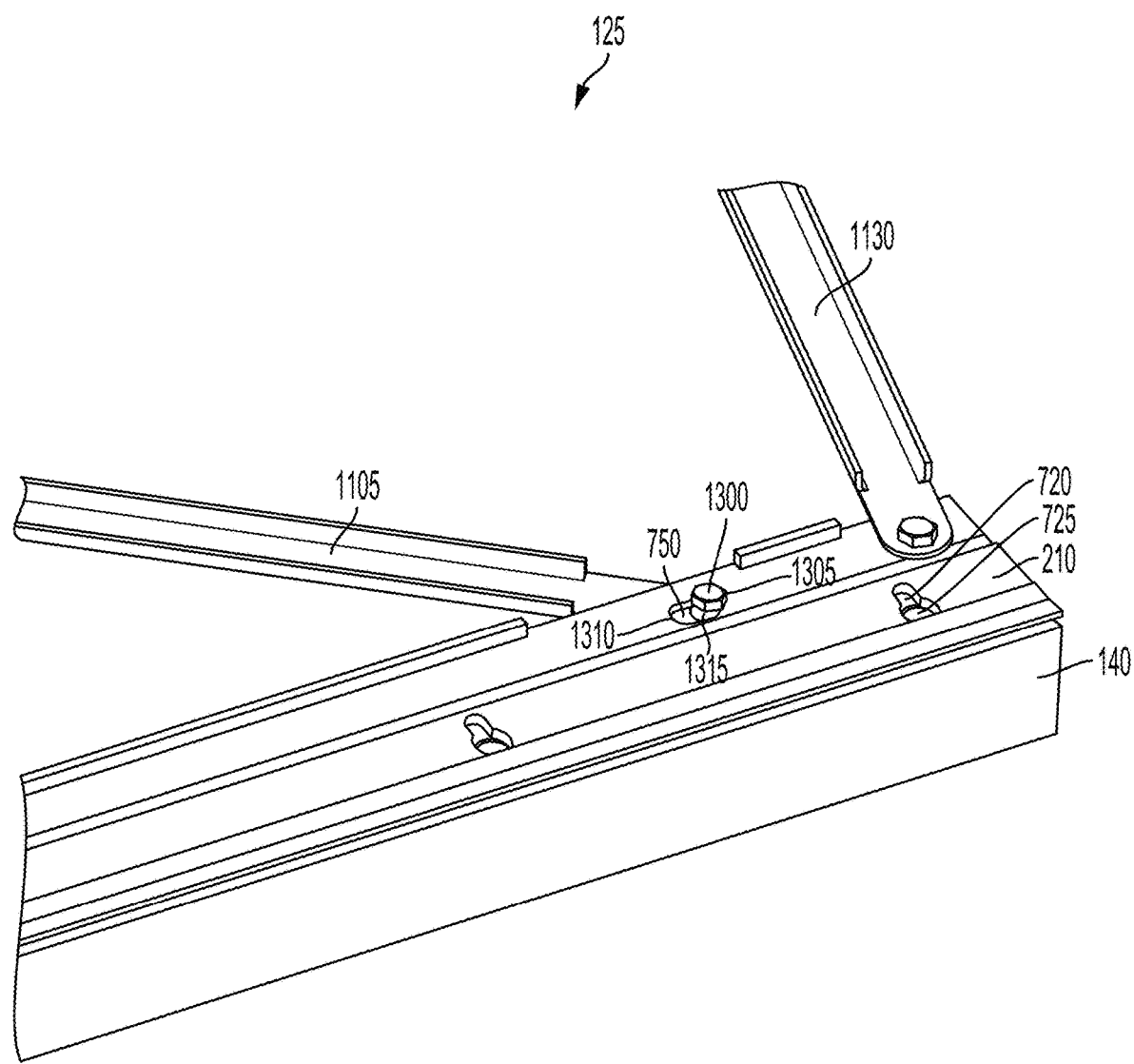
FIG. 13 depicts a close-up isometric view of structural elements mechanically coupled with a panel of an example apparatus for providing electrical power to components of an electric vehicle.

FIG. 13, among others, depicts a close-up isometric view of the structural elements 1105 mechanically coupled with the panel 140 of the apparatus 125 the for providing electrical power to components of the electric vehicle 100. As depicted, the first end 1110 or the second end 1115 (e.g., the second end 1115 as shown) of each transverse structural element 1105 can be mechanically coupled with the panel 140 and the plate 210 arranged on the panel 140. To mechanically couple, the first end 1110 or the second end 1115 can be fitted or secured between the top layer 200 of the panel 140 and the bottom surface of the plate 210. The fitting or securing between the first end 1110 or the second end 1115 and the top layer 200 of the panel 140 can be along the bottom surface of at least the second section 705 of the plate 210. The first end 1110 or the second end 1115 can be fitted or secured between the top surface 1100 of the battery pack 130 and the bottom surface of the plate 210. The fitting or securing between the first end 1110 or the second end 1115 and the top surface 1100 of the battery pack 130 can be along the bottom surface of at least the second section 705 of the plate 210. The first end 1110 or the second end 1115 of each transverse structural element 1105 can also rest on top or can be supported by the top surface of the plate 210. The first end 1110 or the second end 1115 of each transverse structural element 1105 can be flush or in contact with the top surface of at least the second section 705 of the plate 210.

The apparatus 125 can include at least one connecting member 1300. The connecting member 1300 can secure or maintain the mechanical coupling between each transverse structural element 1105 along the first end 1110 or the second end 1115 with the plate 210. The connecting member 1300 can include any type of fastener, such as a bolt (e.g., as depicted), a buttery anchor, a clamp, a clasp, a clevis fastener, and a latch, among others. The connecting member 1300 can include a mechanical linkage component, such as a hinge, a coil spring, or a ball joint, among others. The connecting member 1300 can connect the first end 1110 or the second end 1115 of each transverse structural element 1105 to the plate 210. The connecting member 1300 can pass through the slot 750 defined through the plate 210 in the second region 725. The connecting member 1300 can be held within the slot 750 defined through the plate 210. The connecting member 1300 can pass through a slot defined through the transverse structural element 1105 along the first end 1110 or the second end 1115. Passing through both the slot 750 defined on the plate 210 and the slot defined on the transverse structural element 1105, the connecting member 1300 can mechanically couple the transverse structural element 1105 with the plate 210.

The connecting member 1300 can include a head portion (e.g., as shown on the top surface of the plate 210). The head portion can correspond to a top end of the connecting member 1300. For examples in which the connecting member 1300 is a bolt, the head portion can correspond to a head of a bolt. The head portion can form an integral portion of the connecting member 1300. The head portion can also be attached, fastened, or otherwise connected to a remaining portion of the connecting member 1300. The head portion can mechanically couple the transverse structural element 1105 along the first end 1110 or the second end 1115 with the plate 210. At least a part of the head portion can be in contact with the plate 210 about the slot 750 and the transverse structural element 1105 along the first end 1110 or the second end 1115. The head portion can have any shape. The shape of the head portion can be a prism with a polygonal base, such as a triangle, a square, a rectangular, a pentagon, or a hexagon, among others. The shape of the head portion can be a cylinder with a circular (e.g., as depicted), ovular, or elliptical base, among others. The head portion can have a length ranging between 10 mm to 30 mm. The head portion can have a width (or a diameter for circular examples) ranging between 10 mm to 30 mm. The length or the width of the head portion of the connecting member 1300 can be greater than the length or the width of the slot 750 through which the connecting member 1300 can be held. The head portion can have a cross-sectional area defined by the length and the width. The cross-sectional area of the head portion can range between 100 mm$^2$ to 900 mm$^2$. The head portion can have a height ranging between 3.5 mm to 10.5 mm.

The connecting member 1300 can include a body portion. The body portion can correspond to a medial region of the connecting member 1300 or to a portion of the connecting member 1300 besides the top end corresponding to the head portion 505. For examples in which the connecting member 1300 is a bolt, the body portion can correspond to a shank or thread portion (or both) of the bolt. The body portion can be adjacent to and beneath the head portion 505. The body portion can form an integral portion of the connecting member 1300. The body portion can also be attached, fastened, or otherwise connected to a remaining portion of the connecting member 1300, including the head portion. The body portion can mechanically couple the transverse structural element 1105 along the first end 1110 or the second end 1115 with the plate 210. At least a part of the body portion can be in contact with the plate 210 and the transverse structural element 1105 that the connecting member 1300 passes through.

The body portion of the connecting member 1300 can have any shape, and can match the shape of the head portion. The shape of the body portion can include a prism with a polygonal base, such as a triangle, a square, a rectangular, a pentagon, or a hexagon, among others. The shape of the body portion can be a cylinder with a circular (e.g., as depicted), ovular, or elliptical base, among others. The body portion can have a length ranging between 10 mm to 20 mm. The body portion can have a width (or a diameter for circular examples) ranging between 5 mm to 15 mm. The width of the body portion can be less than the width of the head portion. The length or the width of the head portion of the connecting member 1300 can be greater than the length or the width of the slot 750 through which the connecting member 1300 can be held. The body portion can have a cross-sectional area defined by the length and the width. The cross-sectional area of the body portion can range between 50 mm² to 300 mm². The cross-sectional area of the body portion can be less than the cross-sectional area of the head portion. The difference in the cross-sectional areas between the head portion and the body portion can define a bearing surface on a bottom portion of the head portion. The body portion can have a height ranging between 10 mm to 20 mm. The height of the body portion can be greater than the height of the body portion. In this manner, the body portion of the connecting member 1300 can move within the slot 750 in response to the lateral impact 305 or 310.

Each connecting member 1300 can include a tail portion. The tail portion can correspond to a bottom end of the connecting member 1300 opposite of the head portion. For examples in which the connecting member 1300 is a bolt, the tail portion can correspond to a bottom end of the shank portion of the bolt. The tail portion can be adjacent to and beneath the body portion of the connecting member 1300. The tail portion can form an integral portion of the connecting member 1300. The tail portion can also be attached, fastened, or otherwise connected to a remaining portion of the connecting member 1300, including the head portion and the body portion. The tail portion can mechanically couple the transverse structural element 1105 along the first end 1110 or the second end 1115 with the plate 210. At least a part of the tail portion can be in contact with the bottom surface of the plate 210 or the bottom surface of the transverse structural element 1105 or 1110.

The tail portion can have any shape, and can match the shape of the body portion or the tail portion. The shape of the tail portion can be a prism with a polygonal base, such as a triangle, a square, a rectangular, a pentagon, or a hexagon, among others. The shape of the tail portion can be a cylinder with a circular (e.g., as depicted), ovular, or elliptical base, among others. The tail portion can have a length ranging between 15 mm to 35 mm. The tail portion can have a width (or a diameter for circular examples) ranging between 10 mm to 30 mm. The width of the tail portion can be greater than the width of the body portion. The tail portion can have a cross-sectional area defined by the length and the width. The cross-sectional area of the tail portion can range between 150 mm² to 1050 mm². The cross-sectional area of the tail portion can be greater than the cross-sectional area of the body portion. The difference in the cross-sectional areas between the body portion and the tail portion can define a stop surface on a top portion of the tail portion. The tail portion can have a height ranging between 2.5 mm to 10 mm. The height of the tail portion can be less than the body portion.

The apparatus 125 can include at least one collar 1315. The collar 1315 can be disposed in the slot 750. The collar 1315 can hold the connecting member 1300 disposed in the slot 750. The collar 1315 can be arranged in the slot 750 beneath the head portion of the connecting member 1300. The collar 1315 can define an aperture from a top side to a bottom side. The aperture of the collar 1315 can pass and hold at least a portion of the body portion of the connecting member 1300. The collar 1315 can guide the connecting member 1315 within the slot 750. The collar 1315 can be of any shape. The shape of the collar 1315 can be prismatic with a polygonal base, such as a triangle, square, a rectangular, a pentagon, or a hexagon. The shape of the collar 1315 can be cylindrical with a circular (e.g., as illustrated), ovular, or elliptical base, among others. The collar 1315 can have a height ranging between 4 mm and 10 mm. The collar 1315 can have a length or width (or a diameter in circular examples) ranging between 10 mm to 30 mm. The aperture of the collar 1315 can have a length or a width (or diameter in circular examples) ranging between 8 mm to 28 mm.

Prior to the lateral impact 305 or 310, the connecting member 1300 can be situated within the slot 750 at a first end 1305. The first end 1305 can correspond to any portion of the slot 750 in which the connecting member 1300 may be situated when the battery pack 130 is in the first position 145. In response to the lateral impact 305 or 310, the connecting member 1300 (along with the collar 1315) can shift from the first end 1305 to a second end 1310 within the slot 750. The second end 1310 can correspond to any portion of the slot 750 when the battery pack 130 is in the second position 300. With the set of transverse structural element 1105 crisscrossing, the first end 1305 can correspond to any portion of the slot 750 away from a centroid of the interior opening 120 defined in the bottom region 105 of the electric vehicle 100. The second end 1310 can correspond to any portion of the slot 750 closer to the centroid of the interior opening 120 than the first end 1305.

Figure 14:
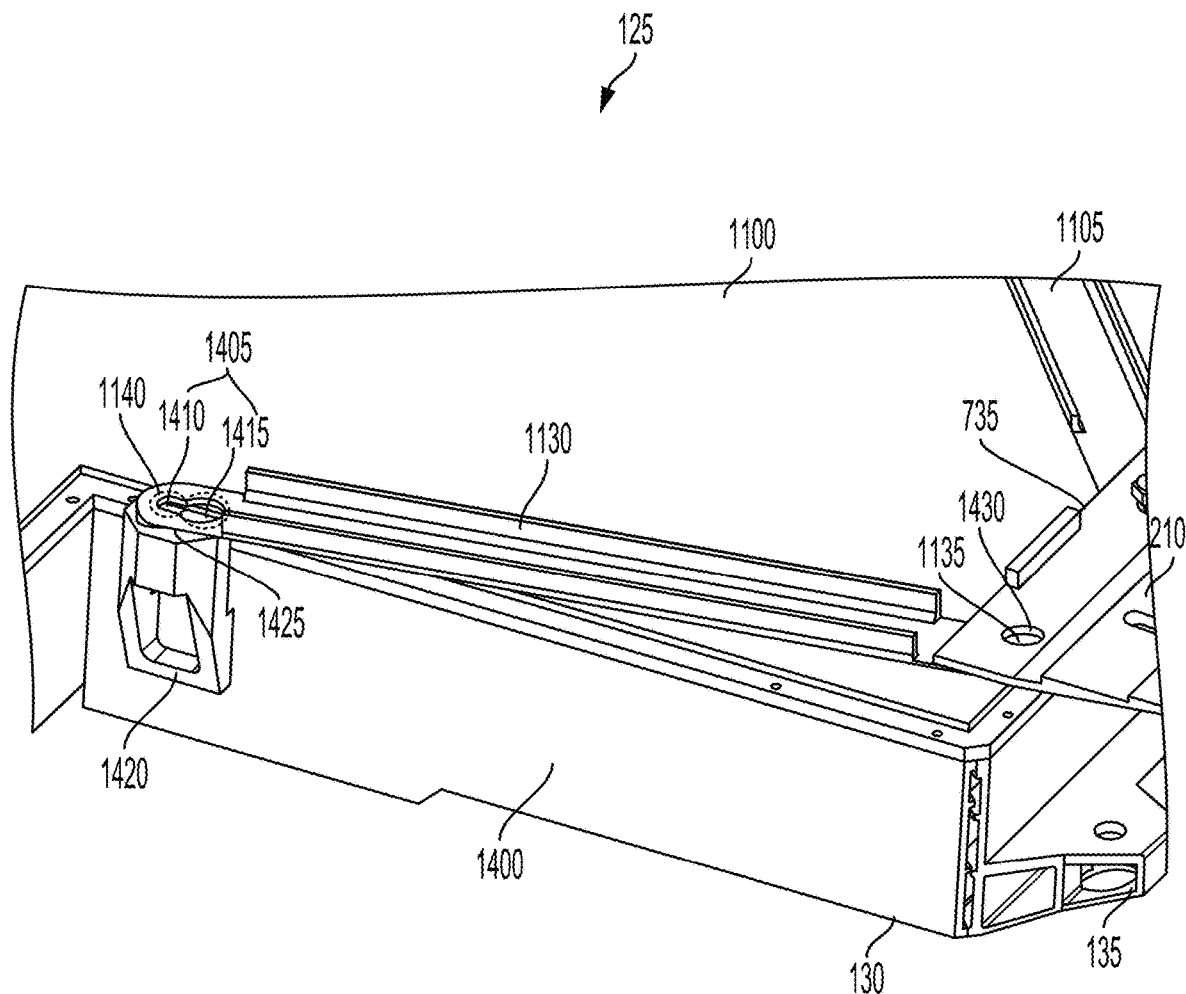
FIG. 14 depicts a close-up isometric view of structural elements mechanically coupled with a battery pack of an example apparatus for providing electrical power to components of an electric vehicle.

FIG. 14, among others, depicts a close-up isometric view of the structural elements 1130 mechanically coupled with the battery pack 130 of the apparatus 125 for providing electrical power to components of an electric vehicle. As depicted, the first end 1135 of each non-transverse structural element 1130 can be mechanically coupled with the panel 140 and the plate 210 arranged on the panel 140. To mechanically couple, the first end 1135 can be fitted or secured between the top layer 200 of the panel 140 and the bottom surface of the plate 210. The fitting or securing between the first end 1135 and the top layer 200 of the panel 140 can be along the bottom surface of at least the second section 705 of the plate 210. The first end 1135 can be fitted or secured between the top surface 1100 of the battery pack 130 and the bottom surface of the plate 210. The fitting or securing between the first end 1135 and the top surface 1100 of the battery pack 130 can be along the bottom surface of at least the second section 705 of the plate 210. The first end 1135 of each non-transverse structural element 1130 can also rest on top or can be supported by the top surface of the plate 210. The first end 1135 of each non-transverse structural element 1130 can be flush or in contact with the top surface of at least the second section 705 of the plate 210. The second end 1140 of the non-transverse structural element 1130 can rest or can be supported by the top surface 1100 of the battery pack 130. The second end 1140 of each transverse structural element 1105 can be mechanically coupled or connected with the top surface 1100 of the battery pack 130 (e.g., along the lateral edge of the top surface 1100).

The second end 1140 of each non-transverse structural element 1130 can define or have an opening 1405 (sometimes referred herein as a battery mounting space). Each opening 1405 can be or include a hole or aperture defined through the second end 1140 of the non-transverse structural element 1130 in the first section 700. Each opening 1405 can hold or pass a connecting member to mechanically couple the non-transverse structural element 1130 with the battery pack 130. The connecting member held in the opening 1405 can have can include a head portion (e.g., as shown on the top surface of the plate 210).

The head portion held in the opening 1405 can correspond to a top end of the connecting member. For examples in which the connecting member is a bolt, the head portion can correspond to a head of a bolt. The head portion can form an integral portion of the connecting member. The head portion can also be attached, fastened, or otherwise connected to a remaining portion of the connecting member. The head portion can mechanically couple the second end 1140 of the non-transverse structural element 1130 with the battery pack 130. At least a part of the head portion can be in contact with the second end 1140 of the non-transverse structural element 1130. The head portion can have any shape. The shape of the head portion can include a prism with a polygonal base, such as a triangle, a square, a rectangular, a pentagon, or a hexagon, among others. The shape of the head portion can be a cylinder with a circular (e.g., as depicted), ovular, or elliptical base, among others. The head portion can have a length ranging between 15 mm to 30 mm. The head portion can have a width (or a diameter for circular examples) ranging between 10 mm to 30 mm. The head portion can have a cross-sectional area defined by the length and the width. The cross-sectional area of the head portion can range between 150 mm$^2$ to 900 mm$^2$. The head portion can have a height ranging between 5 mm to 10 mm.

The connecting member held in the opening 1405 can include a body portion. The body portion can correspond to a medial region of the connecting member or to a portion of the connecting member besides the top end corresponding to the head portion 505. For examples in which the connecting member is a bolt, the body portion can correspond to a shank or thread portion (or both) of the bolt. The body portion can be adjacent to and beneath the head portion of the connecting member. The body portion can form an integral portion of the connecting member. The body portion can also be attached, fastened, or otherwise connected to a remaining portion of the connecting member, including the head portion. The body portion can mechanically couple the second end 1140 of the non-transverse structural element 1130 with the battery pack 130. At least a part of the body portion can be in contact with the second end 1140 of the non-transverse structural element 1130.

The body portion of the connecting member can have any shape, and can match the shape of the head portion. The shape of the body portion include can a prism with a polygonal base, such as a triangle, a square, a rectangular, a pentagon, or a hexagon, among others. The shape of the body portion can be a cylinder with a circular (e.g., as depicted), ovular, or elliptical base, among others. The body portion can have a length ranging between 10 mm to 20 mm. The body portion can have a width (or a diameter for circular examples) ranging between 5 mm to 15 mm. The width of the body portion can be less than the width of the head portion. The body portion can have a cross-sectional area defined by the length and the width. The cross-sectional area of the body portion can range between 50 mm$^2$ to 300 mm$^2$. The cross-sectional area of the body portion can be less than the cross-sectional area of the head portion. The difference in the cross-sectional areas between the head portion and the body portion can define a bearing surface on a bottom portion of the head portion. The body portion can have a height ranging between 10 mm to 20 mm. The height of the body portion can be greater than the height of the body portion.

Each connecting member held in the opening 1405 can include a tail portion. The tail portion can correspond to a bottom end of the connecting member opposite of the head portion. For examples in which the connecting member is a bolt, the tail portion can correspond to a bottom end of the shank portion of the bolt. The tail portion can be adjacent to and beneath the body portion of the connecting member. The tail portion can form an integral portion of the connecting member. The tail portion can also be attached, fastened, or otherwise connected to a remaining portion of the connecting member, including the head portion and the body portion. The tail portion can mechanically couple the second end 1140 of the non-transverse structural element 1130 with the battery pack 130.

The tail portion can have any shape, and can match the shape of the body portion or the tail portion. The shape of the tail portion can include a prism with a polygonal base, such as a triangle, a square, a rectangular, a pentagon, or a hexagon, among others. The shape of the tail portion can be a cylinder with a circular (e.g., as depicted), ovular, or elliptical base, among others. The tail portion can have a length ranging between 15 mm to 30 mm. The tail portion can have a width (or a diameter for circular examples) ranging between 10 mm to 20 mm. The width of the tail portion can be greater than the width of the body portion. The tail portion can have a cross-sectional area defined by the length and the width. The cross-sectional area of the tail portion can range between 150 mm$^2$ to 600 mm$^2$. The cross-sectional area of the tail portion can be greater than the cross-sectional area of the body portion. The difference in the cross-sectional areas between the body portion and the tail portion can define a stop surface on a top portion of the tail portion. The tail portion can have a height ranging between 5 mm to 10 mm. The height of the tail portion can be less than the body portion.

Each opening 1405 can be divided into at least one first region 1410 and at least one second region 1415. The first region 1410 of each opening 1405 defined through the second end 1140 of the non-transverse structural element 1130 can be a hole or aperture passing through the second end 1140 of the non-transverse structural element 1130. The first region 1410 can support the head portion 505 of the connecting member onto the top surface of the second end 1140 of the non-transverse structural element 1130. The first region 1410 of each opening 1405 can pass the body portion of the connecting member. The first region 1410 in each opening 1405 can be of any shape. The shape of the first region 1410 can match the shape of the outline shape of the head portion or the body portion of the connecting member passing through the opening 1405. The shape of the first region 1410 can be triangular, rectangular, pentagonal, elliptical, and circular (e.g., as depicted), among others. The first region 1410 can have a length ranging between 10 mm to 20 mm. The first region 1410 can have a width ranging between 10 mm to 20 mm. The first region 1410 can have a cross-sectional area defined by the length and the width. The cross-sectional area of the first region 1410 can range between 100 mm$^2$ to 400 mm$^2$. The cross-sectional area of the first region 1410 can be less than the cross-sectional area of the head portion of the connecting member. The cross-sectional area of the first region 1410 can be greater than the cross-sectional area of the body portion of the connecting member to pass the body portion. In this manner, when positioned in the first region 1410, the head portion of the connecting member can be supported by the second end 1140 of the non-transverse structural element 1130 about the first region 1410 of the opening 1405 along the bearing surface of the head portion.

The second region 1415 of each opening 1405 defined through the second end 1140 of the non-transverse structural element 1130 can be a hole or aperture passing through the second end 1140 of the non-transverse structural element 1130. The second region 1415 of each opening 1405 defined through the second end 1140 of the non-transverse structural element 1130 can be a hole or aperture passing through the second end 1140 of the non-transverse structural element

1130. The second region 1415 can pass both the head portion 505 and the body portion of the connecting member through the second end 1140 of the non-transverse structural element 1130. The second region 1415 can be adjacent to or contiguous with the first region 1410 within the opening 1405. The aperture formed in the second end 1140 of the non-transverse structural element 1130 in the first region 1410 of each opening 1405 can continue into the aperture formed in the second end 1140 of the non-transverse structural element 1130 in the second region 1415 of each opening 1405. With both contiguous with each other, the opening 1405 can allow shifting or lateral movement of the connecting member from the first region 1410 onto the second region 1415. A centroid of the second region 1415 can be separated from a centroid of the first region 1410 at a distance. The distance between the centroid of the first region 1410 and the centroid of the second region 1415 can range between 10 mm to 20 mm.

The second region 1415 in each opening 1405 can be of any shape. The shape of the second region 1415 can match the shape of the outline shape of the head portion 505 or the body portion of the connecting member. The shape of the second region 1415 can be triangular, rectangular, pentagonal, elliptical, and circular (e.g., as depicted), among others. The second region 1415 can have a length ranging between 20 mm to 30 mm. The length of the second region 1415 can be greater than the length of the first region 1410. The second region 1415 can have a width ranging between 20 mm to 30 mm. The width of the second region 1415 can be greater than the width of the first region 1410. The second region 1415 can have a cross-sectional area defined by the length and the width. The cross-sectional area of the second region 1415 can range between 400 $mm^2$ to 900 $mm^2$. The cross-sectional area of the second region 1415 can be greater than the cross-sectional area of the first region 1410. The cross-sectional area of the second region 1415 can be greater than the cross-sectional area of the head portion of each connecting member. The cross-sectional area of the second region 1415 can be greater than the cross-sectional area of the body portion of the connecting member to pass the body portion. In this manner, when positioned in the second region 1415, both the head portion and the body portion of the connecting member can pass through the second end 1140 of the non-transverse structural element 1130.

The apparatus 125 can have at least one holder element 1420. The holder element 1420 can mechanically couple or connect the second end 1140 of the non-transverse structural element 1130 with the battery pack 130. The holder element 1420 can be disposed or arranged on at least a portion of a lateral surface 1400 of the battery pack 130. The lateral surface 1400 of the battery pack 130 can correspond to a lateral widthwise side of the housing for the battery pack 130 and can be adjacent to the top surface 1100. The holder element 1420 can be mounted, attached, or otherwise to the lateral surface 1400 of the battery pack 130. The holder element 1420 can span or extend across at least a portion of the lateral surface 1400 of the battery pack 130. At least a portion of the holder element 1420 can be on substantially the same plane as the top surface 1100 of the battery pack 130. For example, as depicted, the holder element 1420 can vertically extend along the lateral surface 1400 of the battery pack 130. The holder element 1420 can have any shape. The shape of the holder element 1420 can include a prism with a polygonal base, such as a triangle, a square, a rectangular, a pentagon, or a hexagon, among others. The shape of the holder element 1420 can be a cylinder with a circular (e.g., as depicted), ovular, or elliptical base, among others. The holder element 1420 can have a length ranging between 40 mm to 60 mm. The holder element 1420 can have a width ranging between 20 mm to 40 mm. The holder element 1420 can have a height ranging between 90 mm to 110 mm.

The holder element 1420 can define or have at least one chamber 1425. The chamber 1425 can at least partially span or extend through the holder element 1420. The chamber 1425 can correspond to a hollow or a cavity within the holder element 1420 that can at least partially extend from the top side of the holder element 1420. The chamber 1425 can hold or support the connecting member (not depicted) to mechanically coupled the battery pack 130 to the second end 1140 of each non-transverse structural element 1130. The chamber 1425 can be vertically aligned with the opening 1405 defined on the non-transverse structural element 1130. Extending from the first region 1410 of the opening 1405, the connecting member can partially span the chamber 1425. The chamber 1425 can be of any shape. The shape of the chamber 1425 can include a prism with a polygonal base, such as a triangle, a square, a rectangular, a pentagon, or a hexagon, among others. The shape of the chamber 1425 can be a cylinder with a circular (e.g., as depicted), ovular, or elliptical base, among others. The chamber 1425 can have a length ranging between 20 mm to 40 mm. The chamber 1425 can have a width ranging between 20 mm to 40 mm. The chamber 1425 can have a height ranging between 50 mm to 70 mm. The height of the chamber 1425 can be greater than the height of the connecting member passing through the opening 1405. In this manner, when the connecting member plunges or falls from the second region 1415 of the opening 1405, the connecting member can clear the plane corresponding to the non-transverse structural element 1130.

Each plate 210 can define at least one mounting space 1430 (sometimes herein referred as a plate mounting space). The mounting space 1430 can be a hole or aperture defined through the plate 210 in the second section 705 to hold or support a fastener to mechanically couple the second section 705 to the mounting surface 110 of the electric vehicle 100. The mounting space 1430 can extend from a top surface of the plate 210 in the second section 705 to a lateral surface of the mounting surface 110. The lateral surface can correspond to a top side or a bottom side of the mounting surface 110 within the bottom region 105 of the electric vehicle 100. The mounting space 1430 can extend from the top surface of the plate 210 in the second section 705 to the top surface of the first end 1135 of the non-transverse structural element 1130. At least a portion of the first end 1135 of the non-transverse structural element 1130 can be vertically aligned with the mounting space 1430 defined through the plate 210. The mounting space 1430 can hold a fastener to mechanically couple or connect the first end 1135 of the non-transverse structural element 1130 with the plate 210. The fastener can include, for example, a bolt, a clamp, a clasp, and a screw, among others.

The mounting space 1430 can be of any shape. The shape of the mounting space 1430 can be triangular, rectangular, pentagonal, elliptical (e.g., as depicted), and circular, among others. The mounting space 1430 can have a length ranging between 10 mm to 30 mm. The mounting space 1430 can have a width (or a diameter for circular examples) ranging between 10 mm to 30 mm. The mounting space 1430 can have a cross-sectional area defined by the length and the width. The cross-sectional area of the mounting space 1430 can range between 100 $mm^2$ to 900 $mm^2$. The mounting space 1430 in the second section 705 can be horizontally aligned about the lateral edge (e.g., the interior edge 735) of the plate 210. The mounting space 1430 can have an offset distance relative to the interior edge 735. The offset distance can be measured from the interior edge 735 to the centroid of the mounting space 1430. The offset distance relative to the interior edge 735 can range between 15 mm to 45 mm. The offset distance 755 can differ between at least two of the mounting spaces 1430 defined in the second section 705 of the plate 210. The mounting space 1430 can also be separated or spaced out by an interval distance along the plate 210. The interval distance can differ between pairs of the mounting spaces 1430. The interval distance of the mounting space 1430 can range between 1700 mm to 2100 mm.

Prior to the lateral impact 305 or 310, the connecting member through the second end 1140 of the non-transverse structural element 1130 can be held in the first region 1410 of the opening 1405 to hold the battery pack 130 in the first position 145. The head portion of the connecting member can rest or can be supported by the non-transverse structural element 1130 about the first region 1410 of the opening 1405. In response to the lateral impact 305 or 310, the plate 210 can be forced to move or shift across the top layer 200 of the panel 140. Mechanically coupled with the plate 210 on the first end 1135, the non-transverse structural element 1130 can also be forced to move or shift. The shifting of the non-transverse structural element 1130 can cause the connecting member to move from the first region 1410 to the second region 1415 of the opening 1405 defined on the second end 1140 of the non-transverse structural element 1130. The cross-sectional area of the head portion of the connecting member can be larger than the cross-sectional area of the second region 1415 of the opening 1405. The connecting member can thus drop, descend, or plunge through the second region 1415 of the opening 1405 and into the cavity 1425 defined in the holder element 1420. With the connecting member positioned or held in the cavity 1425, the battery pack 130 can drop to the second position 300 outside the interior opening 120 of the electric vehicle 100 in the bottom region 105.

Figure 15:
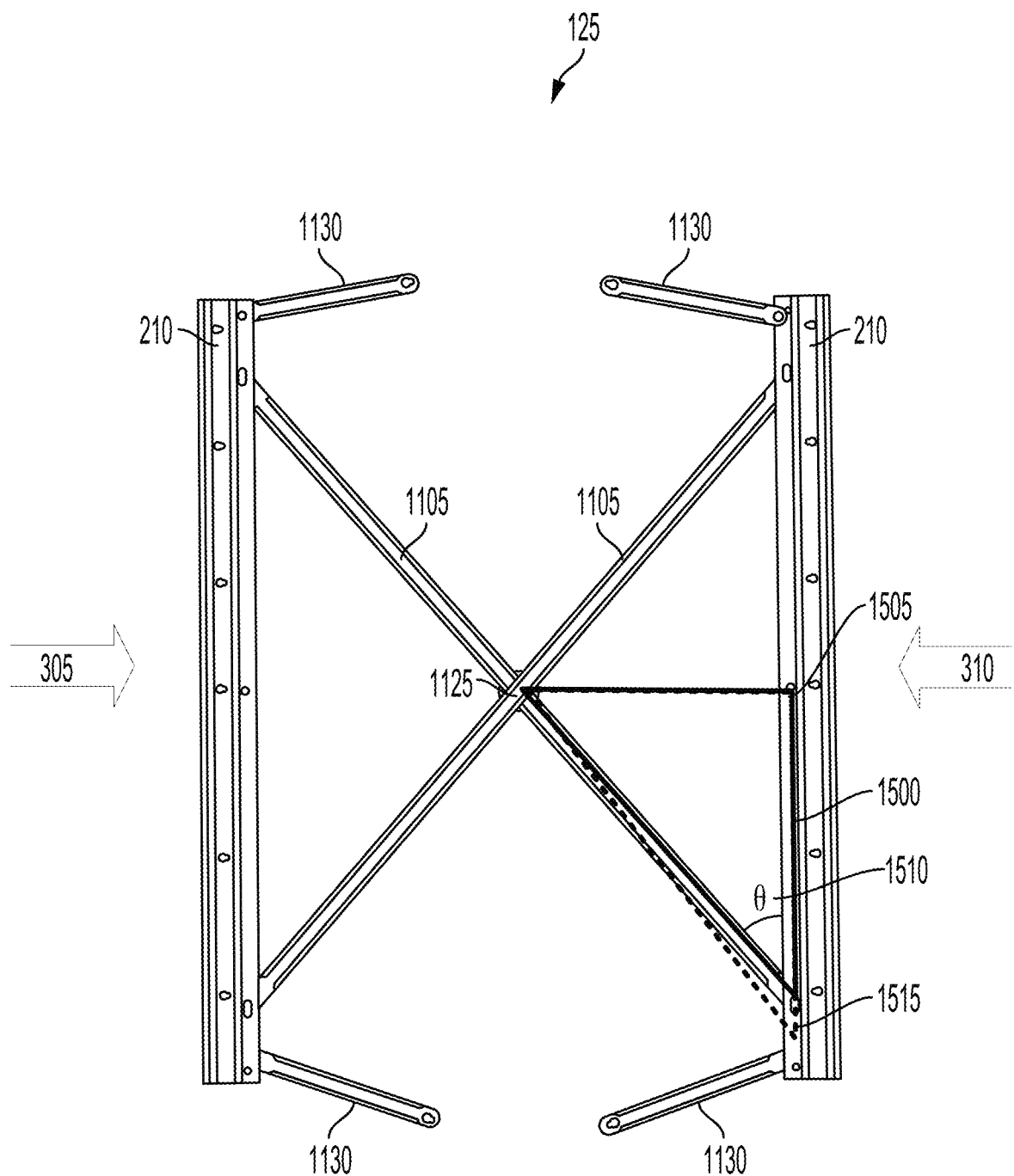
FIG. 15 depicts an overhead view of structural elements mechanically coupled with a plate of an example apparatus for providing electrical power to components of an electric vehicle.

FIG. 15, among others, depicts an overhead view of the structural elements 1105 and 1130 mechanically coupled with the plate 210 of the apparatus 125 for providing electrical power to components of the electric vehicle 100. As depicted, the crisscrossing transverse structural elements 1105 can revolve, rotate, turn, or otherwise move about the intersection point 1125 in response to the lateral impact 305 or 310. The positioning and orientation of the transverse structural elements 1105 with respect to the plates 210 can change or shift relative to prior to the lateral impact 305 or 310 and subsequent to the lateral impact 305 or 310.

Prior to the lateral impact 305 or 310, when the battery pack 130 is in the first position 145, one of transverse structural elements 1105 and the intersection point 1125 can define a triangle 1500. The triangle 1500 can span a triangular portion of the interior opening 120 defined in the bottom region 105 of the electric vehicle 100. The triangle 1500 can have an edge spanning from one end of the transverse structural element 1105 to the intersection point 1125. The triangle 1500 can have an edge spanning from the intersection point 1125 to a midpoint 1505 on the plate 210 and can be orthogonal to the lateral axis of the plate 210. The triangle 1500 can have an edge spanning from the midpoint 1505 of the plate 210 to the end 1110 or 1115 of the transverse structural element 1105. The edge spanning from the midpoint 1505 of the plate 210 to the end 1110 or 1115 of the transverse structural element 1105 and the edge spanning from the end 1110 or 1115 of the transverse structural element 1105 to the intersection point 1125 can define an angle 1510. When the battery pack 130 is in the first position 145, the angle 1510 can range between 35° to 45°. In addition, the edge spanning from the midpoint 1505 of the plate 210 to the end 1110 or 1115 of the transverse structural element 1105 along the plate 210 can have a length ranging between 750 mm to 850 mm.

In response to the lateral impact 305 or 310, the ends 1110 and 1115 of the transverse structural elements 1105 can shift along plate 210. Each connecting member 1300 coupling the corresponding transverse structural element 1105 to the plate 210 can move from the first end 1305 to the second end 1310. In addition, the edges of the triangle 1500 defined between one of transverse structural elements 1105 and the intersection point 1125 to form a triangle 1515. The triangle 1515 can have an edge spanning from one end of the transverse structural element 1105 to the intersection point 1125. The triangle 1515 can have an edge spanning from the intersection point 1125 to a midpoint 1505 on the plate 210 and can be orthogonal to the lateral axis of the plate 210. The triangle 1515 can have an edge spanning from the midpoint 1505 of the plate 210 to the end 1110 or 1115 of the transverse structural element 1105 shifted as a result of the lateral impact 305 or 310. With the battery pack 130 in the second position 300 from the lateral impact 305 or 310, the angle 1510 can be reduced. The angle 1510 of the triangle 1515 can range between 35° to 45°. In addition, the length of the edge spanning from the midpoint 1505 of the plate 210 to the end 1110 or 1115 of the transverse structural element 1105 along the plate 210 can increase. The length of the edge spanning from the midpoint 1505 to the end 1110 or 1115 in the triangle 1515 can range between 750 mm to 850 mm.

Figure 16:
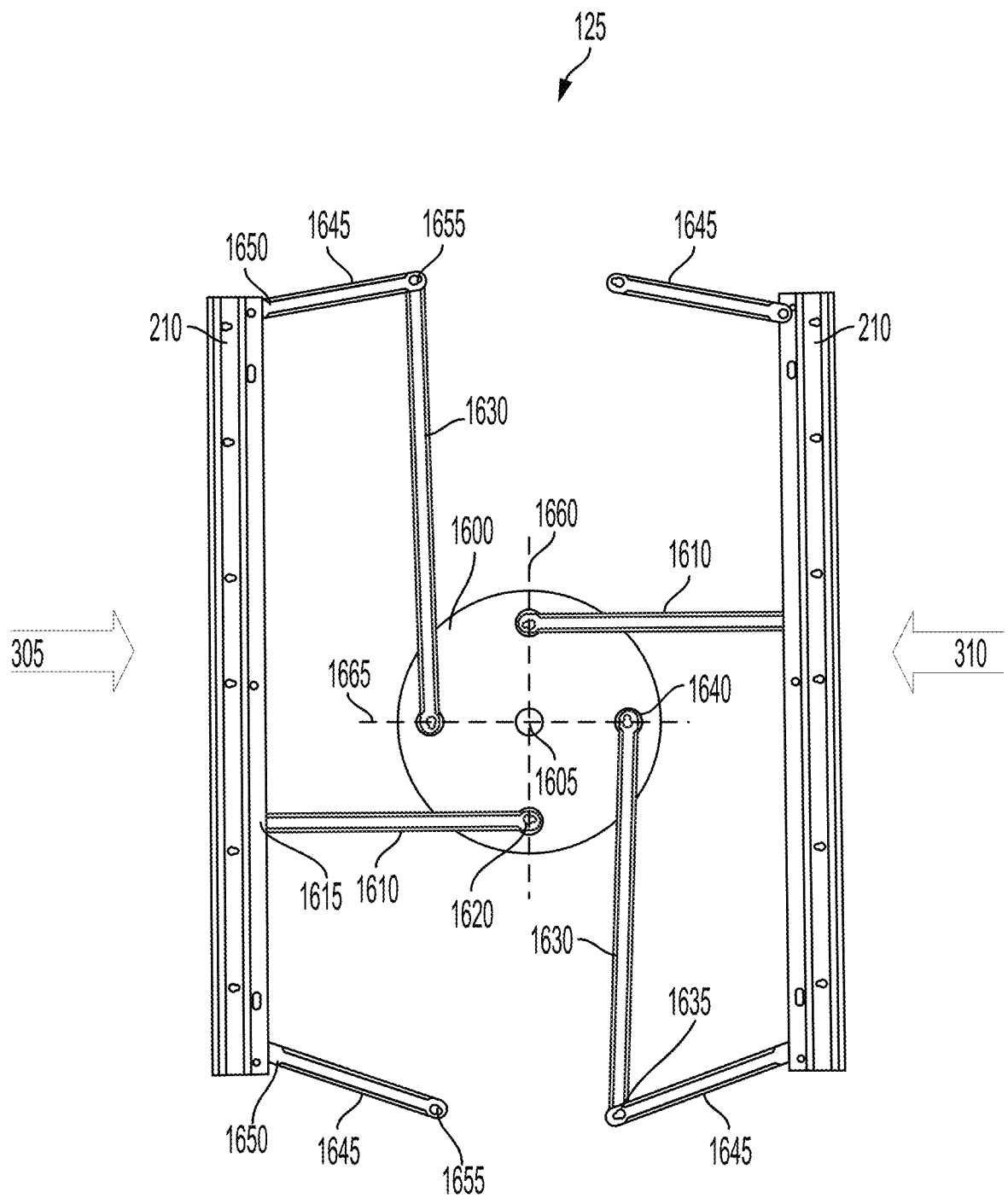
FIG. 16 depicts an overhead view of structural elements mechanically coupled with a disc element of an example apparatus for providing electrical power to components of an electric vehicle.

FIG. 16, among others, depicts an overhead view of the structure elements mechanically coupled with the apparatus 125 for providing electrical power to components of the electric vehicle 100. As depicted, the apparatus 125 can include at least one rotation element 1600 (sometimes herein referred to as a disc element or disc). The rotation element 1600 can be disposed or arranged within the interior opening 120 in the bottom region 105 of the electric vehicle 100. The rotation element 1600 can be situated, arranged, or disposed between the battery pack 130 and the mounting surface 110 within the interior opening 120 in the bottom region 105. The rotation element 1600 can be disposed or arranged on the top surface 1100 of the battery pack 130. The rotation element 1600 can be disposed or arranged on the bottom longitudinal side of the mounting surface 110. The rotation element 1600 can have a top surface at least partially flush or in contact with the mounting surface 110. The rotation element 1600 can be attached, connected, or otherwise mechanically coupled with the mounting surface 110. The coupling between the rotation element 1600 with the mounting surface 110 can be at or about a rotation axis 1605. The rotation axis 1605 can be defined generally in an interior portion of the rotation element 1600 (e.g., as depicted generally in the center). The rotation element 1600 can be mechanically coupled with each plate 210 arranged along the lateral members of the internal frame 115. The mechanically coupling between the rotation element 1600 and each plate 210 can be indirect. The rotation element 1600 can also be mechanically coupled with the battery pack 130 (e.g., along the lateral surface 1400). The mechanically coupling between the rotation element 1600 and the lateral surface 1400 of the battery pack 130.

The rotation element 1600 can transfer the resultant force of the lateral impact 305 or 310 from one lateral side of the electric vehicle 100 to the opposing lateral side. The rotation element 1600 can also transfer the reactive force in response to the lateral impact 305 or 310 from the opposing lateral side back to the lateral side upon which the lateral impact 305 or 310 occurred. The transferal of the forces can be via the mechanical coupling of the rotation element 1600 with the plates 210 disposed along the lateral members of the internal frame 115. In transferring the resultant force and the reactive force in response to the lateral impact 305 or 310, the rotation element 1600 can turn, revolve, or rotate about the rotation axis 1605. The coupling between the rotation element 1600 with the mounting surface 110 can allow the rotation element 1600 to turn or rotate about the rotation axis 1605 in response to the lateral impact 305 or 310. Via the torque from the turning about the rotation axis 1605, the rotation element 1600 can also absorb and reduce at least a portion of the resultant force or the reactive force in response to the lateral impact 305 or 310.

The rotation element 1600 can be situated generally within a middle part of the interior opening 120 defined in the bottom region 105 of the electric vehicle 100. The rotation element 1600 can be positioned ranging between away from a lengthwise lateral side (e.g., left or right side) of the electric vehicle 100. The rotation element 1600 can be positioned ranging between 795 mm to 1395 mm away from a widthwise lateral side (e.g., front or end) of the electric vehicle 100 or the battery pack 130. The rotation axis 1605 can be positioned 420 mm to 920 mm away from the lengthwise lateral side (e.g., left or right side) of the electric vehicle 100. The rotation axis 1605 can be positioned ranging between 795 mm to 1395 mm away from a widthwise lateral side (e.g., front or end) of the electric vehicle 100. The rotation element 1600 can be of any shape. The shape of the rotation element 1600 can be prismatic with a polygonal base, such as a triangle, square, a rectangular, a pentagon, or a hexagon. The shape of the rotation element 1600 can be cylindrical with a circular (e.g., as illustrated), ovular, or elliptical base, among others. The rotation element 1600 can have a length ranging between 250 mm to 600 mm. The rotation element 1600 can have a width (or a diameter in circular examples) ranging between 250 mm to 600 mm. The rotation element 1600 can have a thickness ranging between 5 mm to 50 mm.

The apparatus 125 can include a set of widthwise structural elements 1610 (sometimes herein generally referred to as structural elements). Each widthwise structural element 1610 can be a load-bearing structure. Each widthwise structural element 1610 can transfer the resultant force of the lateral impact 305 or 310 from one lateral side of the electric vehicle 100 to the opposing lateral side. Each widthwise structural element 1610 can transfer the reactive force in response to the lateral impact 305 or 310 from the opposing lateral side back to the lateral side upon which the lateral impact 305 or 310 occurred. The type of load supported by each widthwise structural element 1610 can include axial, bending, compressive, or tension, among others. The set of widthwise structural elements 1610 can be any type of load-bearing structure, such as a bar, a beam, a tie rod, an eye bar, a suspension cable, a rod, a wire rope, among others. The number of widthwise structural elements 1610 can range between 2 pieces to 5 pieces. The set of widthwise structural elements 1610 can be of any shape. The shape of each widthwise structural element 1610 can be prismatic with a polygonal base, such as a triangle, square, a rectangular (e.g., as depicted), a pentagon, or a hexagon. The shape of each widthwise structural element 1610 can be cylindrical with a circular, ovular, or elliptical base, among others. Each widthwise structural element 1610 can have a length ranging between 900 mm to 1250 mm. Each widthwise structural element 1610 can have a width ranging between 40 mm to 60 mm. Each widthwise structural element 1610 can have a thickness ranging between 2 mm to 8 mm.

The set of widthwise structural elements 1610 can be arranged or disposed within the interior opening 120 defined in the bottom region 105 of the electric vehicle 100. Each widthwise structural element 1610 can at least partially span the interior opening 120 defined in the bottom region 105 of the electric vehicle 100. The set of widthwise structural elements 1610 can partially span from one lengthwise lateral side of the interior opening 120 (e.g., a left or a right side as depicted) within the bottom region 105. The set of widthwise structural elements 1610 can be arranged or disposed on the top surface 1100 of the battery pack 130. At least a portion of each widthwise structural element 1610 can rest or can be supported on the top surface 1100 of the battery pack 130 situated in the first position 145. The portion of each widthwise structural element 1610 may no longer be in contact with the top surface 1100 of the battery pack 130 when situated in the second position 300.

Each widthwise structural element 1610 can span from the plate 210 on one lateral side of the electric vehicle 100 to the plate 210 to the rotation element 1600. Each widthwise structural element 1610 can have a first end 1615 and a second end 1620. The first end 1615 and the second end 1620 can correspond to opposing ends on the widthwise structural element 1610. The first end 1615 of each widthwise structural element 1610 can be mechanically coupled or connected with the plate 210 on one side. The mechanical coupling between the first end 1615 and the plate 210 may be with a fastener, such as a bolt (e.g., as depicted), a clamp, a clasp, and a screw, among others. The first end 1615 of each widthwise structural element 1610 can rest or can be supported by the plate 210 and the panel 140 disposed beneath the plate 210 on one side. The first end 1615 of each widthwise structural element 1610 can fit or be mounted or secured between the bottom surface of the plate 210 and the top surface of the top layer 200 of the panel 140. The first end 1615 of each widthwise structural element 1610 can also fit or be mounted or secured between the bottom surface of the plate 210 and the top surface 1100 of the battery pack 130.

The second end 1620 of each widthwise structural element 1610 can be mechanically coupled or connected with the rotation element 1600. The mechanical coupling between the second end 1620 and the rotation element 1600 may be with a fastener, such as a bolt (e.g., as depicted), a clamp, a clasp, and a screw, among others. The second end 1620 of each widthwise structural element 1610 can rest or can be supported by the rotation element 1600. For example, the second end 1620 can rest on an outer portion on the top surface of the rotation element 1600. The second end 1620 also fit or be mounted or secured between the bottom surface of the rotation element 1600 and the top surface 1100 of the battery pack 130. The second end 1620 can be connected to the rotation element 1600 at a distance ranging between 15 mm to 200 mm from the rotation axis 1605.

The apparatus 125 can include a set of lengthwise structural elements 1630 (sometimes herein generally referred to as structural elements). Each lengthwise structural element 1630 can be a load-bearing structure. Each lengthwise structural element 1630 can transfer the resultant force of the lateral impact 305 or 310 from one lateral side of the electric vehicle 100 to the opposing lateral side. Each lengthwise structural element 1630 can transfer the reactive force in response to the lateral impact 305 or 310 from the opposing lateral side back to the lateral side upon which the lateral impact 305 or 310 occurred. The type of load supported by each lengthwise structural element 1630 can include axial, bending, compressive, or tension, among others. The set of lengthwise structural elements 1630 can be any type of load-bearing structure, such as a bar, a beam, a tie rod, an eye bar, a suspension cable, a rod, a wire rope, among others. The number of lengthwise structural elements 1630 can range between 2 pieces to 5 pieces. The set of lengthwise structural elements 1630 can be of any shape. The shape of each lengthwise structural element 1630 can be prismatic with a polygonal base, such as a triangle, square, a rectangular (e.g., as depicted), a pentagon, or a hexagon. The shape of each lengthwise structural element 1630 can be cylindrical with a circular, ovular, or elliptical base, among others. Each lengthwise structural element 1630 can have a length ranging between 900 mm to 1250 mm. Each lengthwise structural element 1630 can have a width ranging between 40 mm to 60 mm. Each lengthwise structural element 1630 can have a thickness ranging between 2 mm to 8 mm.

The set of lengthwise structural elements 1630 can be arranged or disposed within the interior opening 120 defined in the bottom region 105 of the electric vehicle 100. Each lengthwise structural element 1630 can at least partially span the interior opening 120 defined in the bottom region 105 of the electric vehicle 100. The set of lengthwise structural elements 1630 can partially span from one widthwise lateral side of the interior opening 120 (e.g., a front or a back side as depicted) within the bottom region 105. The set of lengthwise structural elements 1630 can be arranged or disposed on the top surface 1100 of the battery pack 130. At least a portion of each lengthwise structural element 1630 can rest or can be supported on the top surface 1100 of the battery pack 130 situated in the first position 145. The portion of each lengthwise structural element 1630 may no longer be in contact with the top surface 1100 of the battery pack 130 when situated in the second position 300.

Each lengthwise structural element 1630 can span from one lateral side (e.g., the lateral surface 1400) of the battery pack 130 to the rotation element 1600. Each lengthwise structural element 1630 can have a first end 1635 and a second end 1640. The first end 1635 and the second end 1640 can correspond to opposing ends on the widthwise structural element 1610. The first end 1635 of each widthwise structural element 1610 can be mechanically coupled or connected with the plate 210 on one side. The mechanical coupling between the first end 1635 and the plate 210 can be indirect (e.g., as depicted). When directly coupled, the first end 1635 of each widthwise structural element 1610 can rest or can be supported by the plate 210 and the panel 140 disposed beneath the plate 210 on one side. The first end 1635 of each widthwise structural element 1610 can fit or be mounted or secured between the bottom surface of the plate 210 and the top surface of the top layer 200 of the panel 140. The first end 1635 of each widthwise structural element 1610 can also fit or be mounted or secured between the bottom surface of the plate 210 and the top surface 1100 of the battery pack 130. The mechanical coupling between the first end 1635 and the plate 210 may be with a fastener, such as a bolt (e.g., as depicted), a clamp, a clasp, and a screw, among others.

The second end 1640 of each widthwise structural element 1610 can be mechanically coupled or connected with the rotation element 1600. The mechanical coupling between the second end 1640 and the rotation element 1600 may be with a fastener, such as a bolt (e.g., as depicted), a clamp, a clasp, and a screw, among others. The second end 1640 of each widthwise structural element 1610 can rest or can be supported by the rotation element 1600. For example, the second end 1640 can rest on an outer portion on the top surface of the rotation element 1600. The second end 1640 also fit or be mounted or secured between the bottom surface of the rotation element 1600 and the top surface 1100 of the battery pack 130. The second end 1640 can be connected to the rotation element 1600 at a distance ranging between 15 mm to 200 mm from the rotation axis 1605.

The apparatus 125 can include a set of non-transverse structural elements 1645 (sometimes herein generally referred to as structural elements). The set of non-transverse structural elements 1645 can be an instance of the set of non-transverse structural element 1130. Each non-transverse structural element 1645 can be a load-bearing structure. Each non-transverse structural element 1645 can transfer the resultant force of the lateral impact 305 or 310 from one lateral side of the electric vehicle 100 to the opposing lateral side through the battery pack 130. Each non-transverse structural element 1645 can transfer the reactive force in response to the lateral impact 305 or 310 from the opposing lateral side back to the lateral side upon which the lateral impact 305 or 310 occurred through the battery pack 130. The type of load supported by each non-transverse structural element 1645 can include axial, bending, compressive, or tension, among others. The set of non-transverse structural elements 1645 can be any type of load-bearing structure, such as a bar, a beam, a tie rod, an eye bar, a suspension cable, a rod, a wire rope, among others. The number of non-transverse structural elements 1645 can range between 2 pieces to 6 pieces. The set of non-transverse structural elements 1645 can be of any shape. The shape of each non-transverse structural element 1645 can be prismatic with a polygonal base, such as a triangle, square, a rectangular (e.g., as depicted), a pentagon, or a hexagon. The shape of each non-transverse structural element 1645 can be cylindrical with a circular, ovular, or elliptical base, among others. Each non-transverse structural element 1645 can have a length ranging between 475 mm to 575 mm. Each non-transverse structural element 1645 can have a width ranging between 40 mm to 60 mm. Each non-transverse structural element 1645 can have a thickness ranging between 2 mm to 8 mm.

The set of non-transverse structural elements 1645 can be arranged or disposed within the interior opening 120 defined in the bottom region 105 of the electric vehicle 100. Each non-transverse structural element 1645 can partially span the interior opening 120 defined in the bottom region 105 of the electric vehicle 100. The set of non-transverse structural elements 1645 can be arranged or disposed on the top surface 1100 of the battery pack 130. At least a portion of each non-transverse structural element 1645 can rest or can be supported on the top surface 1100 of the battery pack 130 situated in the first position 145. The portion of each non-transverse structural element 1645 may no longer be in contact with the top surface 1100 of the battery pack 130 when situated in the second position 300.

Each non-transverse structural element 1645 can span from the plate 210 on one lateral side of electric vehicle 100 to the top surface 1100 of the battery pack 130 within the interior opening 120 defined along the bottom region 105 of the electric vehicle 100. Each non-transverse structural element 1645 can span from the plate 210 on one lateral side of electric vehicle 100 to a lateral edge (e.g., the lateral surface 1400) of the battery pack 130 within the interior opening 120. The lateral edge can correspond to a periphery between side walls and the top surface 1100 of the battery pack 130. Each non-transverse structural element 1645 can have a first end 1650 and a second end 1655. The first end 1650 and the second end 1655 can correspond to opposing ends on the non-transverse structural element 1645. The first end 1650 and the second end 1620 can correspond to opposing ends on the non-transverse structural element 1645. The first end 1650 of each non-transverse structural element 1645 can be mechanically coupled or connected with the plate 210 on one side. The mechanical coupling between the first end 1650 of the non-transverse structural element 1645 with the battery pack 130 can be similar to the mechanical coupling between the second end 1115 of the non-transverse structural element 1130 (e.g., as detailed). For example, the first end 1650 can be mechanically coupled with the plate 210 via the connecting member 1300. The connecting member 1300 can be held in the slot 750 defined on the plate 210.

The second end 1655 of each non-transverse structural element 1645 can be mechanically coupled or connected with the top surface 1100 of the battery pack 130 (e.g., along the lateral surface 1400). The mechanical coupling between the second end 1655 of the non-transverse structural element 1645 with the battery pack 130 can be similar to the mechanical coupling between the second end 1140 of the non-transverse structural element 1130 (e.g., as detailed in FIG. 14). For example, the second end 1655 can be mechanically coupled with to the lateral surface 1400 via the holder element 1420. The second end 1655 of at least one of the non-transverse structural elements 1645 can be mechanically coupled with the first end 1635 of the lengthwise structural element 1630. The mechanical coupling between the second end 1655 of the non-transverse structural element 1645 and the first end 1635 of the lengthwise structural element 1630 may be with a fastener, such as a bolt, a clamp, a clasp, and a screw, among others. Coupled with the second end 1655 of the non-transverse structural element 1645, the first end 1635 of the lengthwise structural element 1630 can be also mechanically coupled with the lateral surface 1400 of the battery pack 130.

The rotation element 1600, the set of widthwise structural elements 1610, the set of lengthwise structural elements 1630 can transfer the force of the lateral impact 305 or 310 from one lateral side of the electric vehicle 100 to other lateral side. Prior to the lateral impact 305 or 310, the second end 1620 of each widthwise structural element 1610 and the second end 1640 of each lengthwise structural element 1630 can be at an initial position on the rotation element 1600. For example, the set of widthwise structural elements 1610 can be substantially orthogonal (e.g., within 15% deviation) with a lengthwise axis 1660. The lengthwise axis 1660 can be defined as substantially parallel (e.g., 15% deviation) to at least one of the plates 210. The lengthwise axis 1660 can span from one lateral side (e.g., front or end) of the electric vehicle 100 to another side and can pass through the rotation axis 1605. Furthermore, the set of lengthwise structural elements 1630 can be substantially orthogonal (e.g., within 15% deviation) with a widthwise axis 1665. The widthwise axis 1665 can be defined as substantially orthogonal (e.g., within 15% deviation) to at least one of the plates 210. The widthwise axis 1665 can span from one lateral side (e.g., left or right) of the electric vehicle 100 to another side, and can pass through the rotation axis 1605 in the rotation element 1600.

In response to the lateral impact 305 or 310, the plate 210 on the same side as the lateral impact 305 or 310 can be forced in toward the interior opening 120 defined in the bottom region 105 of the electric vehicle 100. Mechanically coupled with the plate 210 on the first end 1615, at least one of the widthwise structural element 1610 can be pushed inward. The movement of the widthwise structural element 1610 can cause the rotation element 1600 to turn or rotate about the rotation axis 1605. The turning of the rotation element 1600 can cause the second end 1620 of the other widthwise structural element 1610 and the second end 1640 of each lengthwise structural element 1630 to also move or turn about the rotation axis 1605. With the turning of the rotation element 1600, the second end 1620 of each widthwise structural element 1610 and the second end 1640 of each lengthwise structural element 1630 can be offset from the initial position on the rotation element 1600. For example, the set of widthwise structural elements 1610 may no longer be substantially orthogonal (e.g., greater than a deviation of 15%) with the lengthwise axis 1660. With the turning of the rotation element 1600, the first end 1615 of each widthwise structural element 1610 can move to pull or tug the plate 210 on the opposing side in toward the interior opening 120. In addition, the set of lengthwise structural elements 1630 may no longer substantially orthogonal (e.g., greater than a deviation of 15%) with the widthwise axis 1665. The movement of the lengthwise structural element 1630 can cause the connecting member holding the first end 1635 of the lengthwise structural element 1630 and the second end 1655 of the non-transverse structural element 1645 to drop or plunge into the holder element 1420. In this manner, the force from the lateral impact 305 or 310 can be transferred from one side of the electric vehicle 100 to the other.

Figure 17:
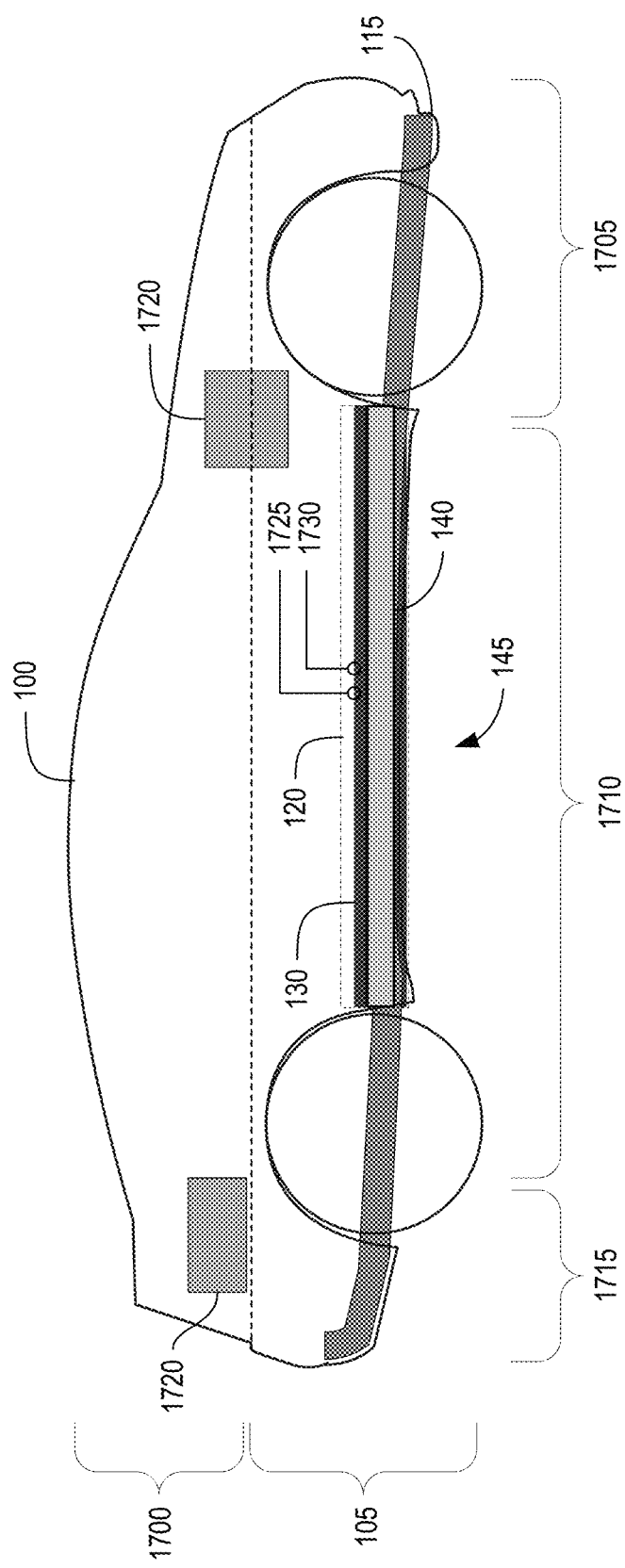
FIG. 17 depicts a cross-sectional view of an example electric vehicle installed with a battery pack in a first position.

FIG. 17, among others, depicts a cross-sectional view of the electric vehicle installed with the battery pack 130 in the first position 145. As depicted, the electric vehicle 100 can be divided into a top region 1700 and the bottom region 105. Within the bottom region 105, the internal frame 115 can span a front portion 1705 (e.g., a hood or bonnet portion), a body portion 1710, and a rear portion 1715 (e.g., a trunk portion) of the electric vehicle 100. The battery pack 130 can be installed, arranged, or disposed in the interior opening 120 defined within the electric vehicle 100 in the bottom region 105. The battery pack 130 can span at least one of the front portion 1705, the body portion 1710, and the rear portion 1715. The panel 140 (and the plate 210 disposed on the top layer 200) can span at least one of the front portion 1705, the body portion 1710, and the rear portion 1715. The interior opening 120 can extend at least one of the front portion 1705, the body portion 1710, and the rear portion 1715.

Prior to the lateral impact 305 or 310, the battery pack 130 can be in the first position 145, and can be disposed within the interior opening 120 defined in the bottom region 105 of the electric vehicle 100. In the first position 145, the battery pack 130 can supply electrical power to one or more components 1720 of the electric vehicle 100. To provide to the electrical power, the battery pack 130 can be electrically coupled with at least one positive current collector 1725 (e.g., a positive busbar) and at least one negative current collector 1730 (e.g., a negative busbar). The positive current collector 1725 can be electrically coupled with the positive terminal of the battery pack 130. The negative current collector 1730 can be electrically coupled with the negative terminal of the battery pack 130. Both the positive current collector 1725 and the negative current collector 1730 can extend from outside the interior opening 120 defined in the bottom region 105. Both the positive current collector 1725 and the negative current collector 1730 can be electrically coupled with the one or more components 1720 of the electric vehicle 100. The one or more components 1720 can include an electric engine, an entertainment system (e.g., a radio, display screen, and sound system), on-board diagnostics system, and electric control units (ECUs) (e.g., an engine control module, a transmission control module, a brake control module, and a body control module), among others. The one or more components 1720 can also include a motor, lights, radio, or garage door opener, among others. The one or more components 1720 can be housed or can reside in the top region 1700 or the bottom region 105 of the electric vehicle 100, or both the top region 1700 and the bottom region 105.

Figure 18:
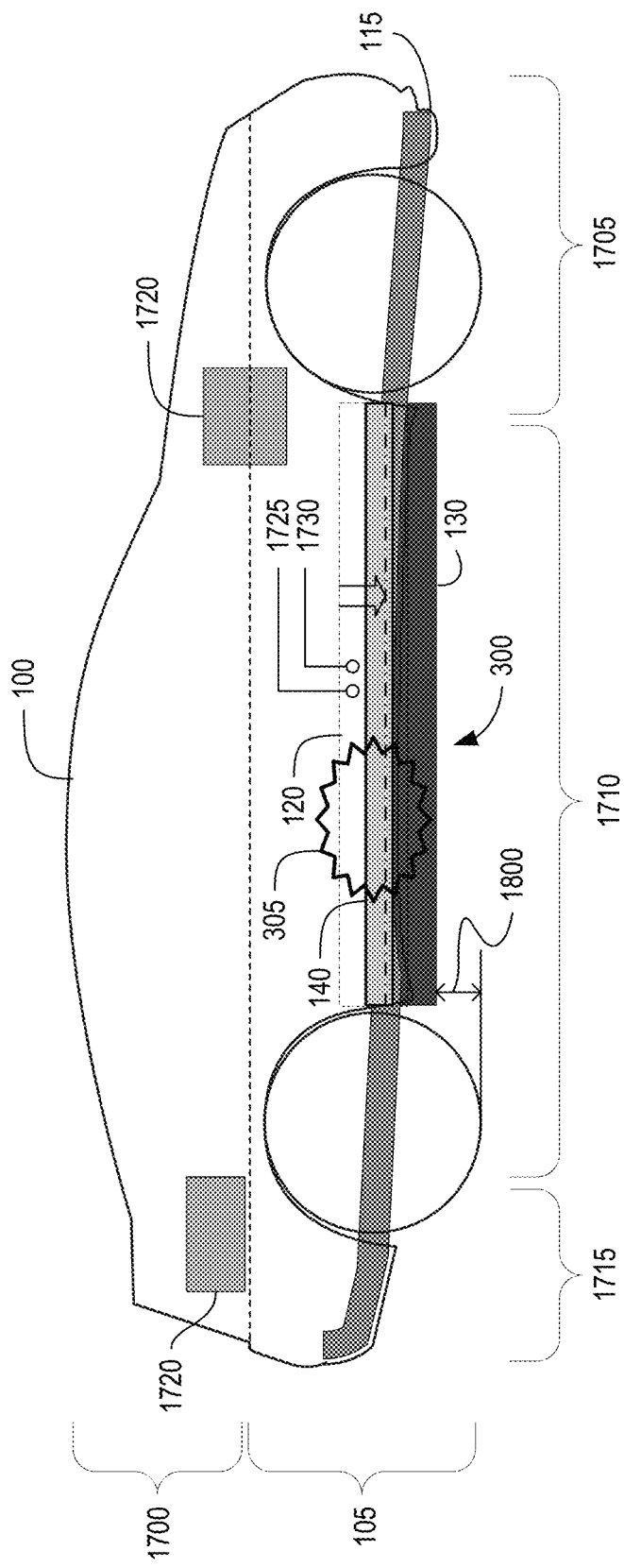
FIG. 18 depicts a cross-sectional view of an example electric vehicle installed with a battery pack in a second position.

FIG. 18, among others, depicts a cross-sectional view of the electric vehicle 100 installed with the battery pack 130 in the second position 300. As depicted, in response to the lateral impact 305 or 310, the panel 140 can allow the battery pack 130 to descend, drop, or plunge from the first position 145 to the second position 300 outside the interior opening 120. The panel 140 on the opposite side as the lateral impact 305 or 310 can also allow the battery pack 130 to descend, drop, or plunge to the second position 300 outside the interior opening 120. The panel 140 can allow the battery pack 130 to be suspended or hanging outside the interior opening 120 in the second position 300 via the connecting members 215. The battery pack 130 can be suspended or hanging from the ground beneath the electric vehicle 100 by a clearance distance 1800. The bottom surface of the battery pack 130 can be substantially parallel (e.g., 15% deviation) to at least a portion of the ground beneath the electric vehicle 100. The clearance distance 1800 can range between 170 mm to 210 mm.

In addition, with the battery pack 130 dropped, the battery pack 130 may no longer be electrically coupled with the positive current collector 1725 or the negative current collector 1730, thereby preventing short circuiting. The battery pack 130 can be physically disconnected from the positive current collector 1725 or the negative current collector 1730. The portion of the positive current collector 1725 or the portion of the negative current collector 1730 within the interior opening 120 can reside. As such, the likelihood of catastrophic failure in the battery pack 130 (e.g., fire or explosion) as a result of the lateral impact 305 or 310 on the electric vehicle 100 may be reduced. Furthermore, the battery pack 130 may no longer supply or provide electrical power to the one or more components 1720 of the electric vehicle 100.

Figure 19:
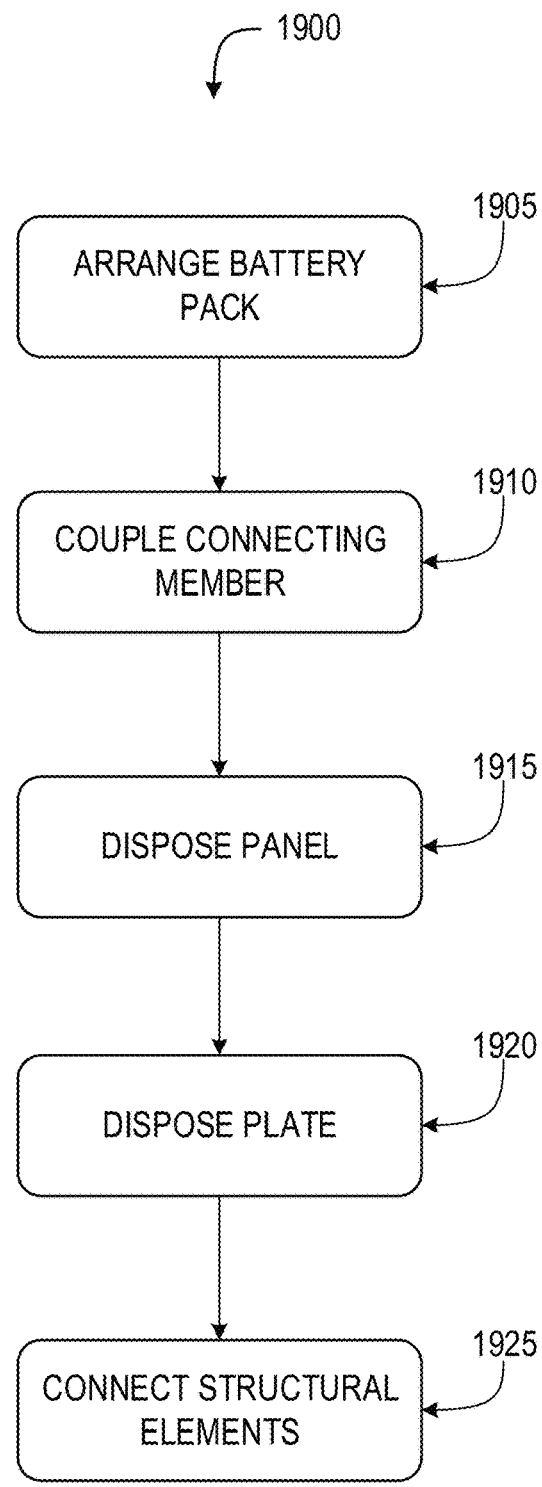
FIG. 19 shows a flow diagram depicting an example method of assembling a battery module for powering electric vehicles.

FIG. 19 depicts an example flow diagram for a method 1900 of assembling a battery pack for powering electric vehicles. The method 1900 can be implemented using any of the components detailed herein in conjunction with FIGS. 1-18. The method 1900 can include arranging a battery pack 130 in an interior opening 120 (1905). The battery pack 130 can be inserted, housed, or otherwise included in the interior opening 120 in a bottom region 105 of an electric vehicle 100. The battery pack 130 can be attached or connected onto a mounting surface 110 in the bottom region 105. The interior opening 120 can be defined by the mounting surface 110 and one or more lateral members of an internal frame 115 of the electric vehicle 100. The battery pack 130 can have a set of battery cells to provide electrical power to one or more components 1720 in the electric vehicle 100. The battery pack 130 can also have a support structure 135 on a lateral side to mechanically couple with the mounting surface 110. The battery pack 130 can be situated in a first position 145. In the first position 145, at least a portion of a top surface 1100 of the battery pack 130 can be flush with the mounting surface 110.

The method 1900 can include coupling a connecting member 215 (1910). The connecting member 215 can be mechanically coupled or connected with the support structure 135 on the battery pack 130. The connecting member 215 can have a head portion 505, a body portion 510, and a tail portion 515, among others. The head portion 505 can have a cross-sectional area larger than a cross-sectional area of the body portion 510. The tail portion 515 can have a cross-sectional area larger than the cross-sectional area of the body portion 510. The tail portion 515 can be connected to at least the support structure 135 of the battery pack 130. The tail portion 515 can be inserted, adhered, or attached onto a top surface of the support structure 135 on the battery pack 130.

The method 1900 can include disposing a panel 140 (1915). The panel 140 can be added or inserted into the interior opening 120 in the bottom region 105 of the electric vehicle 100. The panel 140 can be attached or added to one of the lateral members of the internal frame 115. The panel 140 can be formed from one of the lateral members of the internal frame 115 spanning the bottom region 105 of the electric vehicle 100. The panel 140 can have a top layer 200 and a bottom layer 205. The top layer 200 can define a set of openings 600. Each opening 600 can pass the head portion 505 and the body portion 510 of the connecting member 215. The set of openings 600 can be braised, drilled, etched, or otherwise formed on the top layer 200 of the panel 140. The bottom layer 205 can define a set of openings 605. The set of openings 605 can be braised, drilled, etched, or otherwise formed on the bottom layer 205 of the panel 140. Each opening 605 on the bottom layer 205 can be aligned with one of the openings 600 on the top layer 200. Each opening 605 on the bottom layer 205 can have a cross-sectional area less than a cross-sectional area of the opening 600 on the top layer 200. Each opening 605 can pass the body portion 510 of the connecting member 215. Each opening 605 can support the head portion 505 of the connecting member 215 on the bottom layer 205 about the opening 605.

The method 1900 can include disposing a plate 210 (1920). The plate 210 can be placed or situated on atop of the top layer 200 of the panel 140. The plate 210 can be added or inserted between the top layer 200 of the panel 140 and the mounting surface 110. The plate 210 can define a set of openings 710. Each opening 710 can be braised, drilled, etched, or otherwise formed from the plate 210. Each opening 710 can have a first region 720 to support the head portion 505 of the connecting member 215 on the plate 210 to hold the battery pack 130 in the first position 145. Each opening 710 can also have a second region 725. The second region 725 can be contiguous with the first region 720. The second region 725 can have a cross-sectional area larger than a cross-sectional area of the first region 720. The second region 725 can allow the connecting member 215 to move from the first region 720 to the second region 725 in response to a lateral impact 305 or 310. The head portion 505 of the connecting member 215 may be no longer supported by the plate 210 in the second region 725 of the opening 710. The movement of the connecting member 215 can allow the battery pack 130 to move from the first position 145 to a second position 300 outside the interior opening 120 defined in the bottom region 105 of the electric vehicle 100.

The method 1900 can include connecting set of structural elements (e.g., transverse structural elements 1105 or non-transverse structural elements 1130) (1925). The transverse structural elements 1105 or the non-transverse structural elements 1130 can be inserted into the interior opening 120 defined in the bottom region 105 of the electric vehicle 100.

A first end 1110 of each transverse structural element 1105 can be attached or connected (e.g., using a fastener) to the plate 210 on one side in the bottom region 105 of the electric vehicle 100. A second end 1115 of each transverse structural element 1105 can be attached or connected (e.g., using a fastener) to the plate 210 on the opposing side in the bottom region 105 of the electric vehicle 100. A first end 1135 of each non-transverse structural element 1130 can be attached or coupled (e.g., using the connecting member 1300) to the plate 210. A second end 1140 of each non-transverse structural element 1130 can be attached or coupled to the lateral surface 1400 of the battery pack 130. The transverse structural elements 1105 or the non-transverse structural elements 1130 can allow the force from the lateral impact 305 or 310 to be transferred from one side of the electric vehicle 100 to the opposing side.

Figure 20:
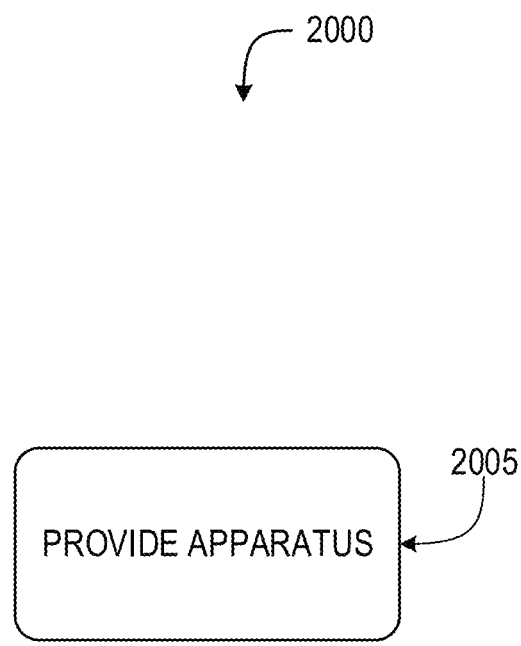
FIG. 20 shows a flow diagram depicting an example method of providing an apparatus to an electric vehicle.

FIG. 20 depicts an example method 2000 of providing an apparatus to an electric vehicle. The method 2000 can be implemented using any of the components detailed herein in conjunction with FIGS. 1-17. The method 2000 can include providing an apparatus 125 (2005). The apparatus 125 can be installed, housed, or otherwise provided within an electric vehicle 100. The apparatus 125 can have a battery pack 130. The battery pack 130 can be arranged in a first position 145 beneath a mounting surface 110 in an interior opening 120 of a bottom region 105 of the electric vehicle 100. The interior opening 120 can be defined by the mounting surface 110 and one or more lateral members of an internal frame 115 of the electric vehicle 100. The battery pack 130 can have a set of battery cells to provide electrical power to one or more components 1720 of the electric vehicle 100. The battery pack 130 can also have a support structure 135 to hold the battery pack 130 in the first position 145. The apparatus 125 can include a set of connecting members 215. Each connecting member 215 can be mechanically coupled with the support structure 135 on the battery pack 130. Each connecting member 215 can have a head portion 505 and a body portion 510.

The apparatus 125 can include a set of panels 140. Each panel 140 can be disposed on a lateral member of the internal frame 115 in the bottom region 105 of the electric vehicle 100. The panel 140 can have a top layer 200 and a bottom layer 205. The top layer 200 can define a set of openings 600. Each opening 600 can pass the head portion 505 and the body portion 510 of the connecting member 215. The bottom layer 205 can define a set of openings 605. Each opening 605 on the bottom layer 205 can be aligned with one of the openings 600 on the top layer 200. Each opening 605 on the bottom layer 205 can have a cross-sectional area less than a cross-sectional area of the opening 600 on the top layer 200. Each opening 605 can pass the body portion 510 of the connecting member 215. Each opening 605 can support the head portion 505 of the connecting member 215 on the bottom layer 205 about the opening 605. The apparatus 125 can include a set of plates 210. Each plate 210 can be arranged on the top layer 200 of one of the panels 140. The plate 210 can mechanically couple the panel 140 to the mounting surface 110. The plate 210 can define a set of openings 710. Each opening 710 can have a first region 720 to support the head portion 505 of the connecting member 215 on the plate 210 to hold the battery pack 130 in the first position 145. Each opening 710 can also have a second region 725. The second region 725 can be contiguous with the first region 720. The second region 725 can have a cross-sectional area larger than a cross-sectional area of the first region 720. The second region 725 can allow the connecting member 215 to move from the first region 720 to the second region 725 in response to a lateral impact 305 or 310. The movement of the connecting member 215 can allow the battery pack 130 to move from the first position 145 to a second position 300 outside the interior opening 120 defined in the bottom region 105 of the electric vehicle 100.

While operations may be depicted in the drawings or described in a particular order, such operations are not required to be performed in the particular order shown or described, or in sequential order, and all depicted or described operations are not required to be performed. Actions described herein can be performed in different orders.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. Further, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. An apparatus to provide electrical power to components in electric vehicles, comprising:
    a battery pack arranged in a first position beneath a mounting surface and within an interior opening of an internal frame that is disposed within a bottom region of an electric vehicle, the interior opening partially defined by a lateral member of the internal frame and the mounting surface, the battery pack having a plurality of battery cells to store electric energy and having a support structure to hold the battery pack in the first position;
    a connecting member mechanically coupled with the support structure of the battery pack, the connecting member having a head portion and a body portion;
    a panel disposed along the lateral member of the internal frame in the bottom region of the electric vehicle, the panel having:
        a top layer defining a top panel opening to pass the head portion and the body portion of the connecting member, and
        a bottom layer separated from the top layer, the bottom layer defining a bottom panel opening, the bottom panel opening aligned with the top panel opening and having an area less than an area of the top panel opening to pass the body portion and to support the head portion on the bottom layer; and
    a plate disposed on the top layer of the panel to couple the panel with the mounting surface of the electric vehicle, the plate defining a plate opening, the plate opening having:
        a first region to support the head portion of the connecting member onto the plate to hold the battery pack in the first position; and
        a second region contiguous with the first region, the second region having an area larger than an area of the first region to shift the head portion of the connecting member to the second region to allow the battery pack to move from the first position to a second position outside the interior opening of the internal frame in response to a lateral impact on the electric vehicle.

2. The apparatus of claim 1, comprising:
the plate disposed on the top layer of the panel arranged along a first side of the electric vehicle; and
a second plate disposed on a top layer of a second panel arranged along a second side opposite side of the first side to couple the second panel with the mounting surface of the electric vehicle, the second plate defining a plate opening, the plate opening having:
    a first region to support the head portion of a second connecting member onto the second plate to hold the battery pack in the first position; and
    a second region contiguous with the first region, the second region having an area larger than an area of the first region to shift a head portion of the second connecting member through the second region to allow the battery pack to move from the first position to the second position on the second side in response to the lateral impact on the first side of the electric vehicle opposite of the second side on which the second plate is arranged.

3. The apparatus of claim 1, comprising:
the plate defining a slot, the slot having a first region and a second region along a first side of the electric vehicle, the slot supporting a second connecting member on the plate to move the second connecting member from the first region to the second region in response to the lateral impact on the first side of the electric vehicle;
a structural element spanning the interior opening, the structural element having a first end connected to the plate on the first side via the second connecting member in the first region and having a second end connected to a second plate that is disposed on a top layer of a second panel that is disposed on a second lateral member of the internal frame on a second side opposite of the first side; and
the structural element to shift from a first end to a second end in response to the lateral impact on the first side to allow the battery pack to move to the second position outside the interior opening both on the first side and the second side.

4. The apparatus of claim 1, comprising:
the plate disposed on the top layer of the panel arranged along a first side of the electric vehicle;
a second plate disposed on a top layer of a second panel arranged along a second side opposite side of the first side to couple the second panel with the mounting surface of the electric vehicle;
a first structural element spanning the interior opening from the first side to the second side, the first structural element having a first end mechanically coupled with the panel and a second end mechanically coupled with the second panel;
a second structural element spanning the interior opening from the second side to the first side and intersecting with the first structural element at a midpoint, the second structural element having a first end mechanically coupled with the panel and a second end mechanically coupled with the second panel; and
the second linear structure element to move about the midpoint relative to the first linear structure element in response to the lateral impact on the electric vehicle to allow the battery pack to move to the second position outside the interior opening both on the first side and the second side.

5. The apparatus of claim 1, comprising:
the plate disposed on the top layer of the panel arranged along a first side of the electric vehicle;
a second plate disposed on a top layer of a second panel arranged along a second side opposite side of the first side to couple the second panel with the mounting surface of the electric vehicle;
a rotation element disposed on a top surface of the battery pack to mechanically couple the battery pack with the mounting surface;

a first structural element disposed within the interior opening, the first structural element having a first end mechanically coupled with the panel and a second end mechanically coupled with the rotation element;

a second structural element disposed within the interior opening, the second structural element having a first end mechanically coupled with the second panel and a second end mechanically coupled with the rotation element; and the second structural element to shift in response to the lateral impact on the electric vehicle to cause the rotation element to turn and to cause the first structural element to shift in response to the rotation of the rotation element, to allow the battery pack to move to the second position outside the interior opening both on the first side and the second side.

6. The apparatus of claim 1, comprising:

the plate defining a plate mounting space, the plate mounting space supporting a second connecting member;

the battery pack having a holder element, the holder element supporting a third connecting member, the third connecting member having a body portion and a head portion; and a structural element at least partially spanning the interior opening, the structural element having a first end mechanically coupled with the plate via the second connecting member and having a second end mechanically coupled with the battery pack via the third connecting member, the structural element defining a battery mounting space, the battery mounting space having:

a first region to support holding the head portion of the third connecting member to hold the battery pack in the first position; and a second region contiguous with the first region, the second region having an area larger than an area of the first region to shift the head portion of the third connecting member from the first region to the second region to allow the battery pack to move from the first position to the second position in response to the lateral impact on the electric vehicle.

7. The apparatus of claim 1, comprising:

a plurality of connecting members each mechanically coupled with the support structure of the battery pack, each connecting member having a head portion and a body portion;

the top layer defining a plurality of top panel openings, each to pass the head portion and the body portion of one of the plurality of connecting members, and the bottom layer defining a plurality of bottom panel openings, each bottom panel opening aligned with one of the plurality of top panel openings and having an area less than an area of the top panel opening to pass the body portion and to support the head portion on the bottom layer; and the plate defining a plurality of plate openings, each plate opening having:

a first region to support the head portion of one of the plurality of connecting members onto the plate to hold the battery pack in the first position; and a second region contiguous with the first region, the second region having an area larger than an area of the first region to shift the head portion of one of the plurality of connecting members onto the plate to the second region to allow the battery pack to move from the first position to the second position outside the interior opening of the internal frame in response to the lateral impact on the electric vehicle and to drop the head portion of each connecting member from the top layer to the bottom layer.

8. The apparatus of claim 1, comprising:

the top panel opening vertically aligned with the bottom panel opening;

the bottom panel opening vertically aligned with the top panel opening; and the panel opening vertically aligned with both the top panel opening and the bottom panel opening, the vertical alignment to change from the first region to the second region in response to the lateral impact on the electric vehicle to allow the connecting member to shift from the first region to the second region and to pass the head portion through the top panel opening.

9. The apparatus of claim 1, comprising:

the top layer of the panel separated from the bottom layer of the panel by a gap distance, the gap distance less than a length of the body portion of the connecting member to guide the connecting member to descend from the top layer to the bottom layer in response to the lateral impact on the electric vehicle.

10. The apparatus of claim 1, comprising:

the panel having a side wall between the top layer and the bottom layer, the side wall arranged along the lateral member of the internal frame in the bottom region of the electric vehicle.

11. The apparatus of claim 1, comprising:

the plate disposed on the top layer of the panel at an acute angle relative to the top layer to reduce a friction between the plate and the top layer of the panel in response to a force from the lateral impact than the friction to allow the connecting member to shift from the first region to the second region of the plate opening.

12. The apparatus of claim 1, comprising:

the plate defining the plate opening, the plate opening having:

the first region having a first distance relative to the interior opening, and the second region having a second distance relative to the interior opening, the second distance further than the first distance from the interior opening defined by the internal frame.

13. The apparatus of claim 1, comprising:

the plate having:

a first section spanning at least portion of the top layer of the panel and defining the plate opening to mechanically couple with the panel; and a second section spanning at least a portion of a top surface of the battery pack to mechanically couple the plate with the mounting surface.

14. The apparatus of claim 1, comprising:

the plate having a lip structure partially defining the second region of the plate opening to guide the head portion of the connecting member to pass through the second region.

15. An electric vehicle, comprising:

one or more components;

a battery pack arranged in a first position beneath a mounting surface and within an interior opening of an internal frame that is disposed within a bottom region, the interior opening partially defined by a lateral member of the internal frame and the mounting surface, the battery pack having a plurality of battery cells to store electric energy for the one or more components and having a support structure to hold the battery pack in the first position;
a connecting member mechanically coupled with the support structure of the battery pack, the connecting member having a head portion and a body portion;
a panel disposed along the lateral member of the internal frame in the bottom region the panel having:
 a top layer defining a top panel opening to pass the head portion and the body portion of the connecting member, and
 a bottom layer separated from the top layer, the bottom layer defining a bottom panel opening, the bottom panel opening aligned with the top panel opening and having an area less than an area of the top panel opening to pass the body portion and to support the head portion on the bottom layer; and
a plate disposed on the top layer of the panel to couple the panel with the mounting surface, the plate defining a plate opening, the plate opening having:
 a first region to support the head portion of the connecting member onto the plate to hold the battery pack in the first position; and
 a second region contiguous with the first region, the second region having an area larger than an area of the first region to shift the head portion of the connecting member to the second region to allow the battery pack to move from the first position to a second position outside the interior opening of the internal frame in response to a lateral impact.

16. The electric vehicle of claim 15, comprising:
the plate disposed on the top layer of the panel arranged along a first side of the internal frame; and
a second plate disposed on a top layer of a second panel arranged along a second side of the internal frame opposite side of the first side to couple the second panel with the mounting surface, the second plate defining a plate opening, the plate opening having:
 a first region to support the head portion of a second connecting member onto the second plate to hold the battery pack in the first position; and
 a second region contiguous with the first region, the second region having an area larger than an area of the first region to shift a head portion of the second connecting member through the second region to allow the battery pack to move from the first position to the second position on the second side in response to the lateral impact on the first side opposite of the second side on which the second plate is arranged.

17. The electric vehicle of claim 15, comprising:
the plate disposed on the top layer of the panel arranged along a first side;
a second plate disposed on a top layer of a second panel arranged along a second side opposite side of the first side to couple the second panel with the mounting surface;
a first structural element spanning the interior opening from the first side to the second side, the first structural element having a first end mechanically coupled with the panel and a second end mechanically coupled with the second panel;
a second structural element spanning the interior opening from the second side to the first side and intersecting with the first structural element at a midpoint, the second structural element having a first end mechanically coupled with the panel and a second end mechanically coupled with the second panel; and the second linear structure element to move about the midpoint relative to the first linear structure element in response to the lateral impact to allow the battery pack to move to the second position outside the interior opening both on the first side and the second side.

18. A method of providing electrical power to components in electric vehicles, comprising:
arranging a battery pack in a first position beneath a mounting surface and within an interior opening of an internal frame that is disposed within a bottom region of an electric vehicle, the interior opening partially defined by a lateral member of the internal frame and the mounting surface, the battery pack having a plurality of battery cells to store electric energy and having a support structure to hold the battery pack in the first position;
coupling a connecting member with the support structure of the battery pack, the connecting member having a head portion and a body portion;
disposing a panel along the lateral member of the internal frame in the bottom region of the electric vehicle, the panel having:
 a top layer defining a top panel opening to pass the head portion and the body portion of the connecting member, and
 a bottom layer separated from the top layer, the bottom layer defining a bottom panel opening, the bottom panel opening aligned with the top panel opening and having an area less than an area of the top panel opening to pass the body portion and to support the head portion on the bottom layer; and
disposing a plate on the top layer of the panel to couple the panel with the mounting surface of the electric vehicle, the plate defining a plate opening, the plate opening having:
 a first region to support the head portion of the connecting member onto the plate to hold the battery pack in the first position; and
 a second region contiguous with the first region, the second region having an area larger than an area of the first region to shift the head portion of the connecting member to the second region to allow the battery pack to move from the first position to a second position outside the interior opening of the internal frame in response to a lateral impact on the electric vehicle.

19. The method of claim 18, comprising:
disposing the plate on the top layer of the panel arranged along a first side of the electric vehicle; and
disposing a second plate on a top layer of a second panel arranged along a second side opposite side of the first side to couple the second panel with the mounting surface of the electric vehicle, the second plate defining a plate opening, the plate opening having:
 a first region to support the head portion of a second connecting member onto the second plate to hold the battery pack in the first position; and
 a second region contiguous with the first region, the second region having an area larger than an area of the first region to shift a head portion of the second connecting member through the second region to allow the battery pack to move from the first position to the second position on the second side in response to the lateral impact on the first side of the electric vehicle opposite of the second side on which the second plate is arranged.

20. The method of claim 18, comprising:
- disposing the plate on the top layer of the panel arranged along a first side of the electric vehicle;
- disposing a second plate on a top layer of a second panel arranged along a second side opposite side of the first side to couple the second panel with the mounting surface of the electric vehicle;
- arranging a first structural element within the interior opening, the first linear element spanning the interior opening from the first side to the second side, the first structural element having a first end mechanically coupled with the panel and a second end mechanically coupled with the second panel;
- arranging a second structural element within the interior opening, the second linear element spanning the interior opening from the second side to the first side and intersecting with the first structural element at a midpoint, the second structural element having a first end mechanically coupled with the panel and a second end mechanically coupled with the second panel, the second structural element to move about the midpoint relative to the first structural element in response to the lateral impact on the electric vehicle to allow the battery pack to move to the second position outside the interior opening both on the first side and the second side.

* * * * *